US009452844B1

(12) United States Patent
Ye et al.

(10) Patent No.: US 9,452,844 B1
(45) Date of Patent: Sep. 27, 2016

(54) EMERGENCY MECHANICAL AND COMMUNICATION SYSTEMS AND METHODS FOR AIRCRAFT

(71) Applicant: COMAC AMERICA CORPORATION, Newport Beach, CA (US)

(72) Inventors: Wei Ye, Newport Beach, CA (US); Jianhong Sun, Nanjing (CN)

(73) Assignee: COMAC AMERICA CORPORATION, Newport Beach, CA (US)

( * ) Notice: Subject to any disclaimer, the term of this patent is extended or adjusted under 35 U.S.C. 154(b) by 0 days.

(21) Appl. No.: 15/060,372

(22) Filed: Mar. 3, 2016

Related U.S. Application Data

(60) Provisional application No. 62/276,776, filed on Jan. 8, 2016, provisional application No. 62/156,147, filed on May 1, 2015, provisional application No. 62/146,916, filed on Apr. 13, 2015, provisional application No. 62/129,702, filed on Mar. 6, 2015, provisional application No. 62/128,950, filed on Mar. 5, 2015.

(51) Int. Cl.
*B64D 25/20* (2006.01)
*B64D 45/00* (2006.01)
(Continued)

(52) U.S. Cl.
CPC ............... *B64D 25/20* (2013.01); *B64D 1/14* (2013.01); *B64D 45/00* (2013.01); *B64D 47/08* (2013.01);
(Continued)

(58) Field of Classification Search
CPC .................. B64D 25/20; B64D 2700/62289; B64D 2045/0065
See application file for complete search history.

(56) References Cited

U.S. PATENT DOCUMENTS 3,055,621 A    9/1962   Martin
3,140,847 A    7/1964   Ames, Jr.
(Continued)

FOREIGN PATENT DOCUMENTS

CN    2344293    10/1999
EP    2453417    5/2012
(Continued)

OTHER PUBLICATIONS

International Search Report and Written Opinion for application No. PCT/US2016/020765, mailed on Jun. 23, 2016, in 14 pages.
(Continued)

*Primary Examiner* — John R Olszewski
*Assistant Examiner* — Jeffrey Boomer
(74) *Attorney, Agent, or Firm* — Knobbe Martens Olson & Bear LLP

(57) ABSTRACT

A system for quickly locating and retrieving flight data of an aircraft after an aircraft mid-air mishap comprises: a flight data recorder; a tracking device comprising at least one camera; a rapid ejection system for ejecting the flight data recorder and tracking device; a soft landing system; and a tow system, wherein the tow system is configured to continue to transmit flight information from the aircraft to the tracking device via the data communication link for a period of time after the ejection of the tracking device; and wherein the tracking device transmits to the flight data recorder the flight information received from the aircraft after ejection and the images captured by the tracking device immediately following the mid-air mishap, and wherein the flight data recorder is configured to in turn transmit said flight information and images to the remote device.

9 Claims, 51 Drawing Sheets

(51) Int. Cl.
*G07C 5/00* (2006.01)
*B64D 47/08* (2006.01)
*G07C 5/08* (2006.01)
*B64D 1/14* (2006.01)

(52) U.S. Cl.
CPC ............. *G07C 5/008* (2013.01); *G07C 5/0858* (2013.01); *B64D 2045/0065* (2013.01); *B64D 2700/62289* (2013.01); *B65H 2701/34* (2013.01)

(56) References Cited

U.S. PATENT DOCUMENTS

| | | | |
|---|---|---|---|
| 3,181,809 A | 5/1965 | Lobelle | |
| 6,895,314 B2 | 5/2005 | Ailor et al. | |
| 6,898,492 B2 | 5/2005 | de Leon et al. | |
| 7,027,719 B1 | 4/2006 | Schneider et al. | |
| 8,489,259 B2 | 7/2013 | Vinue Santolalla et al. | |
| 8,493,715 B1* | 7/2013 | Angelucci | B64D 45/00 244/1 R |
| 8,509,998 B2 | 8/2013 | Thomas et al. | |
| 8,670,879 B1* | 3/2014 | Angelucci | B64D 45/00 244/1 R |
| 8,727,263 B2 | 5/2014 | Fabre et al. | |
| 8,766,820 B2 | 7/2014 | Fontaina | |
| 2003/0152145 A1* | 8/2003 | Kawakita | H04N 5/77 375/240.12 |
| 2011/0149849 A1* | 6/2011 | Brownrig | H04L 45/00 370/328 |
| 2012/0138741 A1* | 6/2012 | Fabre | G01S 5/0231 244/1 R |
| 2012/0166037 A1 | 6/2012 | Santolalla et al. | |
| 2012/0200460 A1* | 8/2012 | Weed | B64D 45/00 342/385 |
| 2013/0070556 A1* | 3/2013 | Huskamp | G01S 15/06 367/6 |
| 2013/0317673 A1* | 11/2013 | Leroy | H04B 7/18506 701/14 |
| 2014/0002651 A1* | 1/2014 | Plante | H04N 5/76 348/148 |
| 2014/0277923 A1* | 9/2014 | Kaufmann | B64D 25/20 701/33.4 |
| 2015/0312449 A1* | 10/2015 | Gibbins | G03B 17/561 348/148 |
| 2016/0047880 A1* | 2/2016 | Helfrick | G01S 5/0231 340/981 |
| 2016/0075443 A1* | 3/2016 | Schmutz | G08G 5/0013 701/14 |
| 2016/0078693 A1* | 3/2016 | Miller | H04B 5/0031 455/41.1 |

FOREIGN PATENT DOCUMENTS

| | | | |
|---|---|---|---|
| FR | 2957680 A1 * | 9/2011 | ............ B64D 25/20 |
| GB | 1288076 | 9/1972 | |
| GB | 1318197 | 5/1973 | |
| GB | 2228458 | 8/1990 | |

OTHER PUBLICATIONS

Jansen, Lawmaker urges 'black boxes' that eject from planes, USA Today, http://www.usatoday.com/story/news/nation/2014/03/12/ejectable-recorders-plane-crash-data-voice-black-boxes/6338397/, Mar. 13, 2014.

Adler, Banish the black box: there's a better way to capture plane crash data, WIRED, http://www.wired.com/2011/06/ff_blackboxes/, Jun. 28, 2011.

Lowry, Boeing, Airbus at odds over black boxes that eject, Phys.org, http://phys.org/news/2014-10-boeing-airbus-odds-deployable-black.html, Oct. 7, 2014.

Flight recorder, Wikipedia, https://en.wikipedia.org/wiki/Flight_recorder, Pub. Date Unknown, Submitted copy retrieved Apr. 20, 2016.

* cited by examiner

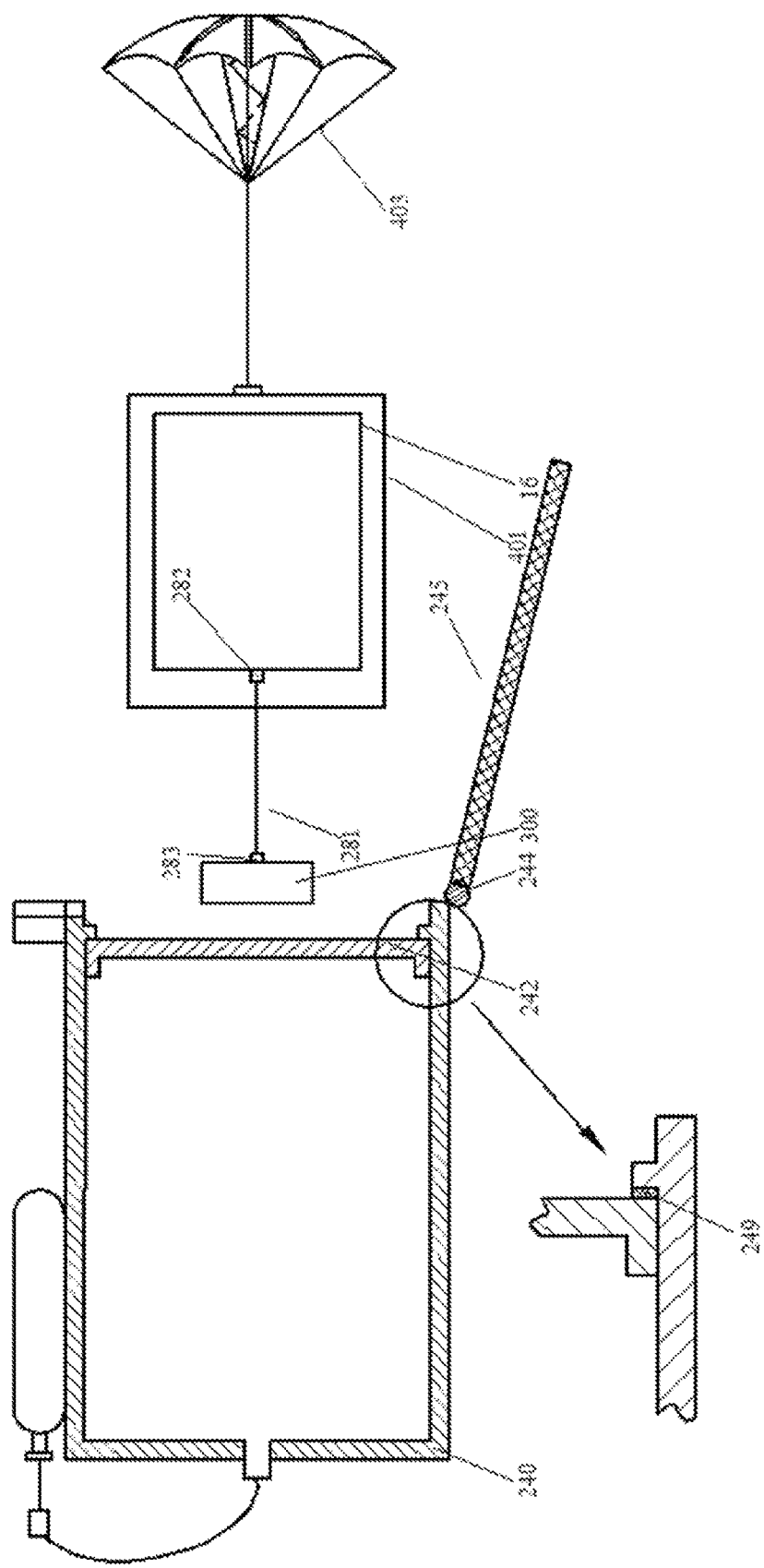

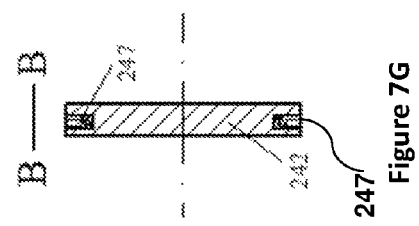
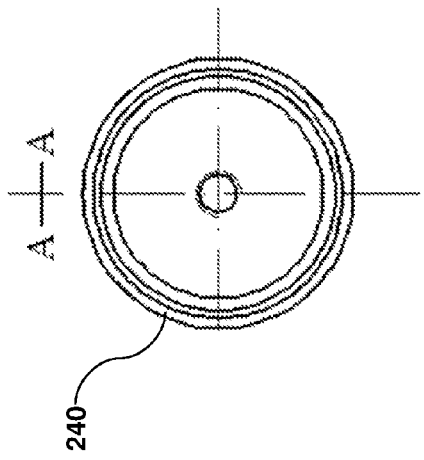
Figure 7E
Figure 7G
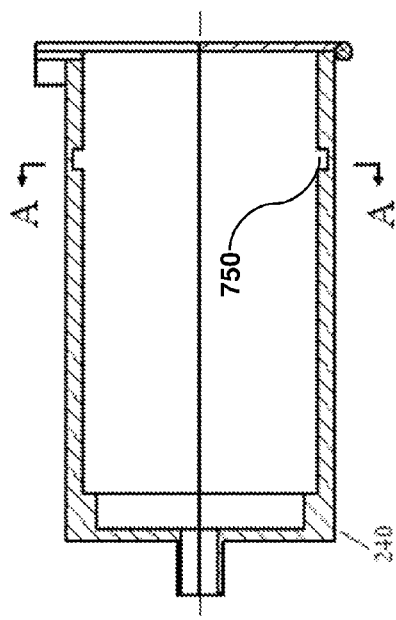
Figure 7D
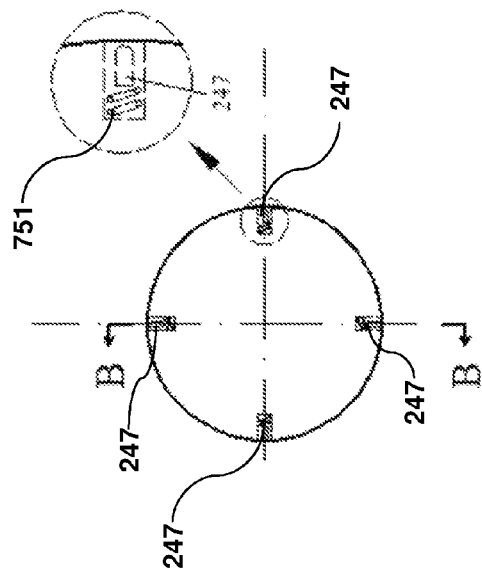
Figure 7F

EMERGENCY MECHANICAL AND COMMUNICATION SYSTEMS AND METHODS FOR AIRCRAFT

CROSS-REFERENCE TO RELATED APPLICATIONS

This application claims the benefit of U.S. Provisional Application No. 62/276,776, titled EMERGENCY MECHANICAL AND COMMUNICATION SYSTEMS AND METHODS FOR AIRCRAFT, filed on Jan. 8, 2016; U.S. Provisional Application No. 62/156,147, titled METHOD, SYSTEM AND APPARATUS FOR RECORDING FLIGHT DATA AND A RAPID SEPARATION AND EJECTION SYSTEM FROM AN AIRCRAFT, filed on May 1, 2015; U.S. Provisional Application No. 62/146,916, titled METHOD, SYSTEM AND APPARATUS FOR RECORDING FLIGHT DATA AND A RAPID SEPARATION AND EJECTION SYSTEM FROM AN AIRCRAFT, filed on Apr. 13, 2015; U.S. Provisional Application No. 62/129,702, titled METHOD, SYSTEM AND APPARATUS FOR RECORDING FLIGHT DATA AND RAPID SEPARATION AND EJECTION SYSTEM FROM AN AIRCRAFT, filed on Mar. 6, 2015; and U.S. Provisional Application No. 62/128,950, titled METHOD, SYSTEM AND APPARATUS FOR RECORDING FLIGHT DATA AND A RAPID SEPARATION AND EJECTION SYSTEM FROM AN AIRCRAFT, filed on Mar. 5, 2015. Each of the foregoing applications is hereby incorporated by reference herein in its entirety.

FIELD

This disclosure generally relates to systems and methods for recording aircraft flight data and retrieval of flight data recorder in the event of an aircraft mishap or other emergency situations.

BACKGROUND

Three commercial jets went down in 2014 and the protracted searches for the black boxes are presenting new demands for aviation security and rescue. In the high profile disappearance of Malaysia Airlines flight MH370, search and rescue were unable to locate where the plane crashed exactly and the black box is still yet to be found. The disappearance of Malaysia Airlines MH370 triggered extensive discussions within the aviation community. In view of the foregoing, there are needs for systems and methods for retrieving the data found in a flight data recorder or black box more quickly and for obtaining more information about the circumstances leading up to a plane crash.

SUMMARY

In response to these needs, disclosed are systems and methods designed to allow flight data recorders to be located and retrieved easily after an aircraft mishap, and to provide visual images and other useful information of the aircraft during or immediately after the mishap when the aircraft is still in the air. In some embodiments, the systems and methods are designed to record visual images of the aircraft at a distance away from the aircraft during a catastrophic event so as to capture a wider field of view of the aircraft and its surrounding area. The systems and methods can provide a rapid ejection of the flight data recorder when the aircraft experiences a catastrophic event and can cause the flight data recorder to follow the aircraft and continue recording images at a distanced away for a period of time after being ejected from the aircraft. The recorded images and information can be immediately transmitted to a satellite or other communication device to preserve the data in case the flight data recorder is later damaged. In some embodiments, the systems and methods provide a soft landing mechanism for the ejected flight data recorder that reduces damage to the recorder due to impact from landing either on water or land. In some embodiments, the systems and methods provide a flight data recorder that conserves battery power so that it can emit distress signal for longer than 30 days, or longer than 60-90 days in some implementations.

In one implementation, the systems and methods include rapid separation and ejection of flight data recorders and recording of flight data for retrieval. In some embodiments, a system includes a data analysis and processing portion to determine whether the aircraft is experiencing an abnormal flight event, such as a catastrophic event that is likely to lead to a crash. If such an event is detected by the processing portion, the system can deploy a towed camera system and ejects a soft-landing and floating system including an emergency flight data recorder (EFDR), which contains information recently retrieved from the aircraft's black box. The towed camera portion can be dragged behind the aircraft by a cable, which can also serve as a communication link with the processing portion and EFDR. The soft-landing and floating system can include an inflation system, spring-loaded parachute that can be ejected by the spring for fast inflation and soft landing, radio beacon and communication system that allows the system to communicate with a relay satellite. As such, events occurring with the aircraft can be rapidly reported back to authorities so that rescue and recovery efforts can begin immediately.

In a preferred embodiment, the system ejects a parachutable data storage/transmitter and a towed or pull-type image tracking system (or towed video tracking system) configured to capture rear-view video images of the last few minutes of the plane prior to a crash after ejection from the tail section of the plane. The towed image tracking system transfers the information of the last few minutes of the plane's position and the black box data, as well as video footage to the parachuting data storage/transmitter unit. Data from the image tracking system and data storage/transmitter unit may be transmitted through the satellite to cloud or internet technology. This can provide backup for the data. It can track the aircraft, capture the images and transmit the data away from the aircraft after ejection. It also can also capture the images of the whole aircraft and get more information about the aircraft than cameras fixed on the plane. The data storage/transmitter unit can also save a copy of the data and can be equipped with a parachute and inflation system to enable it to stay afloat at sea. The inflation system can also protect data storage/transmitter unit hardware when landing on hard surfaces, e.g., rocks and the like. It also transmits or broadcasts distress signals to help rescue teams locate its position.

According to one aspect, there can be an emergency system that serves as a useful supplement to existing black box designs that sink with the plane. The emergency system not only offers valuable video footage of the plane in the last few minutes to vividly reflect details leading up to the crash, it also offers an alternative deployable "black box" that intelligently ejects or separates itself from or out of the plane, which makes the black box search much easier. In some embodiments, the system ejects out of the plane and then separates from the plane. After separation, the "black box" soft-lands and keeps afloat, which also makes the black box search easier. Its data transmission function to the internet or cloud also considerably increases the survivability of flight data when there's difficulty finding the black box in extreme environments. In addition, its ability to transmit the ongoing position of the plane to the satellite before the crash also ensures prompt and accurate knowledge of the crash location and/or plane trajectory prior to the crash.

In another aspect, some embodiments of the invention address the following needs for collecting and retrieval of flight data in the few moments leading up to a plane crash:

defining a critical point in time for triggering the ejection of the EFDR and separation of the towed camera tracking and image capturing system (TITCS) for later retrieval;

achieving a rapid separation and/or ejection; and/or the instantaneous or rapid transmission data (in some embodiments, large amounts of data) from the aircraft's black box and/or towed tracking and image capturing system to the EFDR.

In response to the foregoing needs there are, in some embodiments, a system for ejecting and separating an emergency flight data recorder (EFDR) from an aircraft and a tow-type image tracking and capturing system (TITCS)/pull-type picture tracking and pick-up system for monitoring the aircraft condition during an emergency. This system comprises sensors, an emergency situation diagnosis processor (ESDP), a high-pressure gas ejection module (HGEM) and/or a spring-loaded extraction parachute (SEP).

The system, which for present purposes is called an intelligent rapid ejection and separation system (IRESS), has its own power module. If the aircraft is in an emergency (for example an imminent crash, or explosion), the HGEM can be triggered. In an embodiment, the EFDR and the TITCS can be ejected together by the HGEM from the aircraft. The SEP can be inflated (or deployed) thereby producing a transferring force that pulls the EFDR out of the aircraft. During the process of ejecting the EFDR from the aircraft, the EFDR can also separate from the TITCS, preferably this can be done automatically. Alternatively, the TITCS can be separated from the aircraft manually or automatically. The EFDR can be enclosed by a housing. The housing can comprise an opening. The housing can be entirely sealed and have no opening. The EFDR can land on the water, a locking module between the SEP and the housing can be unlocked, thereby separating the SEP from the housing.

According to an embodiment of the present disclosure for ejecting and separating the EFDR and the TITCS from an aircraft, an apparatus comprises one or more of sensors, a detachable joint, a towed detachable cable, an emergency situation diagnosis processor (ESDP), a high-pressure gas ejection module (HGEM) and a spring-loaded extraction parachute (SEP). Several sensors can be provided for collecting flight parameters. An ESDP can be provided for collecting and diagnosing warning signals and/or other signals coming from the aircraft. A HGEM can be provided for quickly ejecting the EFDR and the TITCS from the aircraft together, preferably rapidly. A SEP can also be provided for pulling the EFDR out of the aircraft, preferably rapidly. Pluggable units (which disconnect under the effect of tensile forces) can be used to automatically separate components, parts or subsystems in flight. The detachable joint can be used to connect the towed detachable cable (connected to the TITCS) to the aircraft, and also to unlock automatically or manually the towed detachable cable (TITCS). Manual unlocking can be preferably available to the pilot. A housing can be provided for enclosing the EFDR, such as for protection. A locking module can be provided for connecting the SEP and the housing. When the EFDR lands on water, the locking module can be unlocked, thereby separating the SEP from the housing. A power module may be provided to supply power for the whole system.

Several flight parameters, warning signals from the aircraft and pilot operational signals can be chosen as trigger conditions for ejection and separation. When the aircraft is in an emergency (for example an imminent crash, or an explosion has occurred), the HGEM can be activated by the ESDP or the sensors or the pilot thereby ejecting the whole system (including the EFDR and the TITCS) from the aircraft. The surface sealing mechanism (SSM) will in some embodiments fill the launching hole in aircraft surface to maintain the laminar flow, for example in case of inadvertent deployment. After the EFDR and TITCS are both ejected from the aircraft, they can be disconnected from each other automatically. There can be a pluggable unit to connect EFDR with TITCS, which can be adapted to automatically disconnect the two modules from each other when a threshold tensile force is present in the connecting cables. In an embodiment, the TITCS remains connected with the aircraft by a towed detachable cable. This cable can also provide a data link between the TITCS and the plane. However, if needed the TITCS can also be separated from the aircraft automatically or disconnected manually by a pilot. When the EFDR lands on water, in order to disconnect the SEP from the housing (e.g., to protect the EFDR from being dragged deeper into the water by the SEP), a water sensor triggers the locking module to unlock a connection between the housing (which holds the EFDR) and the SEP, thereby to disconnecting the SEP from the housing.

In response to the foregoing needs there can also be provided an apparatus for achieving a soft-landing and floating of an emergency flight data record (EFDR) comprising a housing, a shock-absorbing filler material, an inflation subsystem, an airbag subsystem, a sleeve and a SEP. The emergency inflatable soft-landing system (EISS), which holds the EFDR, can be mounted on or in an aircraft. A possible first location can be generally at the rear part of the aircraft and a possible second location can be at the backward portion of the tip of the vertical tail. A housing of the EISS defines a compartment for enclosing the EFDR, the inflation subsystem, the filler material and data cables. The filler can be provided for filling the space between the components enclosed by the housing. The airbag subsystem can be placed on the outside surface of the housing. The airbag subsystem and/or the housing can also be wrapped and/or enclosed within a sleeve. The SEP can be connected with the housing by a locking module. When an aircraft is in an emergency state (e.g., a crash is imminent, or an explosion has, or is about to happen), the EFDR held by the EISS is ejected from the aircraft together with the TITCS. Then, the EFDR is disconnected from the TITCS, for example, by the SEP when a tensile pulling force on the housing by the SEP is generated above a threshold level. In some embodiments, the threshold level is set at a level less than the anticipated tensile force that would be generated by the SEP when the aircraft is flying at a normal flight speed (e.g., a cruising speed). In some embodiments, the threshold level is set at a percentage of the anticipated tensile force that would be generated by the SEP when the aircraft is flying at a normal flight speed, such as at 10%, 25%, 50%, or 75% of the anticipated force generated by the SEP. A lower percentage, such as at or below 50%, can be desirable in some embodiments to enable separation of the EFDR from the TITCS even at flight speeds significantly lower than the normal or cruising flight speed. By having a threshold level set below the anticipated tensile or pulling force created by the SEP, the EFDR may be caused to separate from the TITCS shortly after the EFDR and TITCS are ejected from the aircraft. For example, once the SEP has caused the cable or cables connecting the TITCS to the aircraft and the EFDR to the TITCS to become fully extended or substantially fully extended, the EFDR may be caused to separate from the TITCS. In some embodiments, however, it may be desirable to have the EFDR remain connected to and/or towed behind the TITCS for at least a period of time after ejection. In that case, it may be desirable to, for example, have a connector between the TITCS and EFDR that selectively enables the EFDR to remain coupled to the TITCS even when the tension load created by the SEP is above the threshold level. Then, upon a determination that the EFDR should separate from the TITCS (such as due to the aircraft dropping below a certain altitude, the air speed dropping below a certain level, and/or the like) the connector may be configured to separate the EFDR from the TITCS and/or to allow the SEP to separate the EFDR from the TITCS by generating a tensile load above the threshold level. In various embodiments, separation of the TITCS from the aircraft and/or the EFDR from the TITCS may be accomplished in various ways. For example, as discussed above, a separation may automatically occur when a parachute or other device generates a tensile load in a cable that is above a threshold value. In some embodiments, however, other methods may be used, such as a time delay mechanism that automatically causes separation after a certain amount of time, and/or an altitude and/or speed based mechanism that automatically causes separation when the aircraft's altitude and/or speed is above or below a certain threshold level, and/or the like. Further, in some embodiments, manual separation may be enabled, such as by a control that enables the pilot of the aircraft or other member of the flight crew to manually initiate a separation of the TITCS from the aircraft and/or the EFDR from the TITCS. One reason for this may be, for example, to enable manual separation after an inadvertent ejection and/or after the aircraft has recovered from an emergency situation and returned to normal flight. In such a situation, continuing to tow or drag the TITCS and/or EFDR behind the aircraft could potentially be detrimental to flight safety and/or could damage the body of the aircraft. After separation, the EFDR can be decelerated during descent by the SEP. If the EFDR falls below a preset altitude, the airbag subsystem can be preferably triggered by an altitude sensor and inflated by an onboard inflation subsystem that provides a soft-landing for the EFDR. If the EFDR lands on water, it can float by the inflated airbag subsystem. The SEP can be configured to automatically separate from the housing when there is a water landing.

According to an embodiment of the present disclosure an apparatus for transmitting flight data and positioning signals comprises one or more of: three data links, a tow-type image tracking and capturing system (TITCS), an emergency flight data recorder (EFDR) and several transmitters. The first data link can be provided for transmitting flight data from the aircraft to the EFDR through the TITCS. The second data link can be provided for transmitting data between the EFDR and the TITCS. The third data link can be provided for transmitting flight data, SOS and positioning signals among search and rescue aircraft, the EFDR, a relay satellite, a cloud server and/or a ground control center. To build these data links, several components can be, in the case of search and rescue aircraft either already available or can be installed, or can be installable upon on the TITCS and the EFDR. A data cable (with two pluggable units) can be provided to transmit data from the TITCS to the EFDR. A radio beacon can be provided for broadcasting an SOS and positioning signal. A data upload antenna can be provided for transmitting flight data to a cloud server. Video and/or still images, which can be captured by the TITCS, can be transmitted from the TITCS to the data upload antenna after the EFDR has disconnected with the TITCS. A positioning module can be provided for gaining location coordinate information from satellites. A shield can be provided for wrapping the radio beacon and the data upload antenna inside. When the EFDR can be connected with the TITCS, flight data can be transmitted from the aircraft to the EFDR through the TITCS. When the EFDR is disconnected with the TITCS, the EFDR can stop receiving flight data, and the images captured by the TITCS can be transmitted to the EFDR by wireless technology. When the EFDR lands, the radio beacon can be activated to broadcast an SOS signal(s) and/or a positioning signal(s). The positioning module can be activated to search for satellites that can provide location information. After a search and rescue aircraft receives the SOS signal from the EFDR, the EFDR can start to transmit flight data to a cloud server available through a satellite. If the third data link is established, a ground control center can control the data transmitted through the satellite. If the EFDR fails to maintain a data connection with the satellite, the data upload antenna and the positioning module can automatically shut down or go into a sleep mode or stop transmitting data for a period of time or go into some other power save mode to save battery energy.

According to an embodiment of the present disclosure an apparatus for image tracking and capturing comprises a towed detachable cable, a multi-eyes video module, a DPTM, a stabilizing parachute, cables and connectors. The TITCS can be mounted aboard an aircraft. A possible first location can be generally at the rear part of the aircraft and a possible second location can be at the backward portion of the tip of the vertical tail. When the aircraft is in an emergency (for example, a crash is imminent, or an explosion is about, or has just taken place), the TITCS can be ejected from the aircraft and towed by the aircraft through the towed detachable cable. With this towed detachable cable, the TITCS can track the aircraft. In an embodiment, images of the aircraft can be captured by the multi-eyes or multi-lens or multi-camera video module which can be held by or coupled to a stabilizing parachute. The DPTM can be provided for processing and storage of these images. The DPTM can also be provided for transmitting these images to the EFDR.

As such, some embodiments of the inventions disclosed herein are methods, systems, and apparatuses for recording flight data, an intelligent rapid separation and ejection system, an emergency inflatable soft-landing and floating system, an instantaneous transmission of flight data and positioning signal system, and a tow-type imaging tracking and capturing system.

According to some embodiments, a system for rapid separation of a flight data recorder from an aircraft comprises: a housing comprising an internal cavity and an opening; a panel coupled to the housing and configured to at least partially cover the opening of the housing when the panel is in a closed position; a spring that biases the panel toward an open position; a locking mechanism configured to retain the panel in the closed position and selectively release the panel to enable the panel to move toward the open position; a flight data recorder positioned within the internal cavity of the housing and configured to be ejectable from the housing through the opening of the housing; and an extraction parachute coupled to the flight data recorder.

In some embodiments, the extraction parachute is a spring-loaded parachute. In some embodiments, the spring-loaded parachute comprises a parachute spring that is held in a compressed configuration by the panel when the panel is in the closed position. In some embodiments, the panel is hingedly coupled to the housing, and wherein the open position of the panel comprises a position wherein the panel is pivoted away from the opening. In some embodiments, the panel is removably coupled to the housing, and wherein the open position of the panel comprises a position wherein the panel is separated from the housing. In some embodiments, the spring is a torsion spring. In some embodiments, the spring is a compression spring. In some embodiments, the system further comprises: a descent control parachute coupled to the flight data recorder, the descent control parachute comprising a larger total surface area than the extraction parachute. In some embodiments, the system further comprises: a pressurized gas source; a piston slidably coupled to the housing and positioned to divide the internal cavity of the housing into at least a first chamber and a second chamber, wherein the flight data recorder and extraction parachute are positioned within the second chamber; and a valve configured to selectively fluidly couple the pressurized gas source to the first chamber. In some embodiments, the piston comprises at least one spring-loaded locking mechanism positioned at an outer radial surface of the piston and configured to automatically engage a recess of the housing when the piston reaches an end of stroke position within the housing. In some embodiments, the piston comprises at least four spring-loaded locking mechanisms and the recess is a groove in the housing. In some embodiments, the flight data recorder comprises a wireless transmitter configured to transmit logged data to at least one of the following: a satellite, a second aircraft, and a wireless ground station. In some embodiments, the flight data recorder comprises a geolocation system, and the logged data comprises data indicating a position of the flight data recorder. In some embodiments, the flight data recorder is configured to automatically limit logged data transmissions to conserve power when a stable wireless connection cannot be maintained. In some embodiments, the system further comprises an airbag mechanism coupled to the flight data recorder, the airbag mechanism comprising one or more inflatable airbags configured to be positioned about the flight data recorder when inflated. In some embodiments, the airbag mechanism comprises a second housing having a second internal cavity within which the flight data recorder is positioned, and wherein the one or more inflatable airbags comprises at least: a first annular shaped airbag positioned at a first end of the second housing; a second annular shaped airbag positioned at a second end of the second housing; and a third annular shaped airbag positioned about the second housing between the first and second annular shaped airbags. In some embodiments, the one or more inflatable airbags are configured to comprise sufficient inflated volume to keep the flight data recorder and airbag mechanism buoyant in water. In some embodiments, the opening of the housing comprises a diameter less than or equal to 25 centimeters. In some embodiments, the system further comprises: a detachment mechanism configured to detach the extraction parachute from the flight data recorder; and a sensor configured to detect a water landing, to enable the detachment mechanism to cause detachment of the extraction parachute after a water landing. In some embodiments, the system further comprises: a tracking device positioned within the internal cavity of the housing and configured to be ejectable from the housing through the opening of the housing, the tracking device comprising at least one camera; and a towing cable having a first end and a second end, wherein the first end is coupled to the housing or configured to be coupled to the aircraft, wherein the tracking device is coupled to the second end of the towing cable, and the at least one camera of the tracking device is positioned to enable capturing of one or more images of the aircraft when the tracking device is towed behind the aircraft in flight by the towing cable. In some embodiments, the tracking device and flight data recorder each comprise wireless communication hardware configured to enable the tacking device to wirelessly transmit data to the flight data recorder after ejection from the aircraft. In some embodiments, the system further comprises the aircraft, wherein the housing is coupled to the aircraft. In some embodiments, the housing is positioned in a tail portion of the aircraft. In some embodiments, he system further comprises: at least one computer processor configured to: analyze data received from a plurality of sensors; determine, based on the analysis, that an emergency event is occurring; and initiate an ejection process that results in ejecting at least the flight data recorder. In some embodiments, determining that the emergency event is occurring comprises determining that data received from at least two sensors exceeds a threshold level.

According to some embodiments, a system for rapid separation of a flight data recorder from an aircraft comprises: a housing comprising an internal cavity and an opening; a piston slidably coupled to the housing and positioned to divide the internal cavity of the housing into at least a first chamber and a second chamber; a flight data recorder positioned within the second chamber of the internal cavity of the housing and configured to be ejectable from the housing through the opening of the housing; an extraction parachute positioned within the second chamber of the internal cavity of the housing and coupled to the flight data recorder; a pressurized gas source; and a valve configured to selectively fluidly couple the pressurized gas source to the first chamber.

In some embodiments, the system further comprises: a panel coupled to the housing and configured to at least partially cover the opening of the housing when the panel is in a closed position; a spring that biases the panel toward an open position; a locking mechanism configured to retain the panel in the closed position and selectively release the panel to enable the panel to move toward the open position. In some embodiments, the system further comprises: an aircraft, wherein the housing is coupled to the aircraft and positioned with the opening of the housing adjacent an ejection panel that forms a portion of a skin of the aircraft. In some embodiments, the ejection panel is hingedly coupled to a portion of the aircraft and spring loaded to bias the movable panel to an open configuration. In some embodiments, the ejection panel comprises a reduced strength area configured to fracture when the flight data recorder is ejected from the aircraft. In some embodiments, the system further comprises: a tracking device positioned within the internal cavity of the housing and configured to be ejectable from the housing through the opening of the housing, the tracking device comprising at least one camera; and a towing cable having a first end and a second end, wherein the first end is coupled to the housing or configured to be coupled to the aircraft, wherein the tracking device is coupled to the second end of the towing cable, and the at least one camera of the tracking device is positioned to enable capturing of one or more images of the aircraft when the tracking device is towed behind the aircraft in flight by the towing cable. In some embodiments, the tracking device and flight data recorder each comprise wireless communication hardware configured to enable the tacking device to wirelessly transmit data to the flight data recorder after ejection from the aircraft.

According to some embodiments, an ejectable system for collecting data relating to an aircraft in an emergency situation comprises: a housing comprising an internal cavity and an opening; a tracking device positioned within the internal cavity of the housing and configured to be ejectable from the housing through the opening of the housing, the tracking device comprising at least one camera; and a towing cable having a first end and a second end, wherein the first end is coupled to the housing or configured to be coupled to an aircraft, wherein the tracking device is coupled to the second end of the towing cable, and the at least one camera of the tracking device is positioned to enable capturing of one or more images of the aircraft when the tracking device is towed behind the aircraft in flight by the towing cable.

In some embodiments, the system further comprises the aircraft, wherein the first end of the towing cable is coupled to the aircraft. In some embodiments, the system further comprises a parachute coupled to the tracking device for stabilizing the tracking device when the tracking device is towed behind the aircraft in flight. In some embodiments, the system further comprises a stabilization device coupled to or formed as part of the tracking device for stabilizing the tracking device when the tracking device is towed behind the aircraft in flight, the stabilization device comprising at least one aerodynamic flight surface. In some embodiments, the towing cable is configured for transmission of flight data from the aircraft to a storage device of the tracking device. In some embodiments, the towing cable comprises an outer portion for towing the tracking device and a data cable positioned within the outer portion, the data cable configured for transmission of the flight data from the aircraft to the storage device of the tracking device. In some embodiments, the towing cable comprises at least one connector configured to enable separation of the tracking device from the aircraft in flight. In some embodiments, the tracking device further comprises a plurality of additional cameras. In some embodiments, the system further comprises: a flight data recorder positioned within the internal cavity of the housing and configured to be ejectable from the housing through the opening of the housing, the flight data recorder comprising a wireless receiver, wherein the tracking device comprises a wireless transmitter, and the tracking device is configured to transmit logged data to the flight data recorder wirelessly after the tracking device and flight data recorder have been ejected from the aircraft, and wherein the logged data comprises one or more of the following: images captured by the at least one camera of the tracking device, flight data transmitted from the aircraft to the tracking device through the towing cable, and data collected by one or more sensors of the tracking device.

According to some embodiments, an apparatus for tracking and capturing an image of an aircraft during flight comprises: a towing cable connected at one end to an aircraft; a tracking device including a parachute connected at an opposite end of the cable, the parachute for providing an installation dock for cameras; wherein when the parachute is ejected from the aircraft, the parachute pulls the towing cable straight by aerodynamic forces so as to trail behind the aircraft during flight; wherein the parachute is configured to maintain a stable position for the cameras during image capture, the image capture including recorded videos of the aircraft's flight attitude and structural integrity during flight.

In some embodiments, the towing cable also is configured for transmission of flight data from an aircraft flight data computer to a storage device located on the tracking device, the towing cable further comprising: a rope for towing the parachute from the rear part of the aircraft when the parachute is ejected out of the aircraft, and a data cable within the rope for transmitting flight data from the air data computer in the aircraft to the storage device. In some embodiments, the apparatus further includes a removable connection in the rear part of the aircraft. In some embodiments, the apparatus further includes several removable joints such as explosive bolt for disconnecting the towing cable from the aircraft when a pulling force is exceeded.

According to some embodiments, an apparatus for controlling the rapid separation and ejection system intelligently comprises: an emergency state diagnosis processor for collecting flight data and pilot override signal and determining the state of the aircraft by analyzing these data; an aircraft state data collection device for collecting particular data which can determine the emergency state alone; an electromagnetic valve for releasing high pressured gas from the tank when receives emergency signal from the emergency state diagnosis processor; and an electromagnet lock for lock the lid of the ejection device until receives emergency signal from the emergency state diagnosis processor.

According to some embodiments, an apparatus for ejecting a towing tracking device and an emergency flight data recorder out of the aircraft comprises: a high pressure gas tank and its gas pipe for storing and transporting the high pressured gas; a piston for delivering the gas pulling force to the towing tracking device; a shell with a lid for containing the piston, the towing tracking device and the emergency flight data recorder.

According to some embodiments, an apparatus for opening the aircraft fuselage to clear a path for the ejection of the towing tracking device and the emergency flight data recorder comprises: a lid with a spring on the aircraft fuselage for sealing the ejection device inside the aircraft and opening when the ejection is about to happen; an actuator cylinder with a plug for locking the lid of the aircraft fuselage and unlocking it when the ejection is about to happen.

According to some embodiments, an apparatus for provided removable connection for the cable of the towing tracking device comprises: a two sides removable data link connector for connecting data cables between the emergency state diagnosis processor and the towing tracking device, when the pulling force of the data cable of the towing tracking device reach certain level, the data link connector disconnects with the data cable; an install base for connecting the rope of the towing tracking device, when the pulling force of the rope reach certain level, the install base disconnects with the rope; an actuator cylinder with a plug for installing the connector and separating the connector from the install base when the pilot decide so.

According to some embodiments, an apparatus for pulling the emergency flight data recorder out of the aircraft comprises: a spring loaded extraction parachute for pulling the emergency flight data recorder out of the aircraft; a shield for contain the emergency flight data recorder when it is in the aircraft, this shield can be separated from the emergency flight data recorder by the inflation of the airbag.

According to some embodiments, an apparatus for pulling the emergency flight data recorder out of the aircraft comprises: a spring loaded extraction parachute for pulling the emergency flight data recorder out of the aircraft; a locker on the end of the suspension line of the spring loaded extraction parachute and a plug in the emergency flight data recorder for connecting the spring loaded extraction parachute with the emergency flight data recorder; an actuator cylinder in the emergency flight data recorder for pulling the plug back in to separate the spring loaded extraction parachute; a water sensor on the emergency flight data recorder for controlling the actuator cylinder when the emergency flight data lands into the water.

Some embodiments comprise an apparatus for containing the emergency flight data recorder, the gas tank and other major components and protecting these components from certain level of impact, fire and puncture.

According to some embodiments, an apparatus for storing compressed gas and inflating the air bag comprises: compressed gas tanks for storing high pressured gas; several gas pipes for transferring compressed gas from gas tank to the airbag subsystem; several valves for controlling the compressed gas tank, it releases gas from the gas tank when the soft-landing device is ejected out of the aircraft.

According to some embodiments, an apparatus for providing a decelerating, soft-landing and floating ability for the emergency flight data recorder comprises: an airbag subsystem of airbag-parachute subsystem for providing floating ability when the emergency flight data recorder crashes in the water, it also absorbs the impact energy when the emergency flight data recorder crashes in the water or on the circle-around; a parachute of airbag-parachute subsystem for providing aerodynamic drag for the emergency flight data recorder to slow down the landing speed. The aerodynamic shape of the airbag subsystem can provide a certain level of drag force, however if the emergency flight data recorder is dropped from air high enough, without the canopy the airbag wouldn't slow the emergency flight data recorder down enough so that the air bag can survival in the impact of crash; several suspension line for restraining the canopy to a certain form during the landing process. In some embodiments, the apparatus further comprises a suspension line system for providing connection between the parachute and the airbag subsystem and helping the canopy to maintain the design aerodynamic shape when it is fully inflated.

According to some embodiments, an apparatus for arrangement of gas tanks comprises a multi-gas-tank arrangement for inflating airbags.

According to some embodiments, an apparatus for transmitting flight data to the emergency flight data recorder when the emergency flight data recorder is ejected comprises: a data cable which connects the aircraft to the towing tracking device for transmitting fight data from the aircraft to the towing tracking device; a data collector in the towing tracking device for collecting flight data and the video data and sending these data to the transponder in the towing tracking device; a transponder in the towing tracking device for transmit data to the emergency flight data recorder through wireless technology.

According to some embodiments, an apparatus for receiving flight data and transmitting flight data to the cloud sever through a satellite comprising when the emergency flight data recorder lands in the water or on the ground comprises: a data upload antenna in the emergency flight data recorder for receiving flight data from the towing tracking device and transmitting flight data to the satellite; a GPS/BEIDOU module in the emergency flight data recorder for searching satellite to provide location and automatically shut down the data upload antenna when it can't maintain a stable connection with the satellite.

Some embodiments comprise an apparatus in the emergency flight data recorder for providing a SOS and GPS/BEIDOU signal for locating the emergency flight data recorder.

In some embodiment, the apparatus further comprising a means for instantaneously transmitting real-time data in both ways.

According to some embodiments, an apparatus for tracking and shooting video picture to the aircraft comprises: a parachute for providing an install base for cameras, when the parachute is ejected out of the aircraft, it pulls the towing cable straight by the air dynamic force and keeps cameras stable in air for better quality video picture; several video cameras for recording the flight altitude and the structure integrity of the aircraft.

In some embodiments, a towing cable for towing the parachute and transmitting flight data to the tracking device comprises: a rope for towing the parachute from the rear part of the aircraft when the parachute is ejected out of the aircraft; and a data cable within the rope for transmitting flight data from the air data computer in the aircraft to the tracking device. In some embodiments, an apparatus for providing removable connection in the rear part of the aircraft comprises: several removable joints such like explosive bolt for disconnecting the towing cable from the aircraft during a certain pulling force.

According to some embodiments, a system for rapid separation and ejection from an aircraft comprises: sensors comprising at least an accelerometer, airspeed, and altitude sensor; data analyzing and processing system comprising a processor; a compartment for housing the system; a removable shield; and a spring loaded parachute system; wherein the system includes logic executable on the processor for determining from at least information provided by the sensors whether an abnormal flight condition is occurring, whereupon at least a portion of the system is configured to separate and eject from the aircraft.

According to some embodiments, an inflatable soft-landing system comprises: a body comprising: an emergency flight data recorder system; a fairing housing the recorder system; a parachute; a plurality of airbags; position signal transmitter; data transmission and positioning system; and sensors and controls for controlling the deployment of the parachute and airbags based at least on the altitude, attitude and/or position of the body.

According to some embodiments, an instantaneous data transmission and positioning system comprises: an emergency flight data recorder (EFDR); a radio beacon; and a data upload antenna; wherein the module is capable of transmitting information including data recoded on the EFDR to a satellite or cloud server.

According to some embodiments, a tow-type image tracking and capture system comprises: detachment device; a body configured for being towed from an aircraft, comprising: data connection and transmission cables; camera; non-volatile memory storage for storing images from the camera; aerodynamic stabilizing device for stabilizing the camera; a detachment device configured for detaching the body from the aircraft.

According to some embodiments, a method comprises: monitoring a flight condition of an aircraft; if an abnormal flight condition is detected, initiating an ejection of a flight data recorder; and recording video of the aircraft from a camera towed by the aircraft. According to some embodiments, an apparatus comprises: a processor including non-volatile memory; sensors in communication with the processor; logic accessible by the processor and executable by the processor for performing the method.

According to some embodiments, a camera system comprises: a first portion, comprising: a video camera including a lens, nonvolatile memory for storing images, focusing mechanism and battery, a transmitter and receiver, and a processor for recording video and/or uploading data obtained by the video camera; and a second portion connected to the first portion, the second portion comprising a stabilizer having aerodynamic surfaces, wherein the stabilizer is configured for achieving stable flight when the first and second portions are being towed behind an aircraft.

According to some embodiments, an apparatus comprises: an EFDR storing flight data for an aircraft during flight; a TITCS for being towed behind the aircraft, tacking and capturing the images of the aircraft; a ESDP for collecting warning signals and diagnosing if the aircraft is in a state of emergency; a plurality of sensors for collecting flight parameters indicative of a flight state for the aircraft; a pneumatic cylinder containing a piston, the EFDR and the TITCS; a HGEM, coupled to the piston, for quickly ejecting the EFDR and the TITCS together out of the aircraft when the aircraft is diagnosed as being in a state of emergency; two panels for covering the HGEM and the aircraft fuselage respectively; a SEP for pulling the EFDR out of the aircraft when the panel of the HGEM and the panel of the aircraft fuselage open; an airbag system; a sleeve adapted for covering the airbag subsystem before the EFDR is ejected from the aircraft; a data link for transmitting the flight parameters and the triggering signal for separating the EFDR from the aircraft; a plurality of detachable joints and pluggable connectors for connecting the aircraft, the EFDR and the TITCS for data transmission and separation of the EFDR and TITCS from the aircraft; a power module for providing power to the system; and a surface sealing mechanism (SSM), which is some embodiments uses high pressure gas, a raised edge and piston for filling the hole on the aircraft skin after lunching EFDR.

In some embodiments, the ESDP receives one or more warning signals from an aircraft signal source (for example a flight management computer, independent sensors, etc.) when the aircraft is not operating in a normal flight state. In some embodiments, when the ESDP receives more than one warning signals, the aircraft is diagnosed as being in an emergency state (for example an imminent crash, or explosion). In some embodiments, the sensors collect crucial parameters of flight state to determine if the aircraft is in an emergency (for example crash, explosion). In some embodiments, the pneumatic cylinder has an inwardly raised edge for preventing the piston from being ejected out of the aircraft and sealing the cylinder when HGEM is activated to release the EFDR and TITCS from the aircraft. In some embodiments, the pneumatic cylinder is covered by a panel which is closed by a lock during normal flight, wherein the panel is opened by a compressed torsion spring when the lock receives trigger signal. In some embodiments, the HGEM uses a gas tank as a high pressure gas source. In some embodiments, the gas of the HGEM is released by a valve that controlled by a trigger signal received via the data link. In some embodiments, the HGEM transfers the gas pressure through a piston, this piston has a raised edge on the bottom for keeping a certain distance between a piston head and a bottom of the housing. In some embodiments, the spring of the SEP is pre-loaded when the panels are closed. In some embodiments, the sleeve is configured to open during an inflation of the airbag subsystem, and wherein the opened sleeve separates from the EFDR. In some embodiments, the panel of the aircraft fuselage is locked by an actuator cylinder having a retractable plug, wherein the panel is opened by a spring when the actuator cylinder receives a trigger signal, thereby causing the plug to retract into the cylinder to allow the panel to open. In some embodiments, a data cable includes two pluggable units configured for being disconnected from the EFDR or the TITCS when a threshold tensile force is reached in the data cable. In some embodiments, one of the detachable joints provides a removable connection for the towed detachable cable of the TITCS, wherein the detachable joint includes: a data link connector for connecting a data cable of the TITCS, the data link connector configured for being detached from the data cable when a threshold tensile force is reached in the data cable; an annulus installation base for connecting a hollow rope or tube of the TITCS, and when a pilot sends an operation signal, the rope tube is disconnected from the annulus installation base; a fixed installation base for mounting the annulus installation base and the data link connector on the aircraft; an actuator cylinder with a plug for installing a fixed connector connecting the data cable to the annulus installation base and for providing a manual separation of the connector from the annulus installation base actuated on pilot command; and a pair of connectors for connecting the hollow rope or tube to the annulus installation base, wherein the connectors are configured to separate from the tube when a threshold tensile force is reached in the tube. In some embodiments, one of the detachable joints is a locking module. In some embodiments, the locking module is provided for connecting the SEP and the housing, wherein when the EFDR lands on the water, the locking module is unlocked, thereby separating the locking module from the housing, the locking module comprising: a ring on the end of a suspension line of the SEP and a plug in the EFDR for connecting the SEP with the EFDR; and an actuator cylinder in the EFDR for retracting the plug to thereby remove it from the ring and separate it from the SEP. In some embodiments, the power module can be charged continuously by an aircraft electric power supply system, during normal flight. In some embodiments, the power module provides power for the whole system independently, when the power supply system on the aircraft fails. In some embodiments, the apparatus comprises a water sensor for controlling the actuator cylinder when the EFDR lands on water. In some embodiments, the water sensor is mounted on a bottom of the housing which connects with the SEP, so that the sensor can touch water as soon as the EFDR lands on the water. In some embodiments, the surface sealing mechanism SSM will lock the sabot in the position to fill the launching hole to protect the laminar airflow in aircraft surface after inadvertent launching.

According to some embodiments, an apparatus for achieving a soft-landing and floatation for an ejected EFDR comprises: a housing for enclosing the EFDR, an inflation subsystem and a shock-absorbing filler material; inflatable airbags inflated by the inflation subsystems, wherein the airbags, when inflated are configured for contributing to the soft-landing and floatation for the ejected EFDR housing; a SEP for decelerating the ejected EFDR during descent through the atmosphere; and a sleeve that encloses the airbag subsystem and housing and is configured for being removed when the airbags are inflated.

In some embodiments, the housing defines a compartment for the EFDR, the inflation subsystem and the filler. In some embodiments, the housing including the filler material is configured for protecting the EFDR and the inflation subsystem from impact forces during landing. In some embodiments, a gas tank module of the inflation subsystem stores compressed gas. In some embodiments, the gas tank module is a multi-gas-tank arrangement. In some embodiments, the inflation subsystem includes valves that are opened to release gas from the gas tank. In some embodiments, an altitude sensor measures altitude data and transmits this altitude data to open the valves. In some embodiments, pipes transfer gas to the airbag subsystem. In some embodiments, the airbag subsystem is attached to an outside surface of the housing. In some embodiments, the airbag material is a high-strength material to prevent puncture and from prevent penetration of water. In some embodiments, the inflated airbag subsystem is configured to provide sufficient buoyancy for the housing EFDR and components within for floatation on or near the surface of water. In some embodiments, the airbags include a coating of shark repellent for protecting the housing and EFDR from being swallowed by sharks. In some embodiments, a SEP is connected to the housing for decelerating the ejected EFDR during a descent through the atmosphere.

According to some embodiment, a system for receiving and transmitting data comprises: a TITCS for transmitting tracking images and flight data to an EFDR; a module comprising the EFDR having nonvolatile memory for storing flight data and a processor, and two transponders for transmission of flight data, an SOS signal and a positioning signal under the control of the processor; and the module further comprising a positioning module for providing location coordinates for the module; wherein the system is configured for establishing data links, including: a first data link for wired transmission of the tracking images and flight data from the TITCS to the module; a second data link for wireless transmission of the tracking images from the TITCS to the module; and a third data link for transmitting and receiving among the module, a search and rescue aircraft, a ground control center and a cloud server.

In some embodiments, the first data link transmits flight data from an aircraft in an emergency state to the EFDR through the TITCS, before the EFDR has separated from the TITCS. In some embodiments, the second data link transmits flight data from the TITCS to the EFDR, after the EFDR has separated from the TITCS. In some embodiments, the third data link transmits flight data through a satellite to the cloud server, and transmits commands from the search and rescue aircraft and the ground control center to the EFDR. In some embodiments, the third data link is configured for instantaneously transmitting data, including a continuation of transmission from a point of interruption to improve data transmission efficiency and to prevent data loss between the module and the satellite. In some embodiments, one of the transponders is a radio beacon for broadcasting the SOS and positioning signal. In some embodiments, the other transponder is a data uploading antenna for transmitting flight data to the cloud server and receiving tracking images from the TITCS via the second data link. In some embodiments, the data uploading antenna is configured to begin transmitting data when the search and rescue aircraft receives the SOS signal from the radio beacon and transmits in response a command signal received by the module. In some embodiments, the data uploading antenna is controlled by the ground center once the third data link between the module and the control center is established. In some embodiments, the positioning module can be also automatically shut down when it cannot maintain a stable data connection with the satellite. In some embodiments, the positioning module provides a real-time location coordinate when it can maintain a stable data connection with the satellite. The positioning module provides last known location coordinate when it cannot maintain stable data connection with the satellite.

According to some embodiments, an apparatus for tracking and capturing images of an aircraft comprises: a towed detachable cable for connecting the TITCS to an aircraft and receiving data from the aircraft; a data cable connecting the TITCS to an EFDR and transmission of data from the TITCS to the EFDR; a multi-eyes video module comprising a plurality of cameras for capturing images of the aircraft when the TITCS is being towed behind the aircraft; a data processing and transmission module for image processing and data transmission; and a stabilizing parachute for stabilizing the flight attitude of the TITCS when towed behind the aircraft.

In some embodiments, a towed detachable cable connects the TITCS to the aircraft, towing the TITCS to track the aircraft. In some embodiments, the towed detachable cable includes a hollow rope or tube and a data link. In some embodiments, the multi-eyes video module captures images of the aircraft using one or more of the cameras. In some embodiments, a data processing and transmission module processes the images from the multi-eyes video module and transmits these images to the EFDR.

According to some embodiments, an apparatus for ejecting and separating the emergency flight data recorder (EFDR) and the tow-type image tracking and capturing system (TITCS)/the pull-type picture tracking and pick-up system includes sensors, an emergency situation diagnosis processor (ESDP), a high-pressure gas ejection module (HGEM) and a spring-loaded extraction parachute (SEP). The intelligent rapid ejection and separation system (IRESS) has its own power module. If the aircraft is in an emergency (for example crash, explosion), the HGEM is triggered. Then, the EFDR and the TITCS are ejected together by the HGEM from the aircraft rapidly. In an embodiment, the SEP is inflated or deployed (e.g., the parachute is exposed to air passing over the aircraft) thereby producing a transferring force that pulls the EFDR out of the aircraft together with the HGEM. During the process of ejecting the EFDR from the aircraft, the EFDR is preferably automatically separated from the TITCS. Alternatively, the TITCS can be separated from the aircraft manually or automatically. The EFDR is enclosed by a housing. After the EFDR lands on water, a locking module between the SEP and the housing is unlocked, thereby separating the SEP from the housing.

According to some embodiments, an apparatus providing a soft-landing for an emergency flight data recorder (EFDR) includes a housing, an airbag subsystem and a spring-loaded extraction parachute (SEP). When an aircraft is in a state of emergency (for example, a crash is imminent), the EFDR held by an emergency inflatable soft-landing system (EISS) is ejected from the aircraft together with a tow-type image tracking and capturing system (TITCS) or pull-type picture tracking and pick-up system. Then, the EFDR held by the EISS is separated from the TITCS. After that, a SEP decelerates the descent of the EFDR through the atmosphere. An airbag subsystem is inflated. The inflated airbag subsystem provides a function of soft-landing for the EFDR. In the event of a water landing the EISS, containing the EFDR, can float.

According to some embodiments, a system and apparatus for transmitting flight data and positioning signals includes three data links and several transmitters. Before an emergency flight data recorder (EFDR) is disconnected with a tow-type image tracking and capturing system (TITCS)/or pull-type picture tracking and pick-up system from an aircraft, flight data is transmitted from the aircraft to the EFDR through the TITCS. In an embodiment, images captured by the TITCS are transmitted to the EFDR and/or stored in the TITCS. The images can be transmitted to the EFDR wirelessly, after the EFDR is disconnected with the TITCS. After the ejected EFDR lands, a radio beacon mounted thereon broadcasts SOS and positioning signals. In order to save battery power or avoid a total loss of battery power due to ineffective or failed attempts at data transmission after a search and rescue ship or aircraft receives the SOS signal, the EFDR may then start to transmit flight data to a cloud server through a satellite. If a data link between the EFDR and the satellite is established, a ground control center can control the data transmission through the satellite.

According to some embodiments, an apparatus for image tracking and capturing includes a towed detachable cable, a multi-eyes module, a data processing and transmission module (DPTM) and a stabilizing parachute. When an aircraft is in an emergency state the TITCS is ejected from the aircraft and placed in towed behind the aircraft. The TITCS is used to track the aircraft and capture images of the aircraft. These images are processed and stored by the DPTM. In an embodiment, these images are transmitted to the emergency flight data recorder (EFDR).

In an embodiment, there is provided a system for rapid separation of a flight data recorder from an aircraft, and the system comprises a housing comprising an internal cavity and an opening; a panel coupled to the housing and configured to at least partially cover the opening of the housing when the panel is in a closed position; a spring that biases the panel toward an open position; a locking mechanism configured to retain the panel in the closed position and selectively release the panel to enable the panel to move toward the open position; a flight data recorder positioned within the internal cavity of the housing and configured to be ejectable from the housing through the opening of the housing; a pressurized gas source comprising a pressurized gas; an ejector slidably positioned internal to the housing; a valve configured to selectively fluidly couple the pressurized gas source to the ejector, wherein the valve comprises an open position and a closed position, wherein the valve in the closed position separates the pressurized gas from the ejector, and wherein the valve in the open position allows the pressurized gas to apply a force on the ejector to rapidly eject the flight data recorder from the housing; an extraction parachute coupled to the flight data recorder, the extraction parachute is a spring-loaded parachute, the spring-loaded parachute comprises a parachute spring that is held in a compressed configuration by the panel when the panel is in the closed position, the parachute spring is released from the compressed configuration when the panel is in the opened position to eject the extraction parachute from the aircraft, the extraction parachute adapted to expand during ejection to pull the flight data recorder from the aircraft; the flight data recorder adapted to cause the valve to move from the close position to the open position and to cause the locking mechanism to release the panel when the flight data recorder detects an emergency event; a landing mechanism coupled to the flight data recorder, the landing mechanism adapted to reduce impact forces during landing of the flight data recorder; and a wireless communication systems adapted to transmit data from the flight data recorder to at least one of a satellite, a second aircraft, and a base station. In an embodiment, the landing mechanism comprises a descent control parachute coupled to the flight data recorder, the descent control parachute adapted to reduce a descending rate of the flight data recorder. In an embodiment, the landing mechanism comprises an airbag system adapted to be inflated and to prevent the flight data recorder from sinking in water or to reduce the impact forces during landing.

In an embodiment, there is a provided a system for rapid separation of a flight data recorder from an aircraft, the system comprising a housing comprising an internal cavity and an opening; a flight data recorder positioned within the internal cavity of the housing and configured to be ejectable from the housing through the opening of the housing; an ejection system adapted to eject the flight data recorder when the flight data recorder detects an emergency event; a towing cable having a first end and a second end, wherein the first end is coupled to the housing or configured to be coupled to the aircraft, the second end of the towing cable coupled to the flight data recorder, the towing cable comprising a communications cable, the towing cable adapted to tether the flight data recorder to the aircraft for a period of time and decouple from the aircraft; a communication systems adapted to access data from the aircraft through the communications cable of the towing cable for storing the data in the flight data recorder; the flight data recorder adapted to cause the towing cable to decouple at the first or second ends based on detecting an impact event; and a landing mechanism coupled to the flight data recorder, the landing mechanism adapted to reduce impact forces during landing of the flight data recorder. In an embodiment, the landing mechanism comprises a descent control parachute coupled to the flight data recorder, the descent control parachute adapted to reduce a descending rate of the flight data recorder. In an embodiment, the landing mechanism comprises an airbag system adapted to be inflated and to prevent the flight data recorder from sinking in water or to reduce the impact forces during landing. In an embodiment, the impact event is based on a period of time or is based on detecting when the aircraft has impacted land or water.

According to some embodiments, a system for rapid separation of a flight data recorder from an aircraft comprises: a flight data recorder, said flight data recorder comprising a wireless communication hardware configured to communicate flight information to a remote device; an emergency detection system comprising a plurality of sensors for detecting flight parameters and at least one computer processor for analyzing the flight parameters and determining, based on the analysis, that an emergency event is occurring; a rapid ejection system, said rapid ejection system comprising a housing for storing the flight data recorder and a pneumatic system configured to eject the flight data recorder out of an opening in the housing and through the skin of the aircraft when the emergency detection system determines that the emergency event is occurring; and a soft landing system, said soft landing system being attached to the flight data recorder and configured to reduce force of impact upon landing and increase buoyancy of the flight data recorder; wherein the flight data recorder is configured to be separated from the aircraft and configured to receive and transmit flight information and images of the aircraft to the remote device immediately after the emergency event.

In some embodiments, the rapid ejection system further comprises an extraction parachute coupled to the flight data recorder. In some embodiments, the extraction parachute is a spring-loaded parachute. In some embodiments, the soft landing system comprises one or more inflatable airbags configured to be positioned about the flight data recorder when inflated. In some embodiments, the one or more inflatable airbags comprise at least: a first airbag configured to be annularly shaped when inflated; a second airbag configured to be annularly shaped when inflated; and a third airbag configured to be annularly shaped when inflated, the third airbag positioned between the first and second airbags. In some embodiments, the soft landing system comprises a descent control parachute coupled to the flight data recorder, the descent control parachute adapted to reduce a descending rate of the flight data recorder. In some embodiments, the system further comprises a detachment mechanism configured to detach the descent control parachute from the flight data recorder; and a sensor configured to detect a water landing, to enable the detachment mechanism to cause detachment of the descent control parachute after a water landing. In some embodiments, determining that the emergency event is occurring comprises determining that data received from each of at least two sensors exceeds a threshold level. In some embodiments, the system further comprises a tracking system stored within the housing of the rapid ejection system and adapted to be ejected with the flight data recorder out of the opening in the housing, the tracking device comprising at least one camera; and a towing cable having a first end and a second end, wherein the first end is coupled to the housing or configured to be coupled to the aircraft, wherein the tracking device is coupled to the second end of the towing cable, and the at least one camera of the tracking device is positioned to enable capturing of one or more images of the aircraft when the tracking device is towed behind the aircraft in flight by the towing cable. In some embodiments, the system further comprises the aircraft, wherein the housing of the rapid ejection system is coupled to the aircraft.

According to some embodiments, a system for rapid separation of a flight data recorder from an aircraft comprises: a housing comprising an internal cavity and an opening; a flight data recorder positioned within the internal cavity of the housing and configured to be ejectable from the housing through the opening of the housing; a pressurized gas source comprising a pressurized gas; an ejector slidably positioned internal to the housing; a valve configured to selectively fluidly couple the pressurized gas source to the ejector, wherein the valve comprises an open position and a close position, wherein the valve in the close position separates the pressurized gas from the ejector, and wherein the valve in the open position allows the pressurized gas to apply a force on the ejector to rapidly eject the flight data recorder from the housing; the flight data recorder adapted to cause the valve to move from the close position to the open position when the flight data recorder detects an emergency event; a landing mechanism coupled to the flight data recorder, the landing mechanism adapted to reduce impact forces during landing of the flight data recorder; and a wireless communication systems adapted to transmit data from the flight data recorder to at least one of a satellite, a second aircraft, and a base station.

In some embodiments, the landing mechanism comprises a descent control parachute coupled to the flight data recorder, the descent control parachute adapted to reduce a descending rate of the flight data recorder. In some embodiments, the descent control parachute is a spring-loaded parachute. In some embodiments, the descent control parachute is also adapted to apply a pulling force to the flight data recorder while the flight data recorder is being ejected from the housing. In some embodiments, the system further comprises an extraction parachute separate from the descent control parachute, the extraction parachute adapted to apply a pulling force to the flight data recorder while the flight data recorder is being ejected from the housing. In some embodiments, the system further comprises a detachment mechanism configured to detach the descent control parachute from the flight data recorder; and a sensor configured to detect a water landing, to enable the detachment mechanism to cause detachment of the descent control parachute after a water landing. In some embodiments, the landing mechanism comprises an airbag system adapted to be inflated and to prevent the flight data recorder from sinking in water or to reduce the impact forces during landing. In some embodiments, the airbag system comprises one or more inflatable airbags, the one or more inflatable airbags comprising at least: a first annular shaped airbag positioned at a first end of the airbag system; a second annular shaped airbag positioned at a second end of the airbag system; and a third annular shaped airbag positioned between the first and second annular shaped airbags. In some embodiments, the system further comprises the aircraft, wherein the housing is coupled to the aircraft. In some embodiments, the system further comprises a panel coupled to the housing and configured to at least partially cover the opening of the housing when the panel is in a closed position; a spring that biases the panel toward an open position; and a locking mechanism configured to retain the panel in the closed position and selectively release the panel to enable the panel to move toward the open position.

According to some embodiments, a system for quickly locating and retrieving flight data of an aircraft after an aircraft mid-air mishap comprises: a flight data recorder, said flight data recorder comprising wireless communication hardware configured to communicate flight information to a remote device; a tracking device comprising at least one camera and a data communication system; a rapid ejection system, wherein the rapid ejection system forms an opening in the aircraft in the event of an aircraft emergency and ejects the flight data recorder and the tracking device through the opening of the aircraft; a soft landing system, said soft landing system being attached to the flight data recorder and configured to reduce force of impact upon landing and increase buoyancy of the flight data recorder; a tow system, said tow system comprising a tether and data communication link, wherein the tether physically connects the tracking device to the aircraft after the mid-air mishap in a manner such that the tracking device follows the aircraft at a distance to capture images of the aircraft and the surrounding environment immediately after the mid-air mishap; wherein the tow system is configured to continue to transmit flight information from the aircraft to the tracking device via the data communication link for a period of time after the ejection of the tracking device; and wherein the tracking device transmits to the flight data recorder the flight information received from the aircraft after ejection and the images captured by the tracking device immediately following the mid-air mishap, and wherein the flight data recorder is configured to in turn transmit said flight information and images to the remote device.

In some embodiments, the data communication system of the flight data recorder is configured to transmit flight data and videos of the aircraft to the remote device. In some embodiments, the remote device comprises at least one of a satellite, a second aircraft, and a base station. In some embodiments, the rapid ejection system comprises a pressurized gas system. In some embodiments, the rapid ejection system comprises an extraction parachute coupled to the flight data recorder. In some embodiments, the rapid ejection system comprises: a panel that covers the opening prior to ejection; a spring that biases the panel toward an open position; and a locking mechanism configured to retain the panel in a position covering the opening and selectively release the panel to enable the panel to move toward the open position. In some embodiments, the flight data recorder is connected to the tracking device via the tow system for a period of time after ejection from the aircraft. In some embodiments, the tow system comprises at least one detachable connector, said detachable connector can be actuated to disconnect the tracking device from the aircraft in the event the rapid ejection system is triggered accidentally. In some embodiments, the opening in the aircraft can be closed in the event the rapid ejection system is triggered accidentally. In some embodiments, the soft landing system comprises a plurality of inflatable airbags.

According to some embodiments, a system for quickly locating and retrieving flight data of an aircraft after an aircraft mid-air mishap comprises: a flight data recorder; a tracking device comprising at least one camera and a data communication system, wherein the tracking device and flight data recorder are configured to be ejected from the aircraft immediately after the mid-air mishap; a tow system, said tow system comprising a tether and data communication link, wherein the tether physically connects the tracking device to the aircraft after the mid-air mishap in a manner such that the tracking device follows the aircraft at a distance to capture images of the aircraft and the surrounding environment immediately after the mid-air mishap; wherein the tow system is configured to continue to transmit flight information from the aircraft to the tracking device via the data communication link for a period of time after the ejection of the tracking device; wherein the tracking device transmits to the flight data recorder the flight information received from the aircraft after ejection and the images captured by the tracking device immediately following the mid-air mishap; and a soft landing system, said soft landing system being attached to the flight data recorder and configured to reduce force of impact upon landing and increase buoyancy of the flight data recorder.

In some embodiments, the soft landing system comprises one or more inflatable airbags. In some embodiments, the soft landing system comprises one or more descent control parachutes coupled to the flight data recorder and adapted to reduce a descending rate of the flight data recorder. In some embodiments, the system further comprises a rapid ejection system comprising a pneumatic piston configured to eject the flight data recorder and tracking device from the aircraft. In some embodiments, the tow system further comprises one or more parachutes coupled to one or more of the flight data recorder and the tracking device, the one or more parachutes configured to provide a drag force that tends to extend the tether.

According to some embodiments, a system for rapid separation of a flight data recorder from an aircraft comprises: a housing comprising an internal cavity and an opening; a flight data recorder positioned within the internal cavity of the housing and configured to be ejectable from the housing through the opening of the housing; an ejection system adapted to eject the flight data recorder when the flight data recorder detects an emergency event; a towing cable having a first end and a second end, wherein the first end is coupled to the housing or configured to be coupled to the aircraft, the second end of the towing cable coupled to the flight data recorder, the towing cable comprising a communications cable, the towing cable adapted to tether the flight data recorder to the aircraft for a period of time and decouple from the aircraft; a communication system adapted to access data from the aircraft through the communications cable of the towing cable for storing the data in the flight data recorder; the flight data recorder adapted to cause the towing cable to decouple at the first or second ends based on detecting an impact event; and a landing mechanism coupled to the flight data recorder, the landing mechanism adapted to reduce impact forces during landing of the flight data recorder.

In some embodiments, the landing mechanism comprises a descent control parachute coupled to the flight data recorder, the descent control parachute adapted to reduce a descending rate of the flight data recorder. In some embodiments, the landing mechanism comprises an airbag system adapted to be inflated and to prevent the flight data recorder from sinking in water or to reduce the impact forces during landing. In some embodiments, the impact event is based on a period of time. In some embodiments, the impact event is based on detecting when the aircraft has impacted land or water.

For purposes of this summary, certain aspects, advantages, and novel features of the inventions are described herein. It is to be understood that not necessarily all such advantages may be achieved in accordance with any particular embodiment of the inventions. Thus, for example, those skilled in the art will recognize that the inventions may be embodied or carried out in a manner that achieves one advantage or group of advantages as taught herein without necessarily achieving other advantages as may be taught or suggested herein.

BRIEF DESCRIPTION OF THE DRAWINGS

The foregoing and other features, aspects, and advantages of the present disclosure are described in detail below with reference to the drawings of various embodiments, which are intended to illustrate and not to limit the disclosure. The features of some embodiments of the present disclosure, which are believed to be novel, will be more fully disclosed in the following detailed description. The following detailed description may best be understood by reference to the accompanying drawings wherein the same numbers in different drawings represents the same parts. All drawings are schematic and are not intended to show any dimension to scale. The drawings comprise the following figures in which:

FIG. 3A' is an end view of the embodiment of FIG. 3A.

FIGS. 6A-6F illustrate an example ejection sequence for an embodiment of an ejectable flight data recorder system;

FIGS. 7A-7H illustrate another embodiment of an ejectable flight data recorder system.

DETAILED DESCRIPTION

Figure 1:
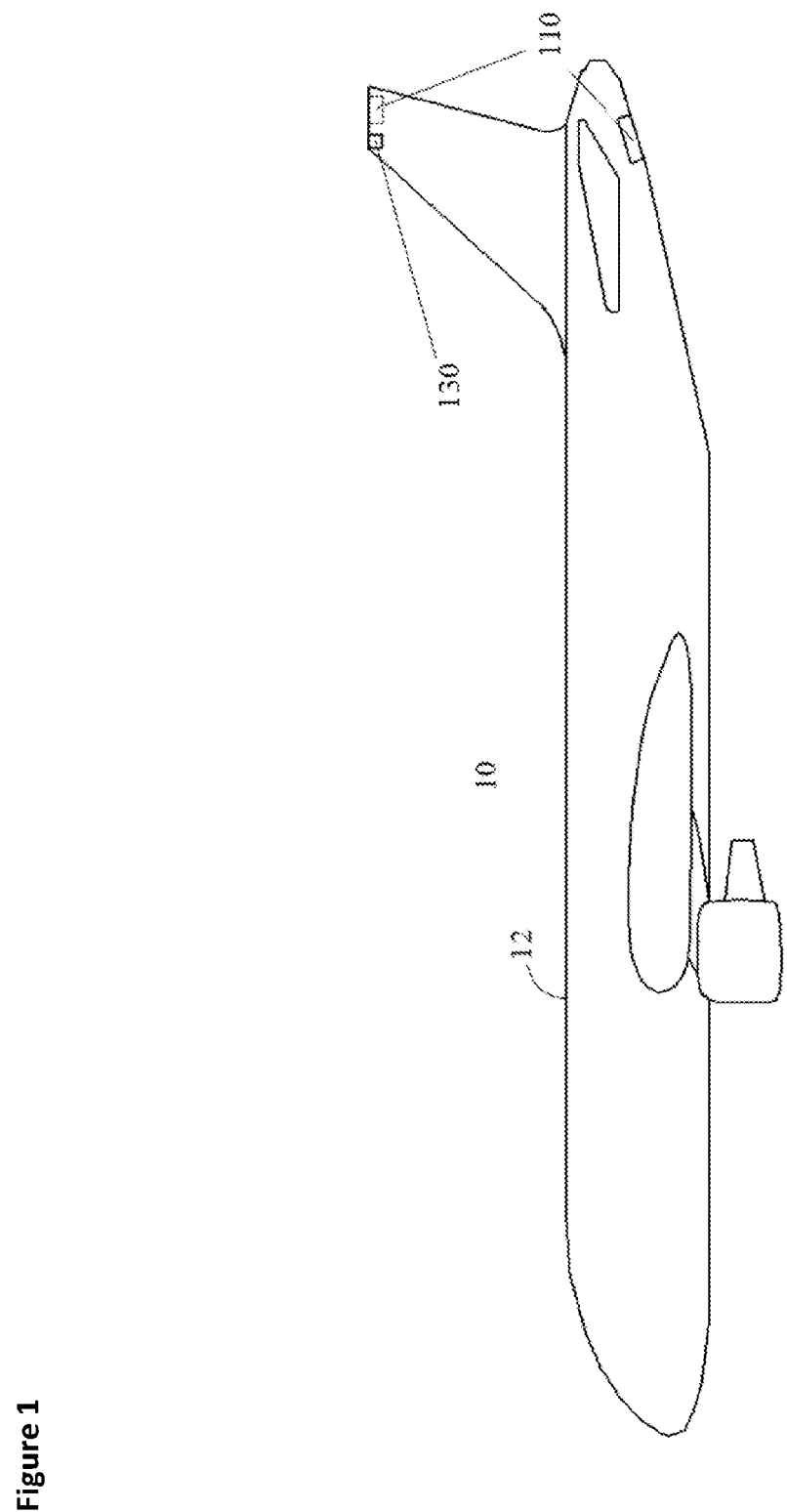
FIG. 1 is a simplified illustration of an aircraft, showing possible locations at which an IRESS, EISS, detachable joint, and/or TITCS may be mounted according to some embodiments of the present disclosure.

Although several embodiments, examples, and illustrations are disclosed below, it will be understood by those of ordinary skill in the art that the inventions described herein extend beyond the specifically disclosed embodiments, examples, and illustrations and include other uses of the inventions and obvious modifications and equivalents thereof. Embodiments of the inventions are described with reference to the accompanying figures, wherein like numerals refer to like elements throughout. These drawings are considered to be a part of the entire description of some embodiments of the inventions. The terminology used in the description presented herein is not intended to be interpreted in any limited or restrictive manner simply because it is being used in conjunction with a detailed description of certain specific embodiments of the inventions. In addition, embodiments of the inventions can comprise several novel features and no single feature is solely responsible for its desirable attributes or is essential to practicing the inventions herein described.

Generally, a flight data recorder, also known as a "black box," is used to record data representing the flight state of an aircraft. In the event of an aircraft mishap, the conventional flight data recorder goes down with the plane and emits distress signals for 30 days. It typically stores 30-minutes of cockpit voice dialogue and two-hours of flight data before the crash. However, when the plane goes down at sea the sonar signal emitted from the black box only transmits several kilometers, therefore requiring a rather definitive search area, which is often difficult in sea crashes. If the black box becomes covered in seabed sludge (or heavy snow, in the case of a mountainside crash), distress signals are weak and hard to detect, making it difficult to locate the crash site in a timely manner for rescue. On occasion, an aircraft fitted with a flight data recorder may be lost in a deep ocean trench. It can be very difficult to locate the aircraft and/or determine the cause of the accident in this situation. The reason can be predominantly that flight data recorders are fixed on the aircraft. As such, they do not separate from the submerged aircraft and float near the surface. For this and other reasons, there can be a need for an ejectable emergency flight data recorder that can separate from an aircraft in flight before or during or after an emergency (for example, shortly before, or during, or immediately after a crash or explosion). This will provide greater access to flight data during the emergency, which can be very useful to investigate the accident cause and consequently prevent or decrease the risk of future catastrophes. There can also be a need for a system that can provide more immediate access to flight conditions during an emergency and/or to locate the plane and/or flight data utilizing wireless data decoding, data transmission, and positioning technologies.

In response to these and other needs, the present disclosure describes various embodiments of systems and methods for intelligently and rapidly ejecting a flight data recorder and/or other devices from an aircraft in an emergency situation, ensuring a soft and/or survivable landing for an ejected device, capturing external images and/or video of an aircraft in an emergency situation at a distance away from the aircraft, continuing to track or log flight data of an aircraft in an emergency situation after ejection of an ejectable flight data recorder, transmitting logged data to a remote system prior to an ejected device being recovered, and/or transmitting signals that help in the efficient recovery of an ejected device.

In some embodiments, an ejectable flight data recorder system is configured to analyze one or more signals received from sensors, flight computers, manual inputs, other data and/or inputs, and/or the like to determine whether an aircraft is in an emergency situation that is likely to cause loss and/or crashing of the aircraft. In some embodiments, the system comprises an ejectable flight data recorder that stores a copy of logged flight data and is configured to be rapidly ejected from the aircraft upon a determination (for example, going below, reaching, and/or going above certain threshold levels or combination of certain threshold levels) that the aircraft is in an emergency situation. This rapid ejection may occur in various manners using one or more methods of ejection. In some embodiments, it is desirable for the rapid ejection to occur as a combination of at least two different ejection mechanisms. For example, a spring-loaded parachute (or other type of parachute or pilot parachute) may be attached to a component of the ejectable flight data recorder system and expelled from the aircraft, thus helping to pull the attached component of the flight data recorder system out of the aircraft. As another example, a piston or other ejector may be positioned behind or adjacent to the flight data recorder or a component of the flight data recorder system and configured to push the component out of the aircraft, such as under the pressure of a high-pressure gas, hydraulic fluid, and/or the like. Although in some embodiments only a single method of ejection is utilized, it can be desirable to use more than one, in this case one pulling method and one pushing method, to ensure a fast and full ejection of the ejectable components. In many emergency situations, the available time to safely eject a flight data recorder is minimal (for example, 1 second, 2 seconds, 3 seconds, 4 seconds, 5 seconds, 6 seconds, 7 seconds, 8 seconds, 9 seconds, 10 seconds, 20 seconds, 30 seconds, 40 seconds, 50 seconds, 60 seconds, 2 minutes, 3 minutes, 5 minutes; 10 minutes; 15 minutes, 20 minutes or the like), such as when an aircraft is in the process of experiencing an explosion. Accordingly, it can be critical in some situations to ensure a fast ejection and/or separation of the ejectable flight data recorder from the aircraft. Using a system that comprises at least two different methods of ejection or separation can help to increase the speed of the ejection or separation and/or provide redundancy to ensure a full ejection or separation.

One problem encountered in designing a system for rapid ejection of a flight data recorder (and/or other components) from an aircraft is that the skin of the aircraft may need to be breached in some embodiments. It can be desirable, however, to have no or minimal effect on the aerodynamic properties of the aircraft skin prior to ejection, and in some cases also after ejection. Since an ejectable flight data recorder system may only be intended to be used in an emergency situation, such as a situation when the aircraft is going to be lost and will never be put into service again, it may not matter in some situations that a hole is created in the skin of the aircraft when the data recorder is ejected. However, there is a possibility in some cases of an accidental ejection or potentially an ejection after which the emergency situation ceases to exist and the aircraft recovers to normal flight. In those cases, it can be desirable to ensure the ejection of the data recorder has no or minimal effect on the flight capability of the aircraft after ejection. In some embodiments, this concern is addressed by strategically positioning the flight data recorder system in a low stress location and/or a location where disrupting the smooth surface of the aircraft skin would have minimal effect on aerodynamic properties. For example, an ejectable flight data recorder may be positioned in the tail of the aircraft, or in other locations. Further, in some embodiments, it can be desirable to limit the size of opening needed to eject the flight data recorder to be relatively small, and thus to have less effect on aerodynamic properties of the aircraft. For example, in some embodiments, the ejectable flight data recorder system is configured to fit within a relatively small diameter cylindrical tube that requires only a relatively small circular opening in the aircraft skin to be created for ejection of the data recorder.

In some embodiments, an ejectable flight data recorder device is configured to break through the skin of the aircraft upon ejection. For example, the skin of the aircraft may comprise a region having one or more reduced strength areas or stress risers that enable a predetermined portion or section of the skin to break out when the flight data recorder device is ejected therethrough. In some embodiments, instead of breaking through the aircraft skin, the system is designed to have a hatch, panel, and/or the like that is selectively releasable from the aircraft skin and/or selectively moveable with respect to the aircraft skin. In some embodiments, such a panel may comprise one or more locking devices and or sealing mechanisms that retain the panel and/or seal in place during normal flight, but that rapidly release the panel upon requiring an ejection. In some embodiments, the panel is spring-loaded to cause the panel to be rapidly separated from and/or swing away from an opening through which the ejected flight data recorder will pass. Such a spring-loaded system may enable the panel to more quickly move out of the way of the flight data recorder when the flight data recorder is being rapidly ejected. In some embodiments, the panel is configured to re-close or move back into its original position after ejection, thus minimizing or eliminating any effect the ejection opening may have had on the aircraft's aerodynamic properties.

In some embodiments, the ejectable flight data recorder system is configured to be adjacent or positioned near or coupled to an interior surface of the skin of the aircraft, and the skin of the aircraft can be the only surface or structure that needs to be breached by the ejectable component or components when it is or they are ejected. For example, an ejectable flight data recorder may be positioned within a housing having an open end, with that open end being positioned adjacent an interior surface of the aircraft skin. However, in other embodiments, it may be desirable to have an additional panel or surface through which the ejectable components need to pass before passing through the aircraft skin. For example, an ejectable flight data recorder may be positioned within a housing having an opening at one end, and that opening may be covered by a panel, cover, shield, and/or the like. The housing and cover may then be positioned adjacent an interior surface of the aircraft skin, and upon ejection, both the aircraft skin and the end cover of the housing will need to be breached. Either or both surfaces may be breached by breaking through them, a removable panel being removed, a hingedly attached panel moving or rotating out of the way, and/or the like. One reason it may be desirable to have two surfaces through which the ejectable components need to pass is that an ejectable flight data recorder system may be manufactured more efficiently as an individual module or system that is self-contained and can then be mounted to the aircraft. For example, particularly in an embodiment where a spring-loaded parachute is located within the housing of the flight data recorder system, it may be complicated to install such a system in an aircraft if a panel, shield, and/or the like is not used to keep that spring-loaded parachute compressed before ejection and/or before installation into the aircraft. Further, it may be desirable to keep the ejectable flight data recorder, spring-loaded parachute, and/or other components contained within a housing, and not able to contact the interior surface of the aircraft skin during normal flight, since something that contacts the interior surface of the aircraft skin may eventually damage or cause wear to the aircraft skin due to normal flight turbulence, vibrations, accelerations, and/or the like.

In some embodiments, in addition to the desirability of rapid ejection of a flight data recorder from an aircraft in an emergency situation, it can be desirable to continue to track or log data relating to the aircraft after the flight data recorder has been ejected. For example, in some embodiments, the aircraft may comprise a wireless transmitter that is configured to wirelessly transmit (or a transmitter for wired communications to transmit) additional logged data to the ejected flight data recorder. The flight data recorder may comprise a wireless receiver or other receiver that receives this transmitted data while the ejected flight data recorder is descending to the surface. In some embodiments, this wireless transmitter is contained within or about the aircraft and is not ejected from the aircraft. In some embodiments, however, this wireless transmitter (or another wireless transmitter) may be included in a portion of the ejectable flight data recorder system that is also ejected from the aircraft along with the flight data recorder that descends to the surface. For example, some embodiments of ejectable flight data recorder systems as disclosed herein comprise a tracking device that is ejected from the aircraft and remains coupled to the aircraft, for at least a portion of time, by a tow cable that tows the tracking device behind the aircraft. In some embodiments, the tow cable comprises a data cable portion or line that is able to transmit data to and/or from the aircraft to the tracking device while the tracking device is being towed behind the aircraft. In an embodiment, the data cable portion or line can be configured to transmit data from the tracking device to the aircraft, wherein the aircraft is configured to transmit via other communication systems the data to a system that is external to the aircraft, such as a satellite or antenna or base station. The tracking device can then transmit that data wirelessly to the ejected flight data recorder. One benefit of transmitting the data from this towed tracking device instead of directly from the aircraft is that the aircraft, since it is in an emergency situation, may be incapable of transmitting the data. Another benefit is that the tracking device may be able to more efficiently and/or more effectively wirelessly transmit the data, since the tracking device is being towed behind the aircraft, away from potential interference sources. Further, in some embodiments, the towed cable may comprise at least a portion of the transmission antenna, enabling a relatively long and/or large antenna to be used.

In some embodiments, it may additionally be desirable to enable capturing of images and/or videos of the aircraft and/or the surrounding environment while the aircraft is experiencing the emergency situation. Accordingly, some embodiments may comprise a towed tracking device (similar to as mentioned above), and that towed tracking device may comprise one or more cameras or other detectors, such as thermal imaging systems, x-ray imaging systems, and/or the like which enable external capturing of data about the aircraft and/or the surrounding environment. This data captured externally by the tracking device may then be transmitted wirelessly to the ejected flight data recorder as the flight data recorder descends to the surface. Although many embodiments disclosed herein describe the towed tracking device as wirelessly transmitting data to the ejected flight data recorder, in some embodiments, the ejected flight data recorder and towed tracking device may, for at least a period of time, be coupled via the same or a different tow cable that enables wired communication between the tracking device and the ejected flight data recorder. The flight data recorder may then, at an appropriate time, separate from the towed tracking device and begin its descent to the surface.

In some embodiments disclosed herein, an ejected flight data recorder comprises one or more features that enable a soft and/or survivable landing on water and/or ground. For example, a flight data recorder may comprise one or more parachutes configured to stabilize and/or slow the descent of the ejected device. At least one parachute may be configured as a pilot parachute that helps to pull the flight data recorder out of the aircraft upon ejection. That pilot parachute may also be configured to help control the descent of the flight data recorder after ejection. One or more additional parachutes may also be configured to help control the descent, and those parachutes may, for example, be configured to deploy after the flight data recorder has been ejected from the aircraft, instead of before ejection like the pilot parachute. Further, as described below, some embodiments may comprise one or more inflatable airbag systems that perform one or more functions, such as, for example, generating a larger surface area to slow the descent of the device, absorbing impact upon contact with the surface, and/or helping the device to remain afloat in the case of a water landing. Further, in some embodiments, the ejectable flight data recorder device may comprise one or more types of shock absorbing fillings, coverings, structures, and/or the like that help to absorb shock when the device impacts the surface. Such fillings, coverings, structures, and/or the like may also help to absorb any shock created by the rapid ejection of the device from the aircraft.

In some embodiments, an ejectable flight data recorder system as disclosed herein comprises one or more features that enable transmission of logged data to a remote device prior to the ejected flight data recorder being recovered. For example, the ejected flight data recorder device may comprise one or more transmitters configured to transmit logged data to a satellite, other aircraft, one or more ground stations, and/or the like while the flight data recorder is descending and/or after the flight data recorder has landed. Further, in some embodiments, the ejected flight data recorder device may comprise one or more geolocation sensors, such as GPS, GLONASS, inertia-based systems, and/or the like, which enable the ejected flight data recorder to determine or estimate its present and/or future location (e.g., an estimated landing location and/or flight path while the device is still descending). The system can be configured to transmit to this determined or estimated data to similar remote devices, such as satellites, other aircraft, ground stations, and/or the like, to enable more efficient recovery of the ejected flight data recorder. In some embodiments, the system can be configured to operate for an extended period of time by, for example, detecting when its transmissions are being received or not received, and automatically disabling transmissions and/or reducing a frequency of transmissions when the device detects that its transmissions are not being received or are not consistently or reliably being received by a remote system. For example, the ejected flight data recorder device may comprise a receiver that wirelessly receives confirmation data from a satellite, other aircraft, ground station, and/or the like. This received confirmation data may help the flight data recorder to determine whether and at what frequency to transmit additional data and/or to retransmit data.

Various embodiments will be described below with reference to the accompanying figures. Some of the embodiments include one or more features and/or benefits, such as, for example, rapid ejection, continuing to log data and/or images after ejection, enabling a soft and/or survivable landing, transmitting logged data and/or position information to a remote device, and/or the like. For simplicity in describing these embodiments, some embodiments are described with reference to and/or the drawings and description focus on only one of these features or advantages, or a subset of these features or advantages. The various features of the individual embodiments disclosed herein may be combined, however, with features of other embodiments disclosed herein, and such resulting embodiments are considered part of the disclosure.

FIG. 1 depicts an aircraft 10 illustrated in simplified side elevation and is shown to illustrate some possible locations 110 where various embodiments of ejectable systems as disclosed herein can be positioned in an aircraft 10. A possible first location is generally at the rear part of the aircraft fuselage 12 and a possible second location is at the backward portion of the tip of the vertical tail. FIG. 1 also shows the possible location 130 where sensors can be implemented in an aircraft 10. The location 130 is generally at the forward portion of the tip of the vertical tail. Although FIG. 1 illustrates some desirable locations, other locations may be utilized. One factor in determining a desirable location may be choosing a location where ejected components are not likely to impact another portion of the aircraft. Another factor in determining a desirable location may be choosing a location where breaching the skin of the aircraft will have little or no effect on the aerodynamic properties of the aircraft, such as laminar flow of air across the aircraft skin.

Intelligent Rapid Ejection and Separation System (IRESS)

Figure 2A:
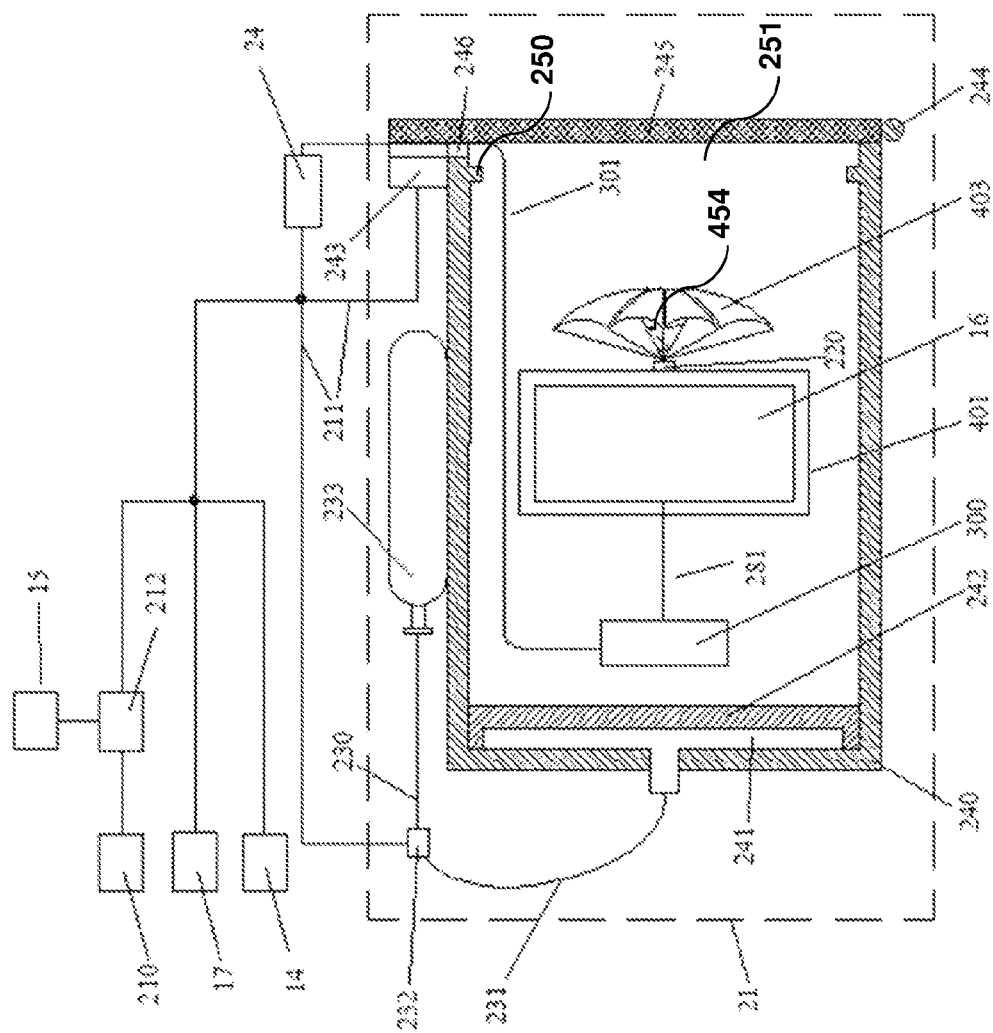
FIG. 2A is a lateral view in cross-section of a HGEM according to some embodiments of the present disclosure.

FIG. 2A, shows lateral views of an embodiment of a high-pressure gas ejection module (HGEM) 21 for ejecting an emergency flight data recorder (EFDR) 16 and a tow-type image tracking and capturing system (TITCS) 300 from the aircraft. Warning signals from a signal source 210 of the aircraft (for example a flight management computer) can be sent to an emergency situation diagnosis processor (ESDP) 212, when the aircraft is not in a normal flight state. When the ESDP 212 receives one or more certain types or sequences of warning signals, the aircraft can be diagnosed as being in a state of emergency (hereinafter an "emergency state," for example, a crash is imminent, an explosion has, or is about to take place, and/or the like). The HGEM 21 can be activated by the ESDP 212. Alternatively, a pilot may send operational signals directly from the cockpit 17, independent of the signals received and diagnosis by the ESDP, if the pilot decides it necessary to activate the HGEM 21 or to separate the TITCS. If flight parameters received from sensors 14 reach critical values, the HGEM 21 can additionally be activated.

In emergency situations the aircraft can sometimes regain a stable and safe flight state. In this case and after release of the towed cable 301 has taken place, pilot can separate the towed cable 301 from the aircraft manually, such as to avoid any effect of the towed system on the aircraft. In an embodiment, the towed cable 301 can be released, manually or otherwise, at either end of the towed cable 301 or the towed cable 301 can separate at any point between either end of the towed cable 301. In an embodiment, the towed cable 301 can be attached or coupled to a tracking system, such as TITCS, or the towed cable 301 can be attached to a flight data recorder system, such as the EFDR. In an embodiment, the towed cable 301 can be attached or coupled to a housing 240 or to any part of the aircraft.

If the aircraft is in an emergency state, the ESDP 212 or the sensors 14 can send a signal through the signal cable 211 to open a high pressure gas valve or other valve 232. In opening the valve 232, a high-pressure gas tank 233 can be configured release compressed gas through pipes 230 and 231 into a compartment 241, for pushing a piston or other ejector 242 forward (left to right in FIG. 2A). The compartment 241 can be an air cavity, which can comprise a pneumatic cylinder or housing 240 and a piston 242. When the piston is pushed forward the TITCS 300 and the EFDR 16 can be both ejected from the aircraft 10. At the same time, a spring loaded extraction parachute (SEP) 403 ejects out of the cylinder by its own spring 454 and can be inflated by air to pull the EFDR 16 out of the aircraft 10 rapidly (such as in less than 0.5 seconds). Accordingly, the pushing action of the piston 242 and the pulling action of the parachute 403 can work together to effect a rapid ejection of the devices from the aircraft, and/or to provide redundancy in case one of the ejection mechanisms fails. Further, although this embodiment uses a pneumatic piston and a spring-loaded parachute for ejection, other embodiments may use additional, fewer, and/or different ejection mechanisms in any combination. Some examples are a hydraulic piston, a piston that moves in response to an explosion or combustion, springs, gravity, suction from a low pressure area generated by air flowing across the aircraft, and/or the like.

With further reference to FIG. 2A, an inwardly raised edge 250 (e.g., lip, stop surface, protrusion, and/or the like) can be provided on the top of the pneumatic cylinder 240 (e.g., adjacent or near an opening 251 of the cylinder 240). This raised edge 250 prevents the piston 242 from being ejected out of the aircraft 10 (or through or beyond the opening 251). The EFDR 16 can be connected with the TITCS 300 by a data cable 281. The aircraft 10 can be connected with the TITCS 300 by a towed cable 301. Flight data can be transmitted from the aircraft 10 to the EFDR 16 through towed cable 301 and data cable 281. The towed cable 301 goes inside the pneumatic cylinder 240 through a concave hole 246 on the top of the pneumatic cylinder 240 (although the cable 301 may enter the cylinder 240 in other ways in other embodiments). During normal flight, the opening 251 of the pneumatic cylinder or housing 240 can be covered at least partially by a panel 245. A lock 243 can be located outside the pneumatic cylinder 240 and configured to keep the panel 245 in a closed position or configuration (e.g., covering the opening 251 and/or remaining in contact with an end surface of the housing or cylinder 240).

When the ejection system can be activated, the lock 243 receives signal from the ESDP 212 and operates to unlock the panel 245, enabling movement of the panel 245 from the closed position or configuration to an open position or configuration (e.g., not covering the opening 251 and/or not in contact with an end surface of the housing or cylinder 240). A torsion spring 244 can be located on the panel 245 to bias the door 245 in the open position, thus providing a force for opening the panel 245 quickly or rapidly when the lock 243 can be released. Other mechanisms of biasing the panel 245 to the open position and/or forcing the panel 245 to move toward the open position may be used, such as a compression spring, a high pressure gas, an explosive charge, an electromagnetic force, and/or the like. A locking module 220 can be used to connect the SEP 403 and the housing 401. When the EFDR 16 lands on the water or on the ground, the locking module 220 can be desirably unlocked, thereby the SEP 403 can be separated or allowed to separate from the housing 401. Additional details of such an embodiment are given below with reference to FIGS. 5B and 5C.

The embodiment of FIG. 2A further comprises an independent power module 15, which can provide electrical power to power instruments, processors, sensors and actuators of the IRESS in the event aircraft power fails. During normal flight, the power module 15 can be charged continuously by an aircraft electric power supply system.

In the embodiment of FIG. 2A, parachute 403 is a spring-loaded parachute and/or comprises a spring 454 that is in a compressed state prior to activation of the ejection sequence, but that helps to eject the parachute 403 from the aircraft and/or to inflate the parachute 403 when the panel 245 is opened. In some embodiments, panel 245 holds the parachute 403 and spring 454 in the compressed configuration. In some embodiments, another feature of the system holds the parachute 403 and spring 454 in the compressed configuration.

Figure 2B:
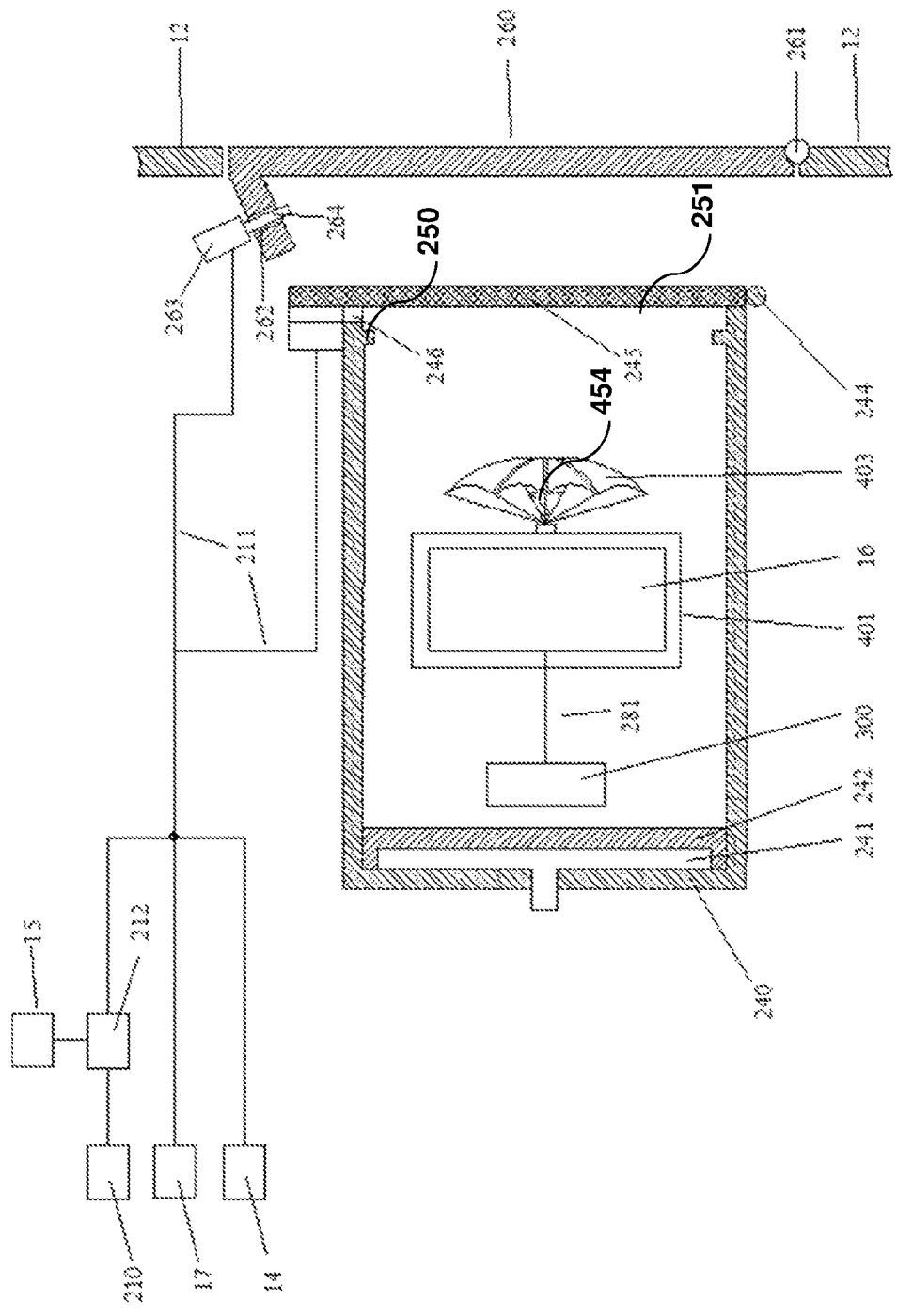
FIG. 2B is a sectional view of an embodiment showing the panels of the HGEM and aircraft fuselage.

FIG. 2B, shows a cross section of an embodiment similar to the embodiment of FIG. 2A, but also including a selectively openable panel 260 located on the aircraft fuselage or skin. When the aircraft is in an emergency, the ESDP 212 can send a signal to activate an actuator cylinder 263 through a signal cable 211. This signal causes a plug 264 (operated by a pneumatic cylinder 263, or other type of lock actuator) to be removed from a plug hole 262. The panel 260, which can be mounted on the aircraft fuselage, or other portion of the aircraft, connects to an internal torsion spring 261. When the panel 260 is closed, the internal torsion spring 261 can be tightened. When the plug 264 is removed from the hole 262, which movement moves the plug 264 back into the actuator cylinder 263, the fuselage panel 260 can automatically open due to the mechanical energy released by the internal torsion spring 261. As with the panel 245 described above, various mechanisms of forcing or biasing the panel 260 to the open position may be used in addition to or in lieu of a torsion spring. Further, since the panel 260 is exposed to the outer surface of the aircraft skin, it may be desirable in some embodiments, to have a smooth outer surface with no or minimal protrusions. Accordingly, although FIG. 2B illustrates the torsion spring and hinge 261 as protruding somewhat from the outer surface of the aircraft skin (in the rightward direction as oriented in FIG. 2B), it may be desirable to utilize a hinge and/or torsion spring configuration that is hidden below or behind the outer surface, thus not affecting the aerodynamic properties of the aircraft during normal flight.

It can also be desirable in some embodiments to minimize the size of the opening through which the ejectable flight data recorder will pass in the aircraft fuselage 12, and/or in the housing 240, to help minimize any effect on the aerodynamic properties of the aircraft after the panels 260 and/or 245 have opened. For example, the panels 245, 260 may each be configured to cover an opening in the housing 240 and/or fuselage 12 that comprises a diameter no larger than 40 cm. In other embodiments, a desirable opening size may be, for example, approximately, exactly, or no greater than 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 50, 60, 70, 80, 90 cm. In some embodiments, the components intended to be ejected out of the housing 240 may be designed to be relatively long and slender in design, thus enabling the opening through which they pass to be smaller. For example, one or more of the parachute 403 data recorder 16, housing 401, and/or towed tracking device 300 may be cylindrical in shape and/or may be positioned within a cylindrically shaped housing that is configured to pass through the openings covered by the panels 245, 260.

In some embodiments, the size of the opening is at least partially dependent on the location of the opening in the aircraft. For example, if the opening is positioned at a top of the vertical stabilizer of the aircraft (e.g., upper position 110 of FIG. 1), the opening may need to be smaller than if the opening were positioned at lower position 110 of FIG. 1, where the aircraft fuselage is wider. As another example, some locations may allow for a larger opening before the opening has a greater than negligible effect on the aircraft's aerodynamic properties and/or stress levels in the aircraft fuselage and/or skin. In some embodiments, the size of the opening may be at least partially dependent on a desired size of the extraction or pilot parachute that is configured to help pull the flight data recorder and/or other components out of the aircraft. It should be noted, however, that in some embodiments the compressed or pre-deployment size of the parachute can be configured to fit within a variety of sizes of housings and/or to fit through a variety of sizes of openings. In some embodiments, an expanded size of the pilot or extraction parachute is configured to enable production of a sufficient force (for example, a tension force in an attached cable) to pull the flight data recorder and/or other components out of the aircraft. In some embodiments, the parachute is configured to produce a sufficient force to pull the flight data recorder and/or other components out of the aircraft when the aircraft is flying at a speed less than a normal flight speed (for example, a typical cruising speed for a particular aircraft). This may be desirable, for example, because in an emergency situation, the aircraft may not always be flying at a normal flight speed.

It can also be desirable in some embodiments to have at least one of the panels 245, 260 be configured to re-close after ejection of the flight data recorder. By reclosing the panel, any temporary effect on the aerodynamic properties of the aircraft fuselage will be minimized or eliminated after the panel or panels have re-closed. In some embodiments, the reclosing is automatic, meaning no manual input or user intervention, such as by the pilot, is required. For example, the panels may be positioned in a way that gravity and/or forces from air passing by the plane as it travels in a forward direction cause the panel or panels to be forced closed after the flight data recorder has been ejected. As another example, the mechanism used to open the panel, such as torsion spring 261, 244, may be a reversible mechanism that reverses and biases the panels closed after the flight data recorder has been ejected. As another example, the panels may be connected to an actuator comprising a motor, ball screw, lead screw, pneumatic cylinder, hydraulic cylinder, and/or the like that actively opens and/or closes the panel. For example, one or more pneumatic cylinders may be used to open and/or close the panels 245, 260, in addition to or in lieu of torsion springs 244, 261. These pneumatic cylinders may operate using the same pressurized gas source as piston 242 or a different pressurized gas source. In some embodiments, the pneumatic cylinder or cylinders can be configured to rapidly open the panel or panels, and after the ejectable components have been ejected, the cylinders may reverse stroke and close the panel or panels. In some embodiments, the actuator acts automatically to reclose the panel after opening. However, in some embodiments, the actuator used to reclose the panel may be manually operated, such as by a switch or button the pilot can control. This may be desirable in some embodiments, since if a real emergency is occurring it may not matter that the panel is re-closed, but in the case of an inadvertent ejection, it may be desirable to re-close the panel. In that case, the pilot could flip a switch or operate another input device to cause closing of the one or more panels.

Figure 2C:
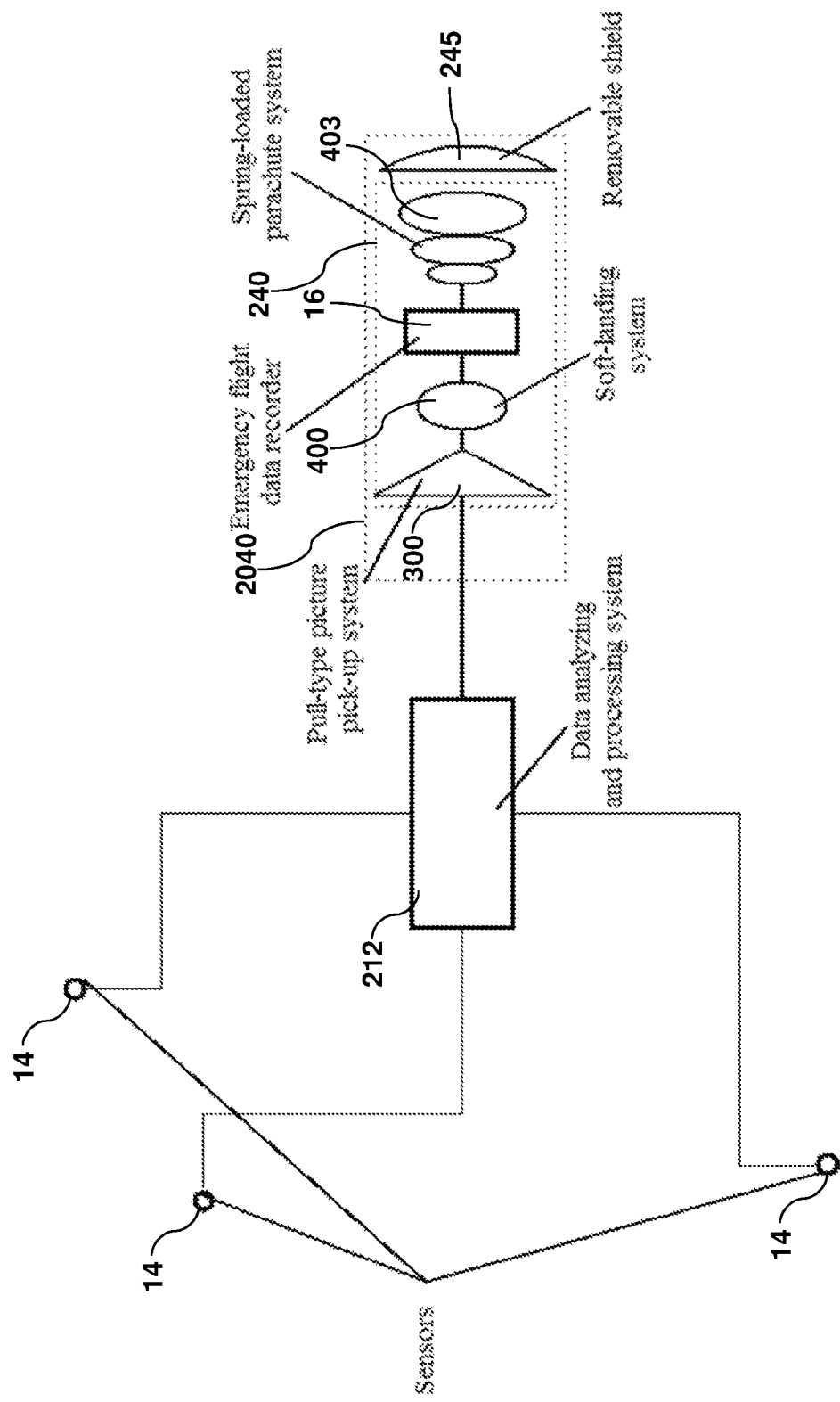
FIG. 2C is a block diagram showing an embodiment of an intelligent rapid separation and ejection system.

FIG. 2C illustrates a block diagram of another embodiment of an IRESS. As shown in FIG. 2C, this embodiment comprises a plurality of sensors 14 (for example, airspeed sensors, acceleration sensors, altitude sensors, and/or the like), a data analyzing and processing system 212 (also referred to as an emergency situation diagnostic processor), compartment 2040, housing 240, removable shield 245, pull-type picture pick-up system 300, soft-landing system 400, emergency flight data recorder 16, and spring-loaded parachute system 403 (which may include a spring 454, similar to as shown in FIGS. 2A and 2B). This embodiment can operate and/or function similarly to other embodiments disclosed herein. For example, the sensors 14 may be configured to collect and transmit flight parameters and/or other data to the data analyzing and processing system 212, for determining whether an emergency event is occurring that may require ejecting the emergency flight data recorder 16 and other components. The sensors 14 may be located at appropriate locations on or in the aircraft.

The data analyzing and processing system 212 can be used for data analysis, self-judgment, automatic activation of ejection, and/or the like. In some embodiments, with the method of fuzzy mathematics, the data analyzing and processing system obtains the real-time flight path and overloads. Parameters input to the decision-making process may include, for example, the flight attitude, velocity, course of the aircraft (and/or deviating from intended route), rate of climb, rate of descent, acceleration, fuel oil consumption, landing gear retraction, Greenwich Time, working status of systems, working parameters of engines, noise level, vibration level and/or patterns, and/or the like. The data analysis and processing system 212 will make judgments on whether the plane is in abnormal flying situations (such as an emergency situation that is likely to result in loss of the aircraft). Upon the system identifying abnormal flight status intelligently, the system can be configured to send an "OPEN" command or similar to the removable shield 245 (and/or other shields or panels, such as panels 245 260 illustrated in FIG. 2B). Later, the data analyzing and processing system 212 can send another "START" command or similar to start the pull-type picture pick-up (image capture) system 300 through the connecting cable after it is ejected from the aircraft. In some embodiments, only one activation command needs to be sent, which causes activation of the ejection, separation, and image capturing processes. However, it may be desirable in some embodiments to use more than one sequential command to activate particular portions of the ejection, separation, and/or image capturing processes.

The removable shield 245 can be configured to cover an opening in the housing 240, which accommodates the parachute system 403, the emergency flight data recorder 16, soft-landing system 400, and the pull-type picture pick-up system 300. Once the "OPEN" command is received from data analyzing and processing system 212, the removable shield 245 can be open rapidly to allow all the systems inside the housing 240 to be ejected quickly.

The spring-loaded parachute system 403 can be used to help eject the flight data recorder 16, inflatable soft-landing system 400 (which may be at least partially disposed about the flight data recorder 16, similarly to the airbag subsystems 404 described below), and the pull-type image tracking/transmission system 300. After ejection, the parachute 403 can also help to separate the flight data recorder 16 and soft-landing system 400 from the towed tracking system 300.

The processing system 212 comprises a processor, non-volatile memory, a power source (on-board battery and/or by tapping into an available power source on the aircraft), and a circuit for transmitting the data from the sensors to the processor. The processor accesses onboard software (programmable) and/or hardware logic for making autonomous decisions on the aircraft's state based on data received from the sensors and possibly other sources, e.g., a wired or wireless communication link with the aircraft cockpit or controls. Additionally, the processor may include sub-systems for processing raw data received from the sensors, e.g., an integrator which can inform the processor about a rate of climb or descent, or differentiator to inform the processor about a rate of change in air pressure. The processing system can be intelligent, meaning that based on data received from, e.g., the sensors, an abnormal flight status can be detected dynamically and/or automatically in real-time, and the ejection device will be triggered automatically without human intervention needed. Additional details of electronic hardware that may be used with the data analyzing and processing system are described below with reference to FIG. 15.

Figure 2D:
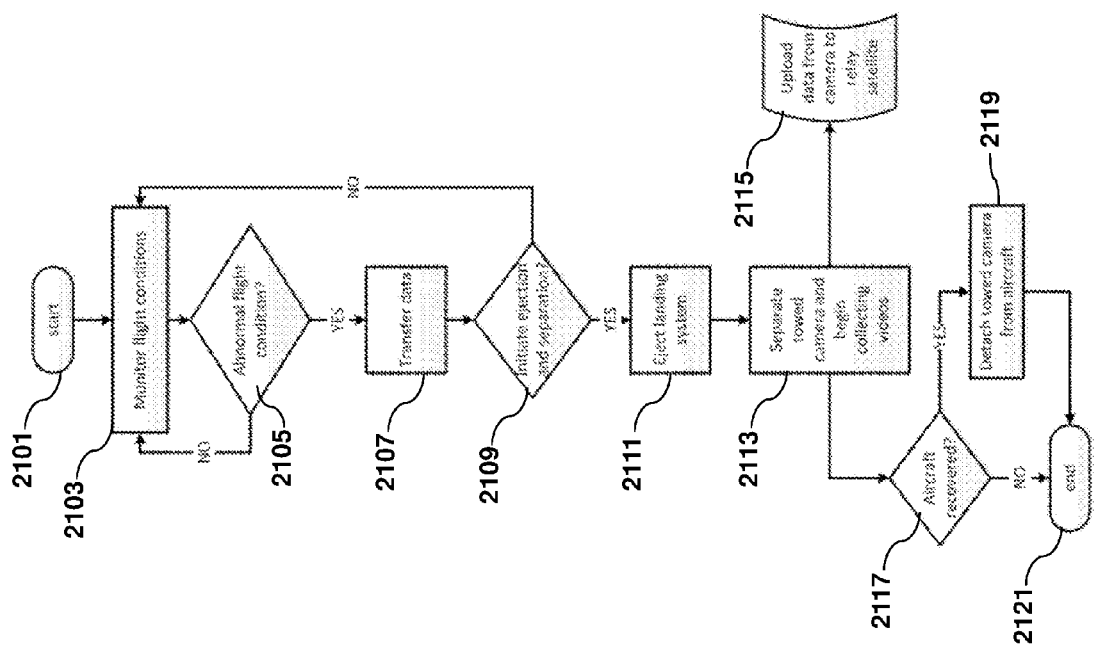
FIG. 2D is an embodiment of a process flow diagram illustrating an example process of monitoring the state of an aircraft and performing actions following a determination that the aircraft is experiencing abnormal flight conditions.

FIG. 2D illustrates an embodiment of a process flow diagram showing one example implementation of the system. At block 2101, the process starts and the system can be initiated, which may be at, for example, some point after take-off At block 2103 the system begins collecting data from the sensors and, at block 2105, making a determination about the flying conditions. This assessment of the flying state of the aircraft may continue indefinitely until after the plane has landed and/or until the system is otherwise disabled. For example, the system may be remotely turned on/off from the cockpit, or automatically turned on and off, such as when the aircraft is near the ground under normal conditions (for example, right after take-off and during final approach).

When an abnormal flight condition is detected, the process flow proceeds to block 2107, and the system may begin to transfer data from the flight recorder (e.g., the permanently-installed flight recorder) to the EFDR (e.g., ejectable recorder 16). In some embodiments, this block is optional, because data may regularly be stored in the EFDR during normal operating conditions, meaning most or all of the data stored on the permanent flight recorder is already also stored on the EFDR. If after a certain time period the system confirms an abnormal flight data and when the data transfer is complete, the process flow proceeds to block 2109 and the system initiates ejection of the landing system. The system may or may not make a second determination of whether to initiate ejection after data is downloaded from the block box. If the system determines not to eject the landing system, the process flow proceeds back to block 2103. Although this embodiment illustrates a multistage decision process that comprises an initial detection of an abnormal flight condition (e.g., block 2105) and then a secondary determination as to whether the ejectable system should be ejected (e.g., block 2109), such as based on confirmation of the abnormal flight condition, the abnormal flight condition becoming worse, and/or the like, some embodiments may comprise more or fewer stages in the process. For example, in some embodiments, the system may make a single determination that an abnormal or emergency event is occurring and immediately activate the ejection process. This may be desirable in some embodiments, because in certain situations, such as a bomb exploding on an aircraft, the ejectable data recorder may need to be ejected very quickly, and even additional milliseconds required in a multistage decision process may delay the ejection more than desired.

After the landing system has separated at block 2111, the processing system initiates and begins video capture and storage at block 2113. This information can be transmitted to a relay satellite at block 2115. During the video capture the processing system can continue to monitor the state of flight based on sensor data. At block 2117, if the aircraft stabilizes itself (or a power shutoff command is received) the processing system can detach the towed camera from the rear of the aircraft (at block 2119), to reduce or eliminate any undesirable aerodynamic effect of the towed camera on the flight of the aircraft. The process completes at block 2121.

Figure 2E:
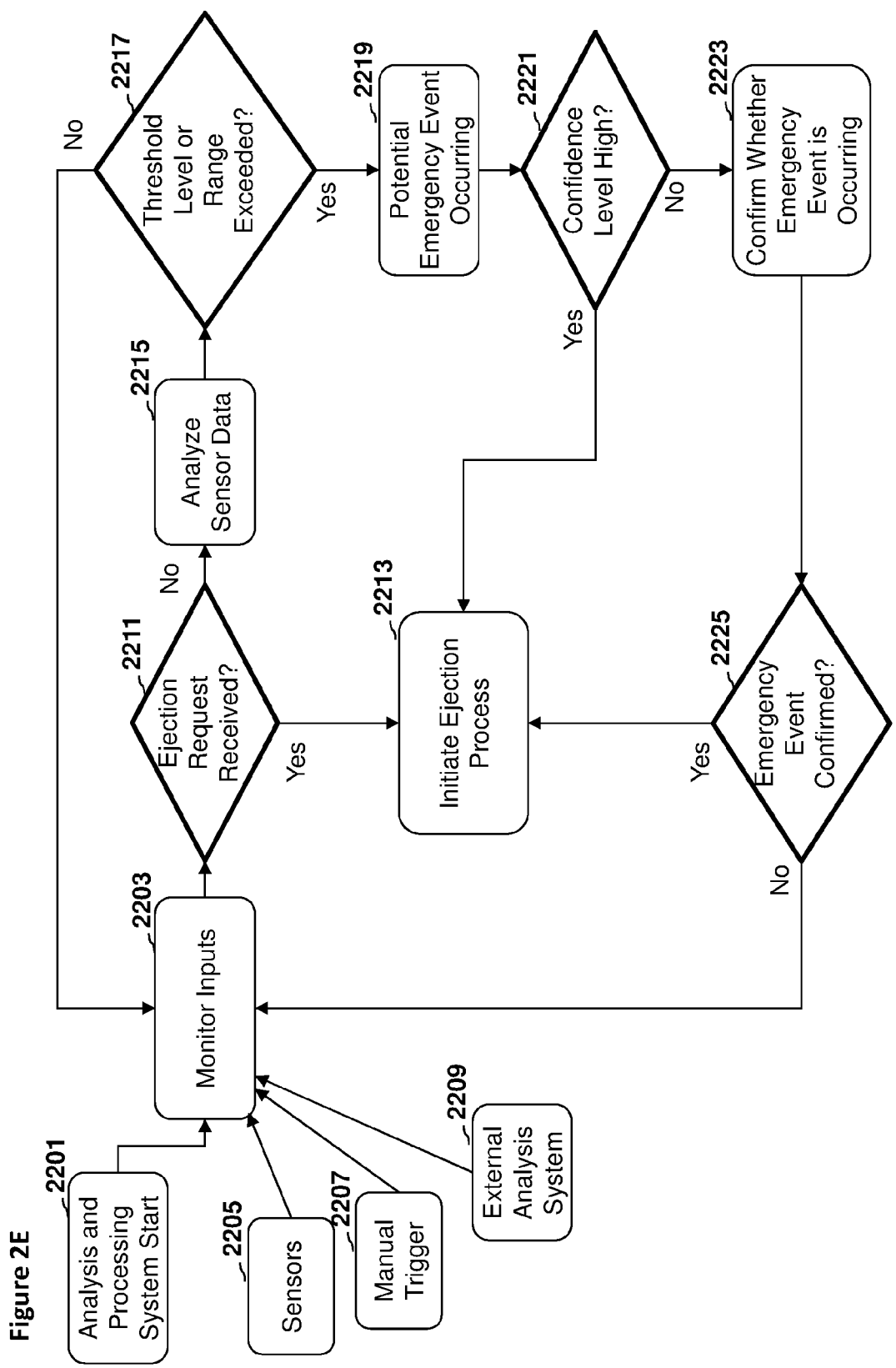
FIG. 2E is an embodiment of a process flow diagram illustrating an example process of monitoring the state of an aircraft for detecting an emergency event.

FIG. 2E illustrates an embodiment of a process flow diagram showing an example process for detecting whether an emergency event is occurring, and thus whether an ejectable flight data recorder system ejection process should be initiated. The process illustrated in FIG. 2E may be performed by, for example, the data analyzing and processing system 212 illustrated in FIG. 2C, the emergency situation diagnostic processor 212 illustrated in FIG. 2A, and/or various other systems disclosed herein. The process flow begins at block 2201 and proceeds to block 2203, where the system monitors any inputs. For example, the system may monitor data received from one or more sensors 2205, one or more manual triggers 2207, and/or one or more external analysis systems 2209. For example, the sensors 2205 may comprise altitude sensors, acceleration sensors, and/or various other types of sensors, similar to as described above with reference to sensors 14. The one or more manual triggers 2207 may, for example, comprise a manual trigger located in the cockpit that enables the pilot to indicate to the system that an emergency event is occurring and that the ejectable flight data recorder system should initiate an ejection process. The one or more external analysis systems 2209 may comprise, for example, a separate system located on or in the aircraft that detects when an emergency event is occurring, a system external to the aircraft, such as located in a ground control station that communicates with the aircraft through, for example, satellites, and/or the like. In some embodiments, the system can be configured to analyze data from the sensors 2205 to make its own determination as to whether an ejection should be initiated. In some embodiments, the system can also be configured to automatically initiate ejection, without making its own determination, in response to a signal received from a manual trigger 2207 and/or external analysis system 2209.

At block 2211, the process flow varies depending on whether an ejection request has been received. For example, an ejection request may be received from the manual trigger 2207 and/or external analysis system 2209. If an ejection request has been received, the process flow proceeds to block 2213 and an ejection process can be initiated. The ejection process may proceed in some embodiments as illustrated in FIG. 2D beginning at block 2109. The ejection process is not limited to the process illustrated in FIG. 2D, however, and various other ejection processes as disclosed herein may be utilized.

If an ejection request has not been received at block 2211, the process flow proceeds to block 2215, and the system can be configured to analyze data from the sensors 2205. For example, the system may be configured to compare data from one or more individual sensors to stored reference data that indicates a maximum or minimum threshold level of each sensor's data, a range of acceptable or normal data for each individual sensor that indicates the sensor is operating in a normal flight condition, and/or the like. In some embodiments, the system may also analyze data from two or more sensors in combination. For example, a certain individual sensor having data outside of a predetermined range may not in and of itself be indicative of an emergency event occurring, but that sensor's data being out of a certain range or above or below a threshold level, in combination with one or more other sensor's data being within or out of a particular range and/or above or below a threshold level, may be indicative of an emergency situation occurring. Accordingly, at block 2215, the system may be configured to analyze the sensor data in various ways to determine whether an emergency event may be occurring.

At block 2217, the process flow varies depending on whether one or more threshold levels or ranges have been exceeded in the sensor data. As discussed above, this may be one or more threshold levels or ranges for an individual sensor and/or it may be one or more threshold levels or ranges based on a combination of two or more sensors. Further, in some embodiments, acceptable threshold levels and/or threshold ranges may not be static and may be adjusted in real time based on data received from one or more sensors indicating a current flight condition. If a threshold level or range has not been exceeded at block 2217, then the system has determined that an emergency event is not occurring, and the process flow proceeds back to 2203. If at block 2217 a threshold level or range has been exceeded, the system has determined that an emergency event may potentially be occurring (block 2219), and the process flow proceeds to block 2221. Although in this embodiment, the detection of an emergency event is described as being related to one or more threshold levels or ranges being exceeded, various other methods of detecting when an emergency event is occurring may be used. For example, the system may be configured to analyze a combination of parameters, potentially setting higher signal priority to some parameters over others. Further, the system may be configured to analyze signal frequency, compare sensor data to data stored in one or more databases, analyze sensor data in real time, and/or the like. In some embodiments, the system may be configured to consider a duration of one or more signals, and/or a duration that one or more signals exceeds a threshold value or falls outside of a threshold range. For example, one or more signals may comprise data outside of a threshold range, which may potentially indicate that an emergency situation is occurring, but a relatively short duration of such an occurrence may be indicative of a false positive. Accordingly, it can be desirable in some embodiments to analyze the duration at which a signal falls outside of a threshold range and/or how often the signal falls outside of the threshold range. The system can be configured to determine that an emergency event is occurring if, for example, the duration exceeds a threshold value and/or if one or more signals repetitively falls outside a threshold value or range within a threshold amount of time. As an example, a system may be configured to determine that a downward acceleration above a threshold level is potentially indicative of a rapid descent characteristic of an emergency event. However, if such relatively high downward acceleration persists for only a short duration, it may be a false positive, because it may simply be due to turbulence. If the relatively high downward acceleration persists for a threshold duration, however, it may be more likely that a true emergency event is occurring. In various embodiments, various individual parameters and/or combinations of parameters may be used by the system in making a determination that an emergency event is occurring or is likely occurring. For example, the system may be configured to detect a stall condition, which may be indicative of an emergency event, by analyzing one or more of pitch, angle of attack, altitude, airspeed, and/or the presence or absence of laminar airflow across a leading edge of a wing or other flight surface. A stall condition is one example of a potential emergency event that may be recovered from. For that reason, it may be desirable for the system to continue to monitor the situation and wait to eject the flight data recorder and/or other components until another condition occurs, such as the stall condition persists for a certain duration and/or the aircraft drops below a certain altitude. In some embodiments, the system may be configured to communicate with a collision detection and/or avoidance system, and to cause ejection of the flight data recorder and/or other components when the system determines a collision is imminent.

At block 2221, the process flow varies depending on whether the system has a relatively high confidence level in whether an emergency event is occurring. For example, some threshold levels or ranges being exceeded may be an indicator having high likelihood that an emergency event is occurring. For example, two separate cabin pressure sensors simultaneously indicating an abnormally high cabin pressure may indicate with relatively high confidence that an emergency event is occurring (e.g., a bomb exploding in the cabin). Other threshold levels or ranges may not be associated with as high of a confidence level, and may merely be an indicator that an emergency event may potentially be occurring, but would not produce a high enough confidence level to immediately initiate the ejection process. For example, a sudden drop in altitude (and/or a sudden increased rate of descent) when the aircraft was previously cruising at a relatively constant altitude may be an indicator that an emergency event is occurring. It may also, however, be the result of sudden turbulence from which the aircraft will likely recover. In that case, it may be desirable to delay initiation of the ejection process until the system has a higher level of confidence that an emergency event is occurring.

If the confidence level of an emergency event occurring at block 2221 is relatively high, then the process flow proceeds to block 2213, and the ejection process can be initiated. If the confidence level is not relatively high at block 2221, then the process flow proceeds to block 2223. At block 2223, the system confirms whether an emergency event is occurring. For example, if a sensor or combination of sensor threshold levels and/or ranges has been exceeded, the system may continue to monitor those sensors and confirm that their levels remain outside of a threshold level or range for a certain period of time. As another example, the system may analyze data from a different sensor or set of sensors than the ones that had a threshold level or range exceeded. This different sensor or set of sensors may, for example, have data ranges correlated with the ranges of the sensor or sensors having the threshold level or range exceeded. If the correlated sensor data are within certain ranges, this may increase the likelihood that an emergency event is occurring. As another example, the system may be configured to request confirmation from the pilot or another member of the flight crew that an emergency event is occurring.

At block 2225, the process flow varies depending on whether the occurrence of the emergency event was confirmed at block 2223. If an emergency event occurrence was confirmed, the process flow proceeds to block 2213 and the ejection process is initiated. If the emergency event was not confirmed, the process flow proceeds back to block 2203 and proceeds as described above.

Figure 3A:
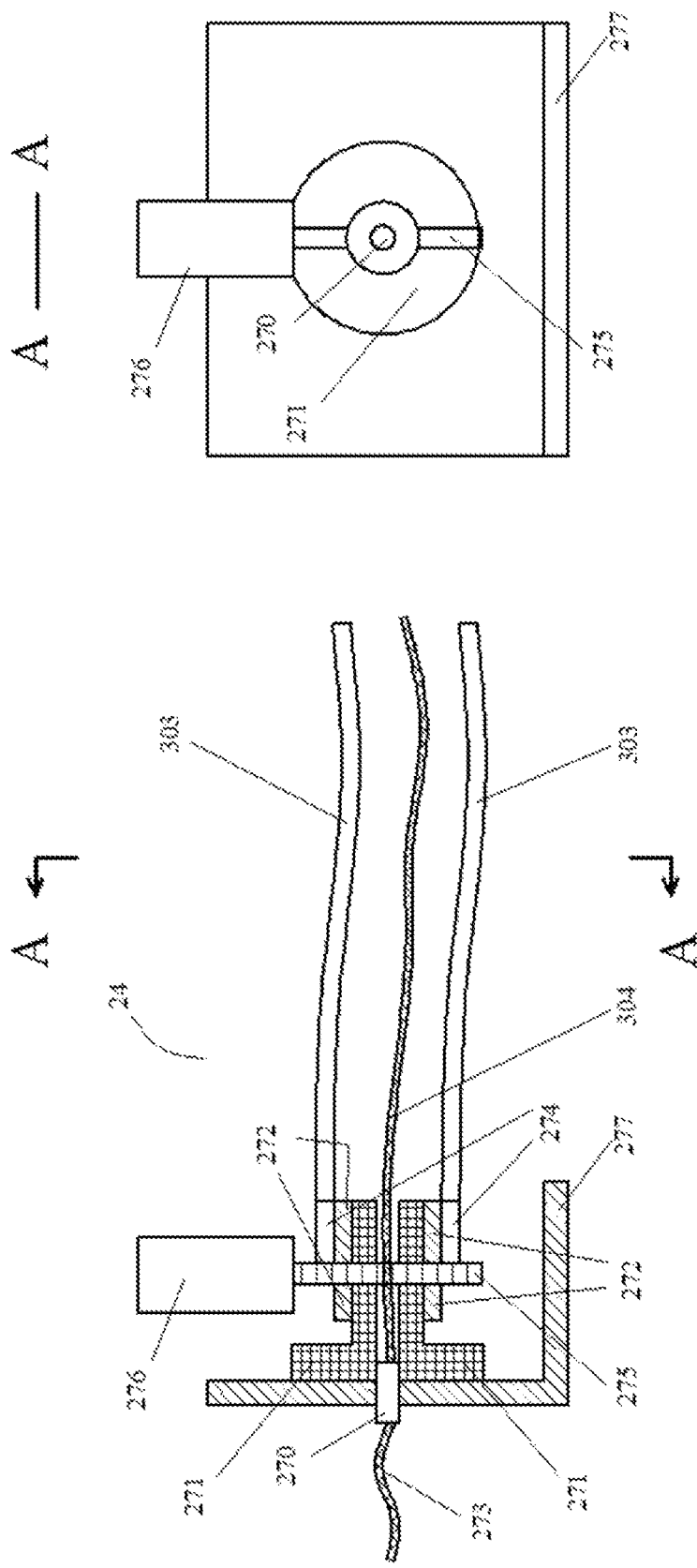
FIG. 3A is a sectional view of an embodiment showing one component of an apparatus according to the present disclosure.

FIGS. 3A and 3A' are a side cross-sectional view and an end view, respectively, of an embodiment of an arrangement of a detachable joint 24 for detachably connecting a towed cable (for example detachable towed cable 301 shown in FIG. 2A) with the aircraft (for example, aircraft 10 shown in FIG. 1). Such a design can be desirable, because it can enable towing of a tracking device, such as TITCS 300 shown in FIG. 2A, behind an aircraft in flight, with most or all of the towing tensile load supported by outer tube or sheath 303, and data transmitted through inner cable 304. The detachable joint 24 can include, in this embodiment, at least five components: a fixed installation base 277, a data link connector 270, an annulus installation base 271, a pair of connectors (for example a pair of hook and loop fasteners) 272 and 274 and an actuator cylinder 276 with an extendable plug 275. The fixed installation base 277 can be mounted on or within the aircraft fuselage 12. The fixed installation base 277 can be connected to other components of the detachable joint 24. Two ends of the data link connector 270 can both be cable sockets, and both can connect with pluggable data cables. One end of the data link connector 270 can connect with the data cable 273 which is used to collect flight data (e.g., from a separate system of the aircraft, sensors located on or in the aircraft, and/or the like). The other end of the data link connector 270 connects with the data cable 304 in towed cable 301 (shown in FIG. 2A). The annulus installation base 271 can be mounted on the fixed installation base 277. A pair of connectors 272 and 274 can be connected to each other (although other embodiments may comprise fewer or more connectors). They can be used to connect the hollow tube 303 on the annular installation base 271. The connector 272 is mounted on top of the annular installation base 271 by a plug 275. The connector 274 can be fixed on one end of the hollow rope tube 303 which tows the TITCS 300 (shown in FIG. 2A). The connectors 272 and 274 can be designed to disconnect with each other when tensile forces between the connectors exceeds a threshold amount or level. In some situations, when the aircraft is restored to stable and safe flight, the pilot can manually separate the TITCS 300 from the aircraft 10. In this case, the pilot sends an operational signal to the actuator cylinder 276 to move the plug 275 back into, or retract into the actuator cylinder 276, thereby removing the primary restraint that maintains the connection between the TITCS and base 271. This way, the connector 272 may then easily separate from the installation base 271 by a tensile force in the connector 272 or between the connectors 272, 274. The TITCS 300 then separates from the aircraft 10.

Figure 3B:
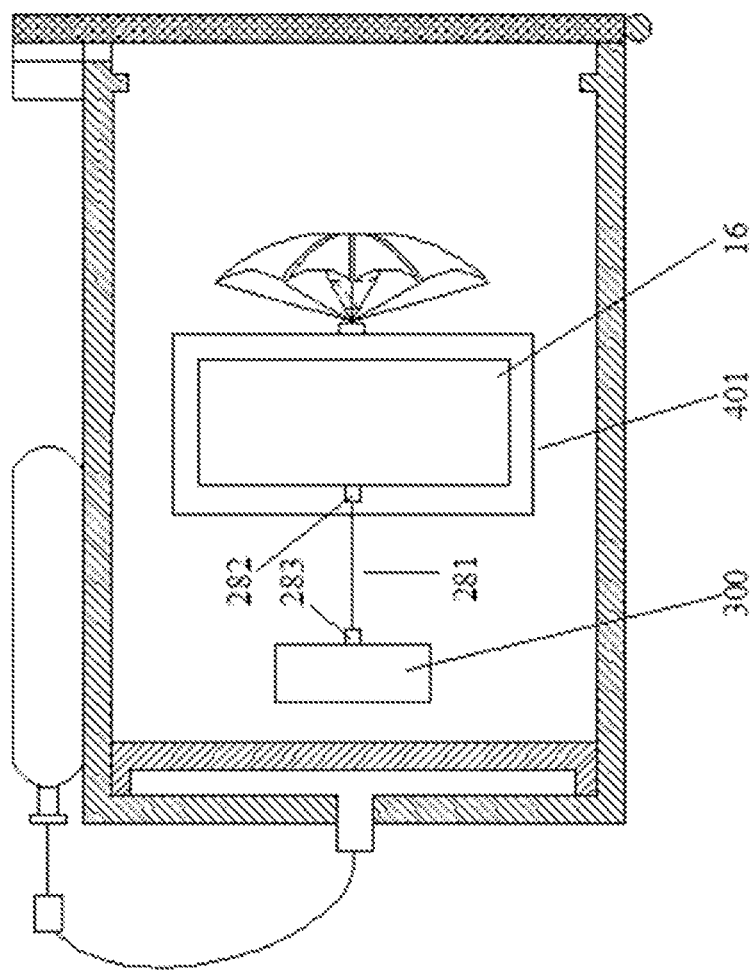
FIG. 3B is a schematic diagram of an embodiment showing one component of an apparatus according to the present disclosure.
Figure 7A:
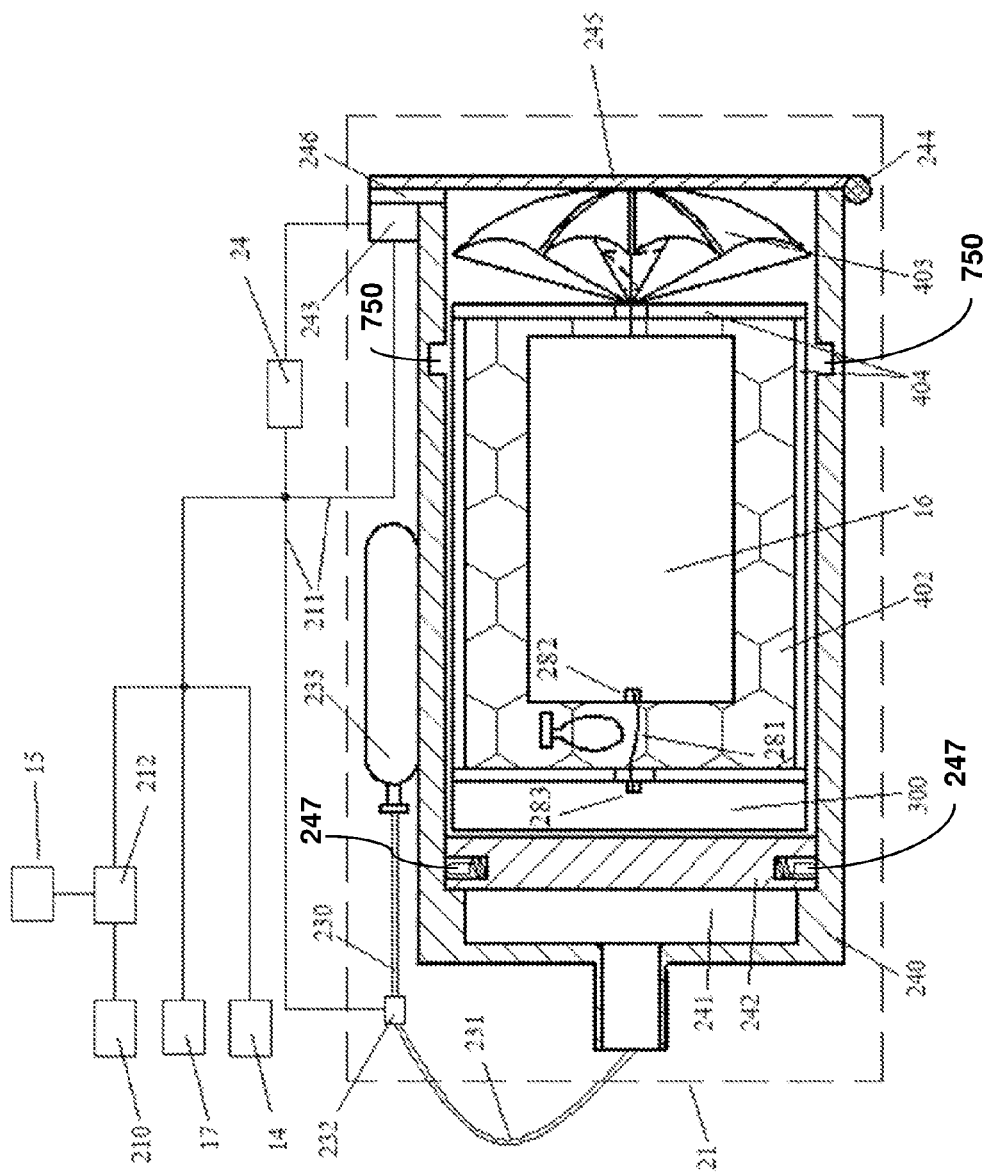

FIG. 3B shows a simplified schematic sectional view of an embodiment for connecting the EFDR 16 with the TITCS 300. The embodiment illustrated in FIG. 3B may include one or more or all of the features shown in other embodiments, such as in FIG. 2A. A data cable 281 with two pluggable units 282 and 283 can be provided to transmit flight data from the TITCS 300 to the EFDR 16 during normal flight. When the EFDR 16 is ejected from the aircraft 10, the pluggable units 282 and 283 can separate automatically from the EFDR 16 or the TITCS 300 respectively. An alternative embodiment showing a data cable 281 connecting pluggable units 282 and 283 is illustrated in FIG. 7A, described below.

Figure 3C:
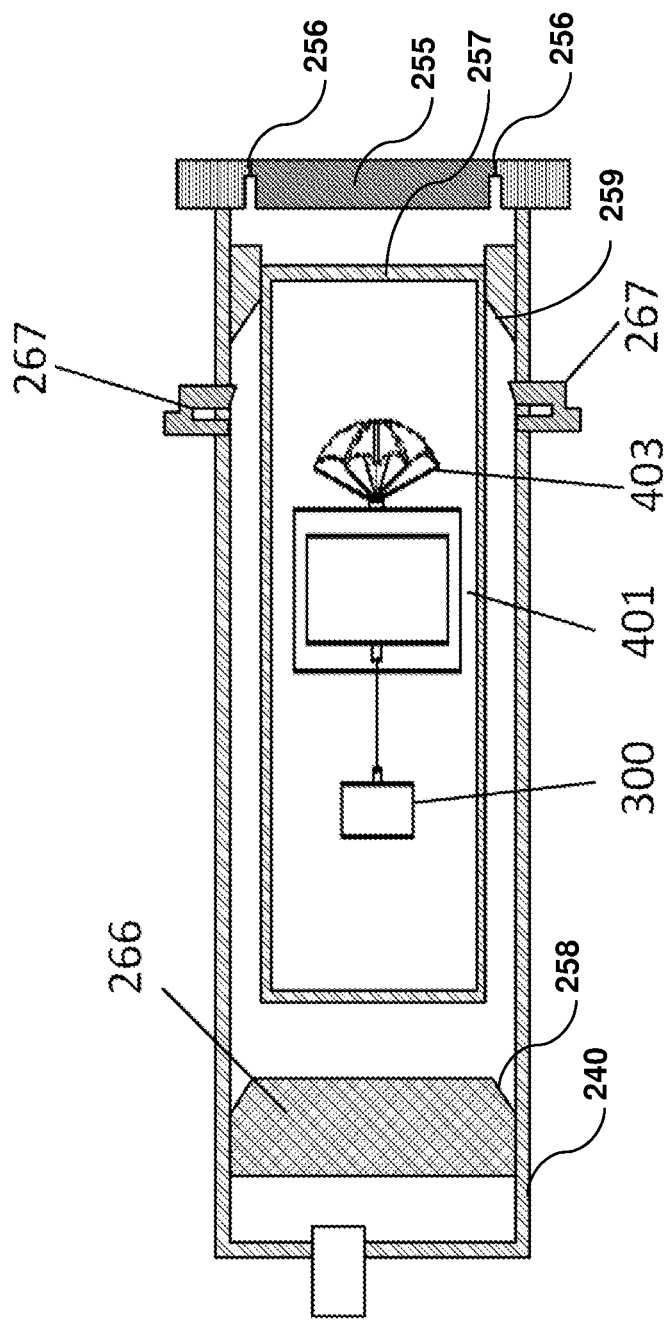
FIG. 3C is a schematic diagram of an embodiment showing SSM structure.

FIG. 3C illustrates another embodiment of an ejectable flight data recorder system. The system illustrated in FIG. 3C is similar in function to the embodiments illustrated in FIGS. 2A and 2B, and, for simplicity, some of the features of the embodiments of FIGS. 2A and 2B are not illustrated in this figure, but such features may be included in this embodiment. One of the advantages of the system illustrated in FIG. 3C is that the piston used for ejecting the flight data recorder components, in this case sabot 266, is configured to lock into place toward the end of the cylinder after the piston has been used to eject the components. By locking the piston or sabot 266 in place, this can seal the end of the cylinder to help maintain aerodynamic properties and/or laminar flow of the aircraft, such as after an inadvertent ejection or launching. In this embodiment, a spring plunger locking mechanism is employed to achieve the locking objective, with three locks 267 located evenly around the launching tube, e.g., 120 degrees between each of them, although other arrangements may be used.

Another difference in the embodiment illustrated in FIG. 3C is that, instead of a hinged panel 245, as shown in FIG. 2A, the embodiment of FIG. 3C comprises a panel 255 having a reduced strength or stress riser region 256 which enables the ejectable components to break therethrough. This panel 255 may be part of the aircraft fuselage or skin, or it may be part of the ejectable flight data recorder system, and an additional panel of the fuselage or skin positioned adjacent panel 255 may also need to be opened or broken through for ejection. Further, the embodiment illustrated in FIG. 3C comprises a container, sleeve, shell, and/or the like 257 that is used to encase the ejectable components 300, 401, 403. In this embodiment, instead of simply ejecting the ejectable components 300, 401, 403, the system is configured to eject the shell 257 as a unit, and the individual components within the shell 257 can separate from the shell 257 after ejection or separation of the shell 257 from the aircraft. Further, in the embodiment illustrated in FIG. 3C, an outer or forward facing surface 258 (in this case, an inclined surface) of the piston or sabot 266 is shaped or configured to mate with, conform to, and/or form a seal with mating surface 259 extending inwardly from the housing or cylinder 240. For example, when the piston 266 is locked at the end of its stroke by the locking devices 267, sealing surfaces 258 and 259 may be held in contact with one another to effect a better seal between the piston 266 and housing 240.

Figure 4A:
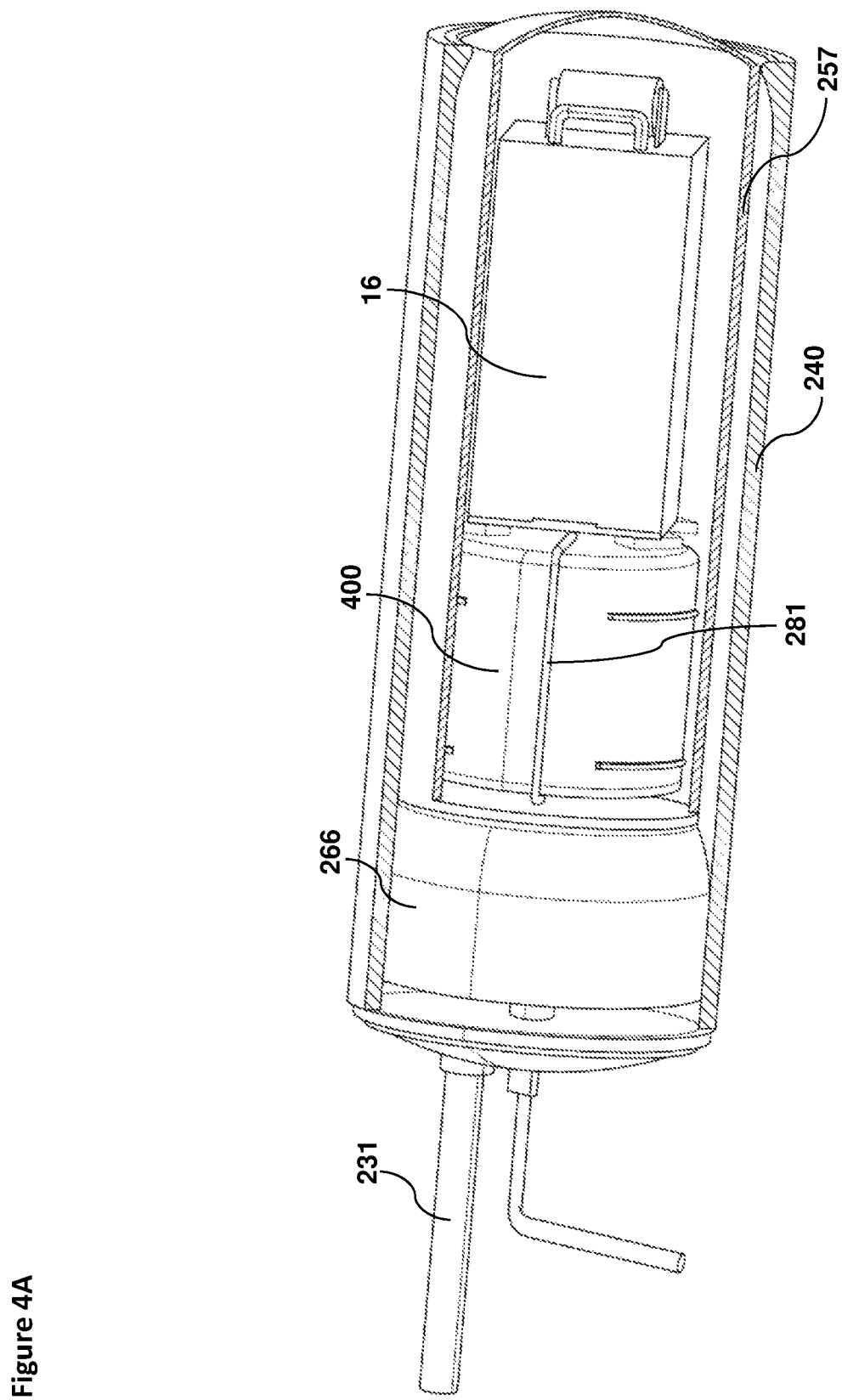
FIGS. 4A-4C illustrate an embodiment of an ejectable flight data recorder system comprising a sealing plug.
Figure 4B:
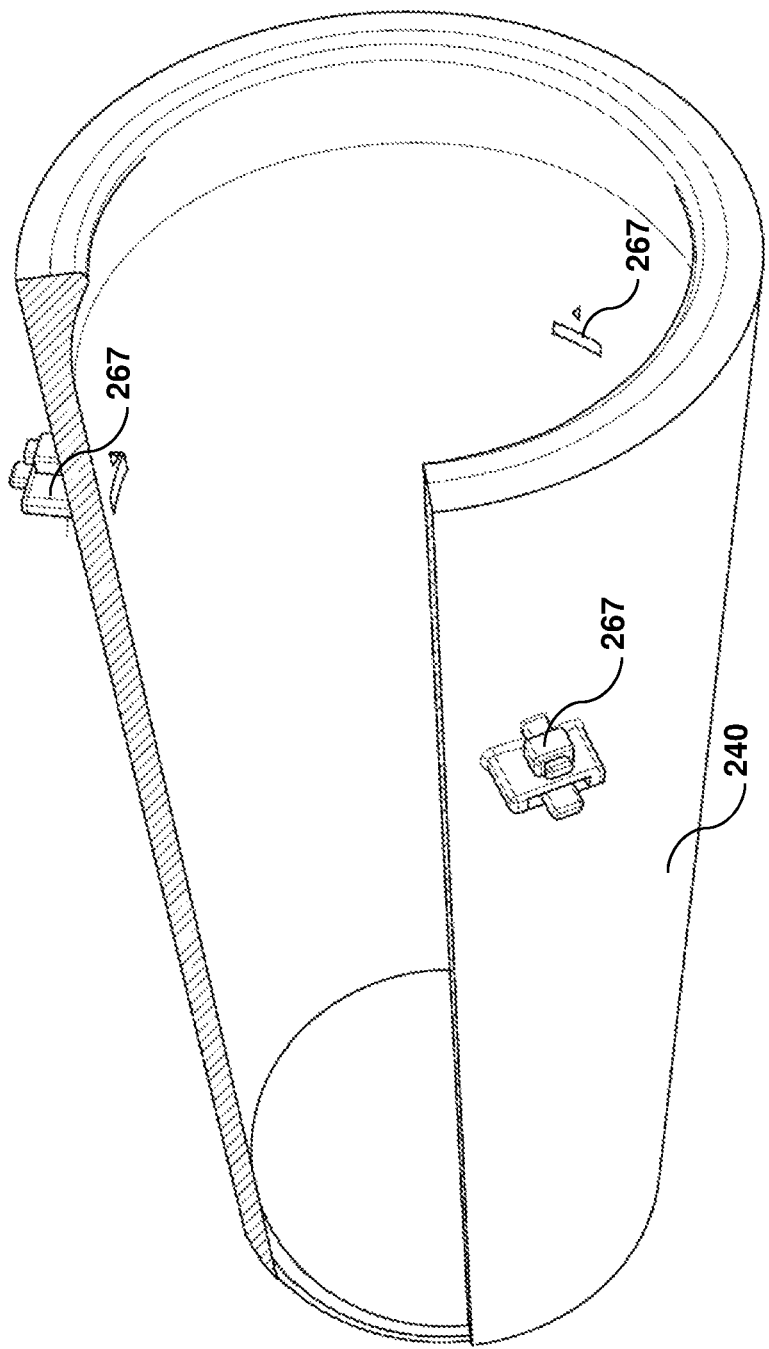
Figure 4C:
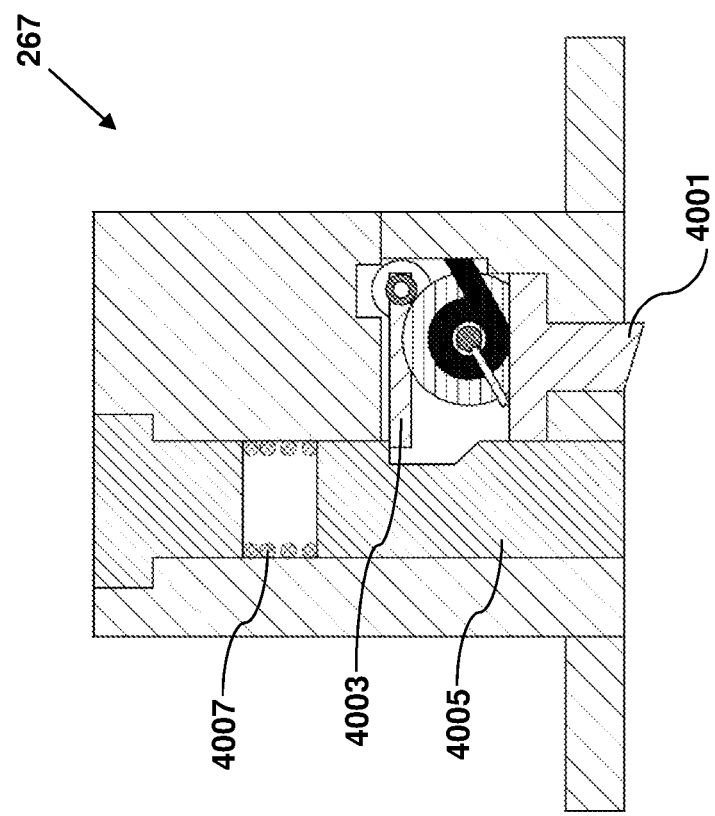

FIGS. 4A-4C illustrate another embodiment of an ejectable flight data recorder system that is similar to the flight data recorder system illustrated in FIG. 3C, as described above. With reference to FIG. 4A, the ejectable flight data recorder system comprises a housing or outer barrel 240 having a hollow internal cavity with positioned therein a sealing plug or piston 266, which is positioned behind a shell or housing 257. The shell or housing 257 comprises another internal cavity having positioned therein ejectable flight data recorder 16 and a flotation and soft landing system 400. In this embodiment, the housing or shell 257 can also be used as an antenna to help increase the range and/or efficiency of wireless transmissions sent from and/or received by the ejected flight data recorder 16. Further, in some embodiments, the flight data recorder 16 and/or flotation and soft landing system 400 can be configured to be separated from the shell 257 at some point after ejection from the aircraft.

With further reference to FIG. 4A, the system comprises a gas tube or hose 231 configured to enable pressurized gas to enter the housing 240 to cause the piston 266 to eject the shell 257. The system further comprises a cable 281 that enables data to be transmitted via wire to or from the flight data recorder 16 prior to ejection from the aircraft. It should be noted that, while the embodiment illustrated in FIGS. 4A-4C does not illustrate a towed tracking system or a spring-loaded parachute, other embodiments may include a towed tracking system, such as the towed tracking system 300 illustrated in various other figures and described herein, and/or a spring-loaded parachute, such as parachute 403 illustrated in various other figures and described herein.

FIGS. 4B and 4C illustrate details of the locking mechanisms 267 that can be configured to lock the sealing plug or piston 266 in place at the end of its stroke. As can be seen in FIG. 4B, the present embodiment comprises three locking mechanisms 267 positioned about the housing 240 at equally spaced intervals. Other embodiments may comprise more or fewer locking mechanisms and/or may position them differently.

FIG. 4C is a schematic cross-sectional view of the locking mechanism 267. The locking mechanism 267 comprises a protruding activation member 4001 which protrudes into the bore of the housing 240. The protrusion or protruding member 4001 can be configured to be contacted by the piston 266 when the piston 266 reaches or nears its end of stroke. The piston 266 can be configured to cause the protruding members 4001 to move radially outward with respect to the housing 240, thus releasing locking arm 4003, which enables plunger 4005 to extend radially inward under the force of spring 4007. When the plungers 4005 have extended radially inward with respect to the bore of the housing 240, the plungers 4005 will be positioned behind the piston or plug 266, thus locking the piston or plug 266 in place at the end of its stroke. This can, as described above, help to seal the system and help to maintain laminar flow across the aircraft skin after an ejection.

Figure 5A:
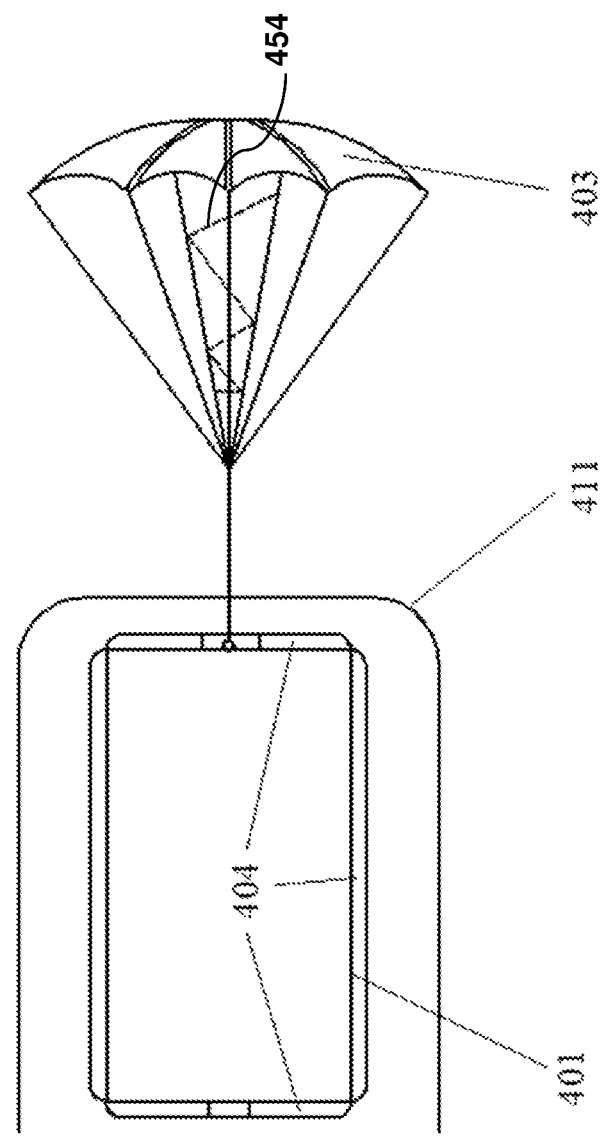
FIG. 5A is a schematic diagram of a sleeve according to some embodiments of the present disclosure.

FIG. 5A shows a simplified schematic diagram of a sleeve 411 according to some embodiments of the present disclosure. The housing 401 may include a cavity having positioned therein, for example, EFDR 16 (as shown in FIG. 2A). An airbag subsystem 404 can be placed around the housing 401. The housing 401 and the airbag subsystem 404 can be wrapped or enclosed within the sleeve 411, before the airbag subsystem 404 inflates. The sleeve 411 can be opened by the airbag subsystem 404 during the inflation of the airbag subsystem 404. When the airbag system 404 has inflated the sleeve 411 separates from the EFDR housing 401. The sleeve 411 may be advantageous to, for example, provide protection for the airbag system 404 during ejection of the device from the aircraft.

Figure 5C:
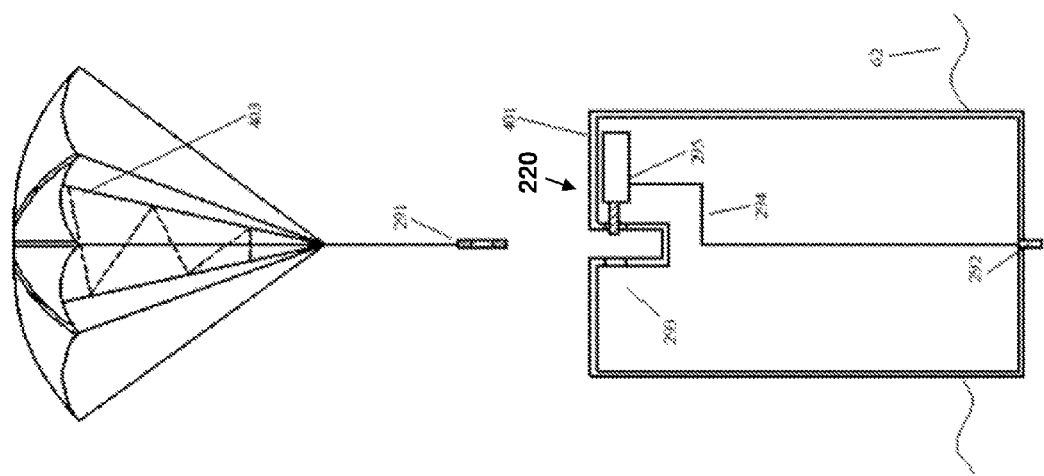
FIGS. 5B-5C are schematic diagrams relating to a separation process of a SEP when a EFDR lands on water.
Figure 5B:
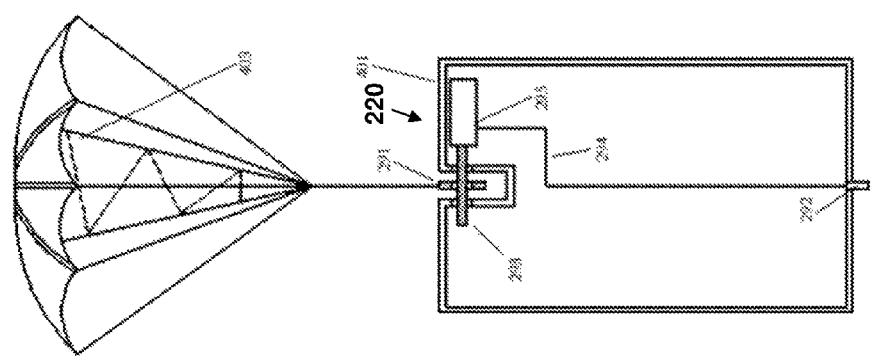

FIGS. 5B and 5C show simplified schematic diagrams illustrating a separation process for separating the SEP 403 after the ejected EFDR 16 has landed on water 62. Before the ejected EFDR 16 lands on the water 62, the SEP 403 can be connected with the housing 401 by a locking module 220, the details of which are illustrated in FIGS. 5B and 5C. The locking module 220 includes a ring 291, a plug 293 and an actuator cylinder 295. The ring 291 can be fixed at the end of the SEP's suspension line. When connecting the SEP 403 with the housing 401, the ring 291 can be locked with the housing 401 by a plug 293, which passes through the center of the ring 291. When the ejected EFDR 16 lands on the water 62, a water sensor 292 sends a signal to activate the actuator cylinder 295 through a signal cable 294. Then, the actuator cylinder 295 pulls the plug 293 out of the ring 291 to separate the SEP 403 from the ejected EFDR 16. Enabling the parachute 403 two separate from or decouple from the housing 401 upon a water landing can be beneficial, for example, to increase the chance that the housing 401 will remain a float on the water. If the parachute 403 remained connected to the housing 401 after landing in the water, there can be a chance that the parachute 403 could drag the housing 401 underwater, thus making it harder to locate and/or recover the ejected flight data recorder.

Although the embodiment illustrated in FIGS. 5B and 5C comprises a specific arrangement of ring 291, plug 293, and actuating cylinder 295, various other arrangements and/or separation devices may be utilized. For example, a ball detent mechanism may be used that positions a ball within a cavity of the ring or other member 291 until allowed to move away from that cavity by an actuator. As other examples, a magnetic release system may be utilized, an explosive bolt may be used, and/or the like. Further, similar concepts may be utilized upon a ground landing. For example, the system may be configured to detect when the housing 401 has landed on the ground, such as by analyzing data from an accelerometer, an impact sensor, and/or the like, and to cause separation of the parachute 403 upon determining the housing 401 has landed on the ground. This may, for example, be advantageous to limit the possibility that the parachute 403 drags the housing 401 to a different location after landing.

For the embodiments illustrated and described in connection with FIGS. 2A, 2B, 3A, 3B, 5A and 5B, separation can be preferably completed by mechanical-electronical devices. No explosive devices are needed. By not using explosive methods of separation, e.g., explosive bolts, and/or giving more control over to the pilot, these embodiments are believed more safe and suitable for use with civilian aircraft. This does not mean, however, that the techniques and systems disclosed herein cannot be used with explosive methods of separation. It can be desirable, however, to limit use of explosive methods, particularly in civilian aircraft, due to a concern of accidental explosion and/or potential side effects of an explosive device going off on a civilian aircraft.

Figure 6A:
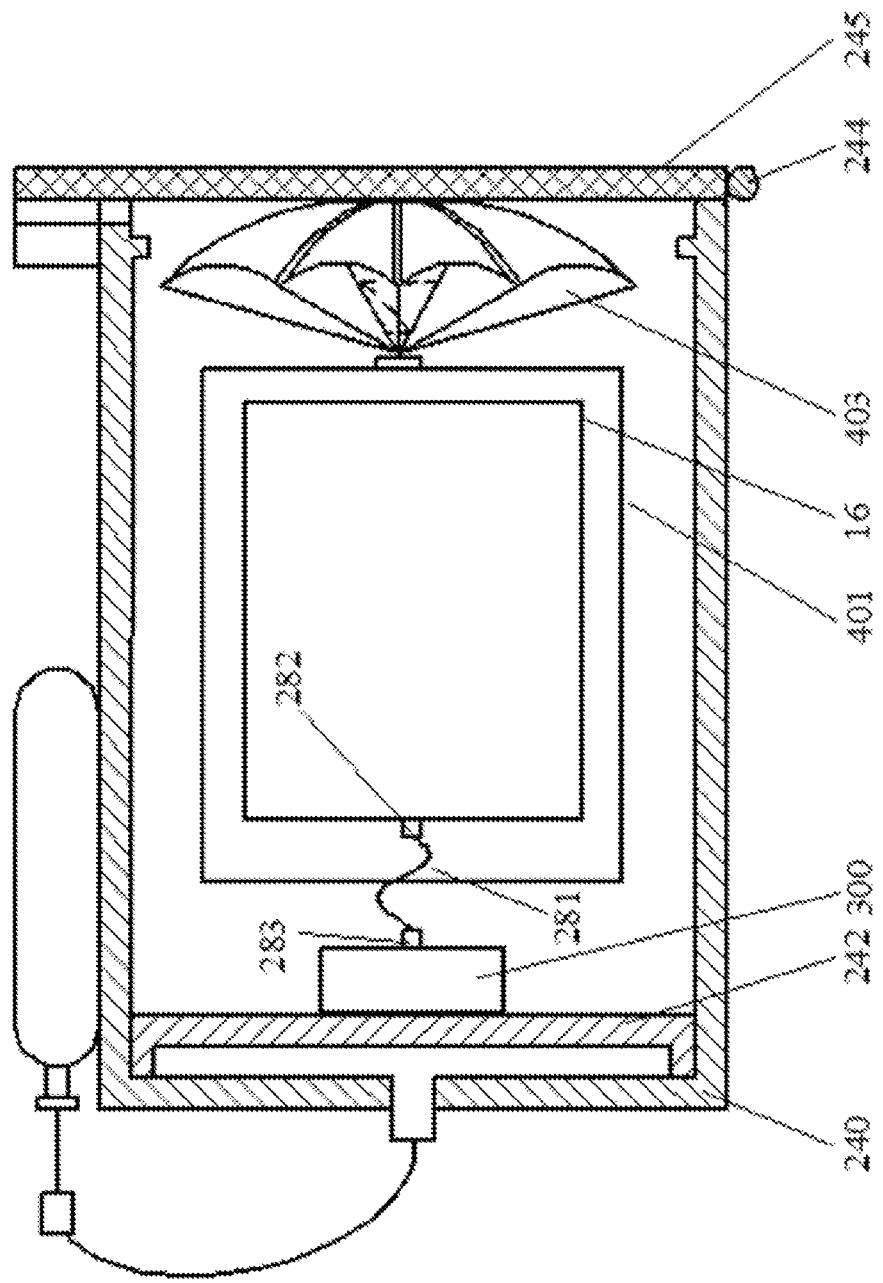

FIGS. 6A-6E illustrate an example embodiment of an ejection sequence wherein the parachute 403, housing 401, and towed tracking device 300 can be ejected from a housing or cylinder 240. The embodiment illustrated in these figures is similar to the embodiment illustrated in FIGS. 2A and 2B, with some features not shown for simplicity. In FIG. 6A, the system is shown in a waiting or ready-to-deploy state, such as the state it would be in during normal flight (e.g., before an emergency situation has been detected). In this case, the towed tracking device 300, housing 401 (having the flight data recorder 16 positioned therein), and spring-loaded ejection parachute 403 can be all contained within the housing or cylinder 240, and the parachute 403 can be held in a compressed configuration between the housing 401 and panel 245. The towed tracking device 300 can be electronically coupled to the flight data recorder 16 using cable 281, similarly to as described above.

Figure 6B:
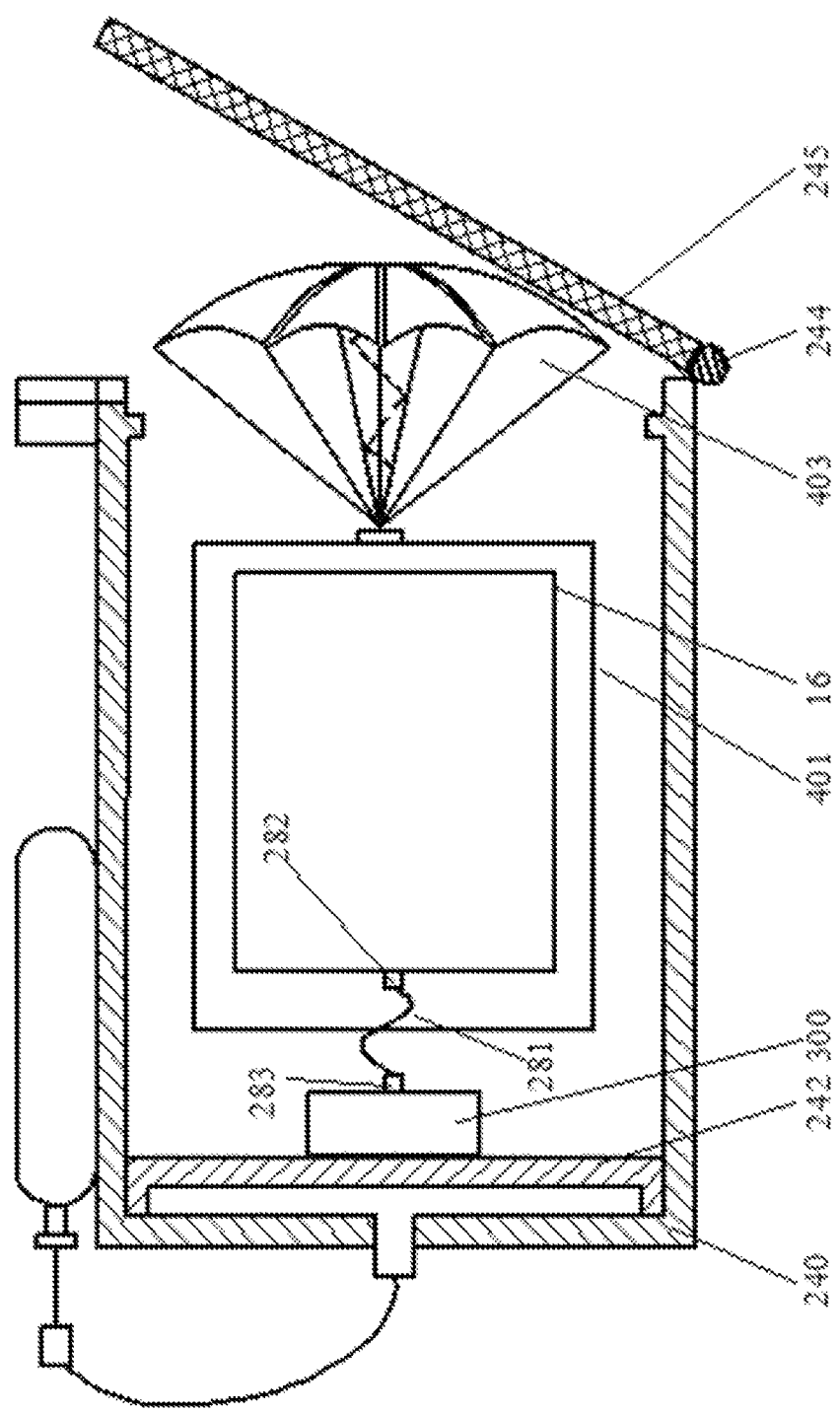

With reference to FIG. 6B, an emergency event has now been detected, and the panel 245 has begun to swing open, such as under the force of torsion spring 244. Because the panel 245 had been holding spring-loaded parachute 403 in a compressed configuration when the panel 245 was closed, spring-loaded parachute 403 is shown as also beginning to decompress and thus protrude out of the housing or cylinder 240.

Figure 6C:
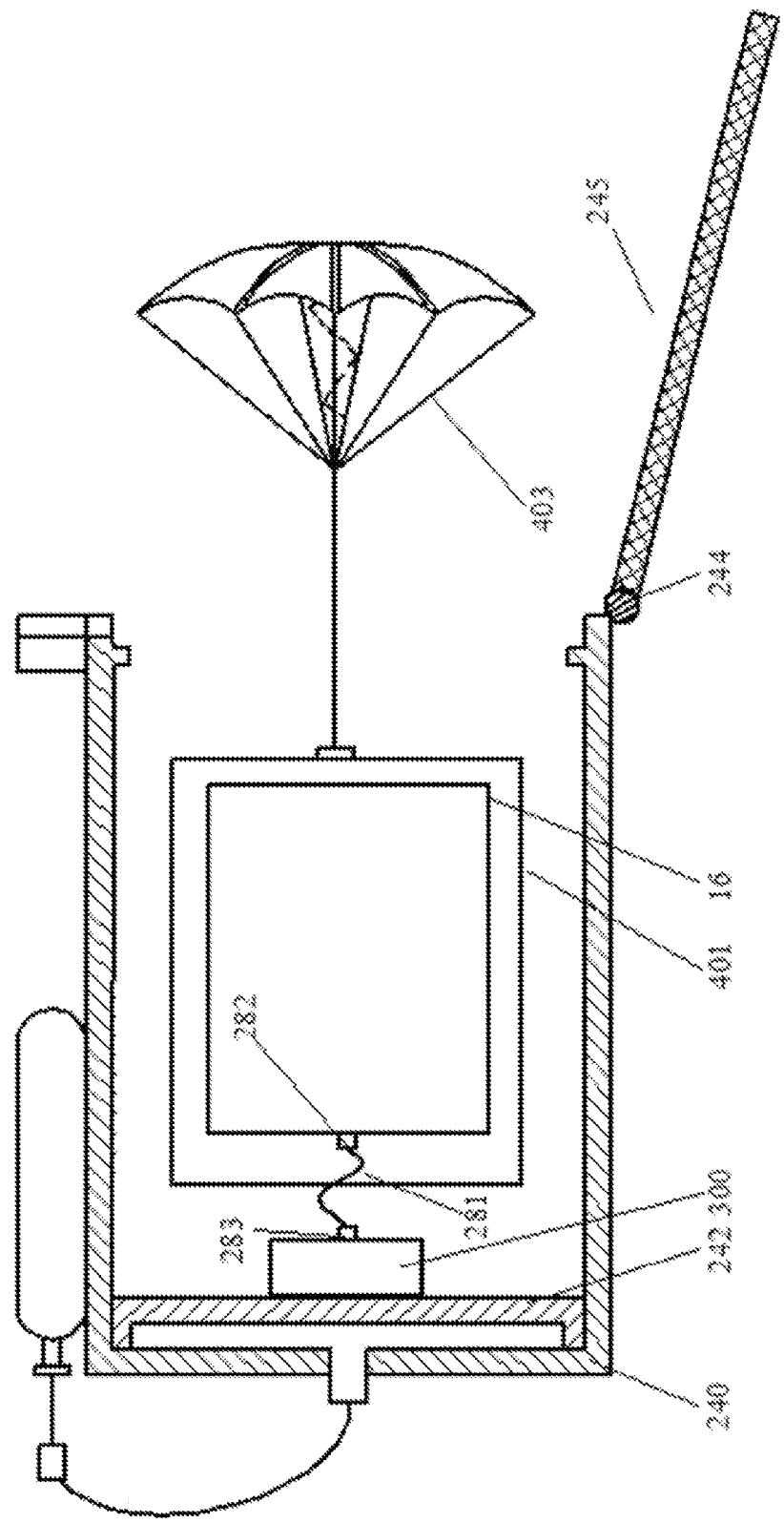
Figure 6D:
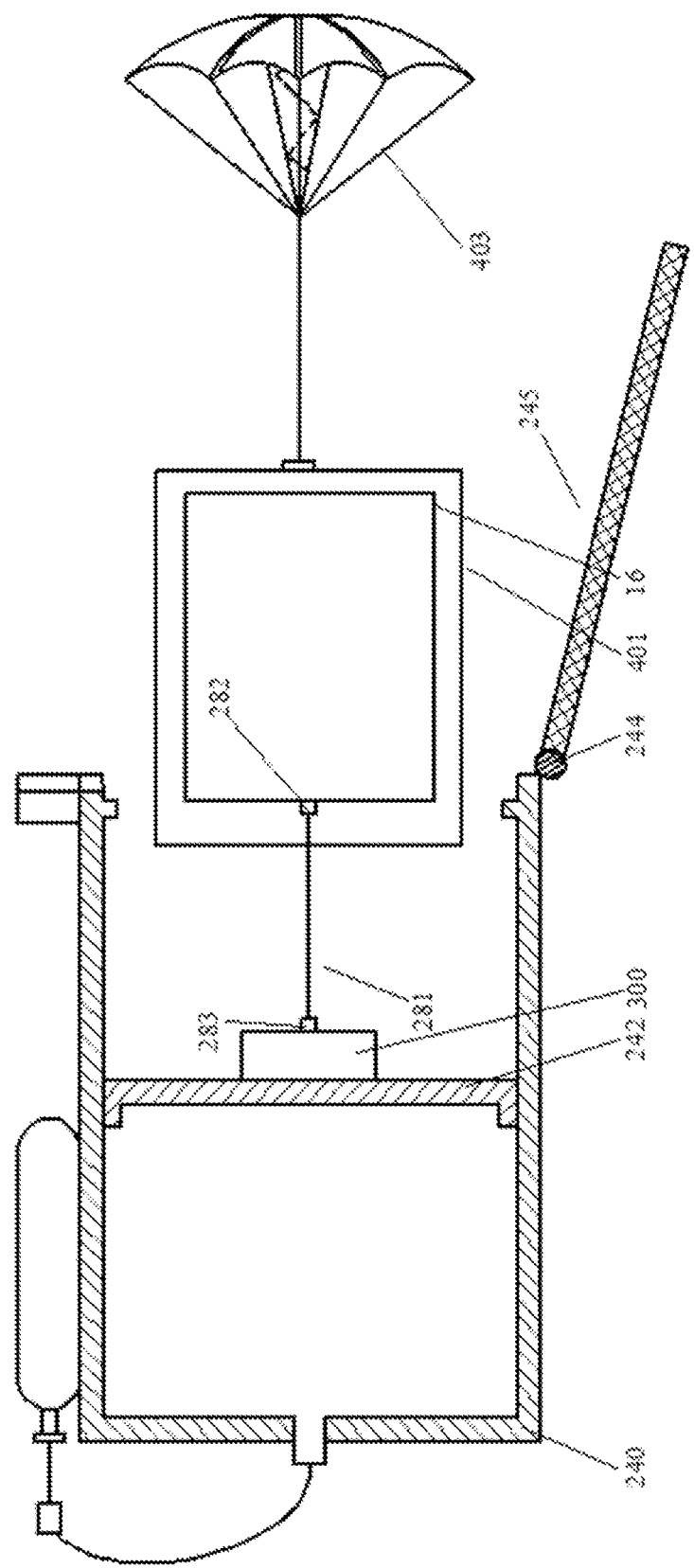

As shown in FIG. 6C, the panel 245 has now sufficiently opened for the entire parachute 403 to extend out of the housing 240, enabling the parachute 403 to begin pulling the housing 401 out of housing 240. Next, as illustrated in FIG. 6D, pressurized gas has begun pushing piston 242, causing towed tracking device 300 to simultaneously be pushed out of the housing 240 while cable 281 can also be pulling towed tracking device 300. Finally, FIG. 6E illustrates the parachute 403, housing 401, and towed tracking device 300 having fully exited the cylinder or housing 240. Although not shown in this sequence of figures, in some embodiments, the towed tracking device 300 may remain connected to the aircraft and/or housing 240 by a tow cable, such as tow cable 301 discussed above, to be towed behind the aircraft.

FIG. 6F is an enlarged cross-sectional view of a section of FIG. 6E. In this enlarged view, FIG. 6F illustrates that the housing or cylinder 240 may further comprise a buffer, shock absorbing material, and/or the like 249 that can perform one or more functions. For example, the material 249 may comprise a shock absorbing material, such as rubber, polymer, vibration and/or shock isolation material, and/or the like that lessens the impact of the piston 242 when it reaches its end of stroke. Further, the material 249 may be in some embodiments an at least partially compliant material that helps to form a seal between a front surface of the piston 242 and the housing 240.

FIGS. 7A-7H illustrate another embodiment of an ejectable flight data recorder system. The embodiment illustrated in FIGS. 7A-7H is similar to the embodiment illustrated in FIG. 2A, as described above. One difference in the embodiment illustrated in FIG. 7A is that the piston 242 is configured to stop at its end of stroke and/or have a limited stroke in a different manner than the piston of the embodiment illustrated in FIG. 2A. With reference to FIG. 7A, elements having similar or the same reference numbers as in FIG. 2A are similar to and/or perform similar functions as described above with respect to FIG. 2A. Accordingly, their functions are not described again with reference to FIG. 7A. However, one difference is that the housing or cylinder 240 comprises a circular groove 750 instead of raised edge 250 for limiting the stroke or maximum extension of the piston 242. In this embodiment, the piston 242 comprises a plurality of spring-loaded plungers 247 residing in pockets positioned around a radially external surface of the piston 242. When the piston 242 extends sufficiently such that plungers 247 can be adjacent circular groove 750, the spring-loaded plungers 247 can move radially outward into the circular groove 750, thus stopping forward or extension motion of the piston 242, and also limiting any backward or retraction motion of the piston 242.

Figure 7B:
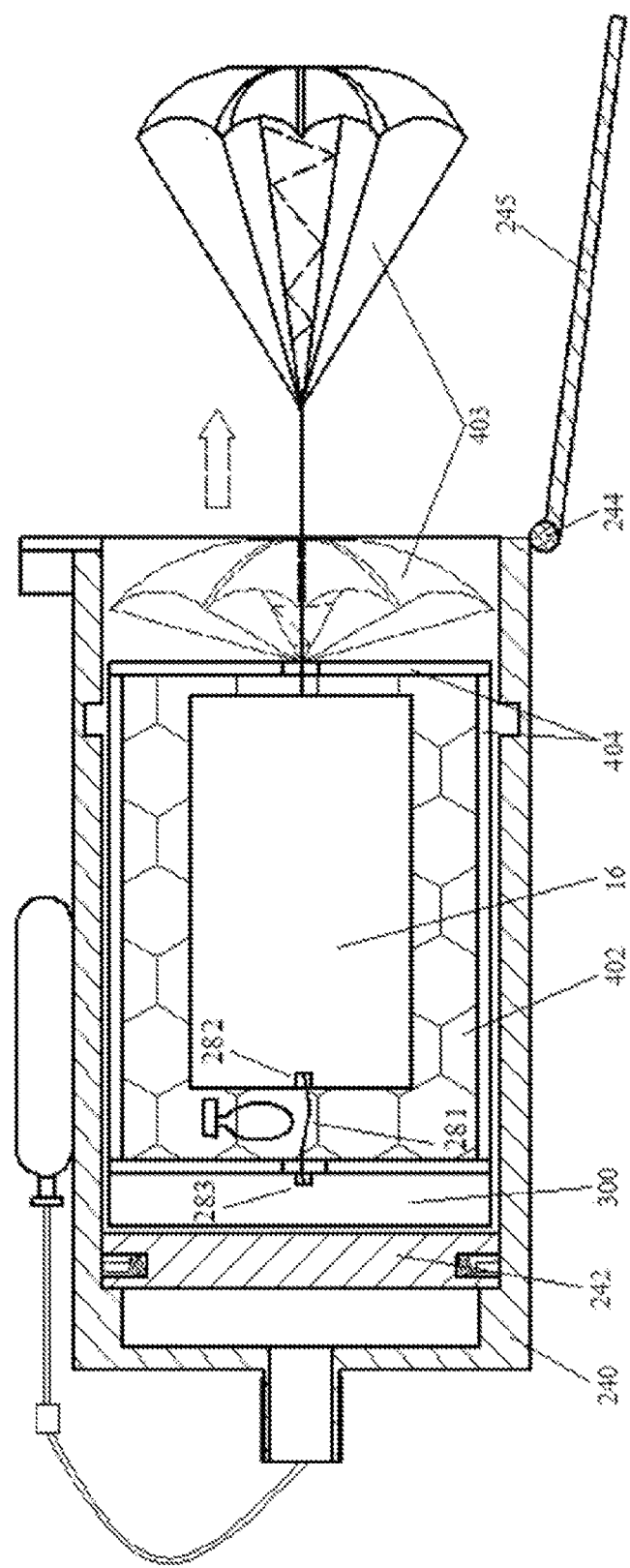
Figure 7C:
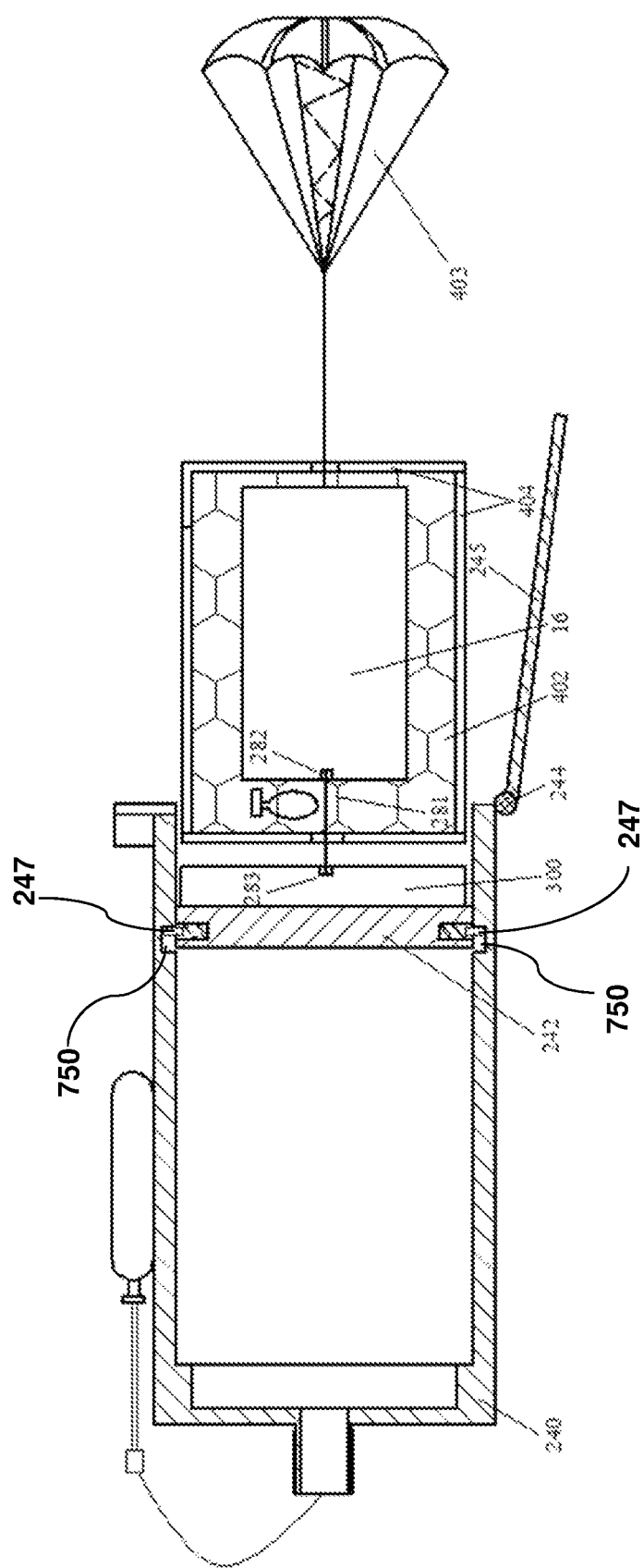

FIGS. 7B and 7C illustrate a portion of a sequence of ejecting the flight data recorder 16 and related components, similarly to as illustrated in FIGS. 6A-6E, described above. As shown in FIG. 7B, the panel 245 has rotated outward, enabling spring-loaded parachute 403 to expel itself from the internal cavity of the housing or cylinder 240. In FIG. 7C, the flight data recorder 16 enclosed in housing 404 has been mostly ejected from the housing or cylinder 240, and piston 242 can be locked in place at the end of it stroke. As shown in FIG. 7C, the spring-loaded plungers 247 have extended radially outward into circular groove 750. One advantage of this arrangement over the arrangement shown in FIG. 6E is that the piston 242 is now mechanically limited or restrained from moving backward back into the cylinder 240, which can help to seal the hole in the aircraft fuselage and/or to limit any adverse aerodynamic effects of the hole in the fuselage through which the ejected components passed.

FIGS. 7D and 7E are a side cross sectional view and an end view, respectively, of the cylinder or housing 240 of FIG. 7A. FIGS. 7F and 7G are a front view and a side cross sectional view, respectively, of the piston 242 of the embodiment of FIG. 7A. As shown in these views, the piston 242 in this embodiment comprises four equally spaced plungers 247, each plunger 247 having a spring 751 positioned behind it for biasing the plunger radially outward. Although in this embodiment the system comprises four spring-loaded plungers 247, other embodiments may comprise more or fewer plungers. Further, various other locking mechanisms may be used in addition to or in lieu of a spring-loaded plunger system.

Figure 7H:
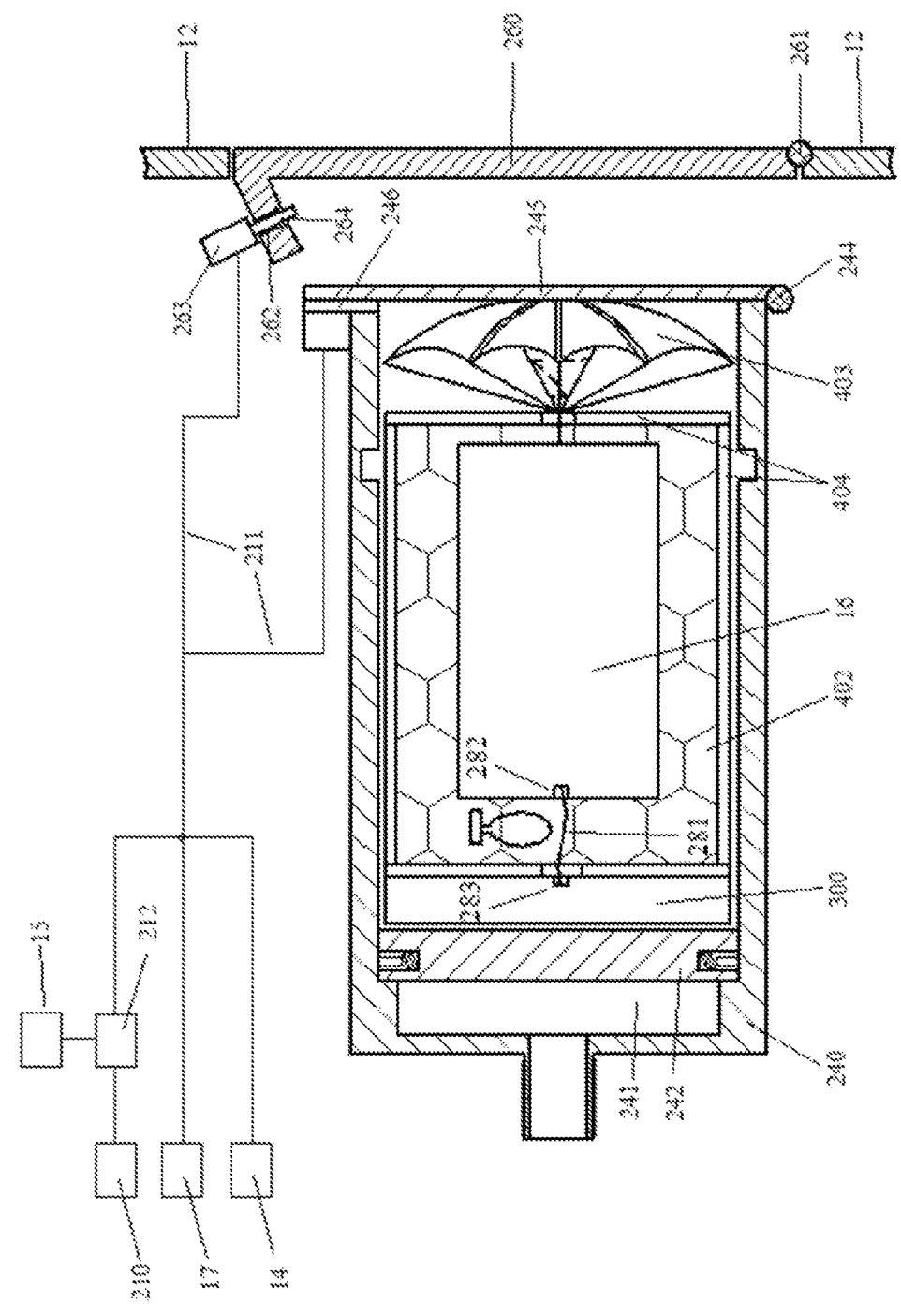

FIG. 7H illustrates an embodiment of the ejectable flight data recorder system of FIG. 7A in position behind a panel 260 of an aircraft fuselage 12. The embodiment illustrated in FIG. 7H is similar to the embodiment illustrated in FIG. 2B, as described above.

Emergency Inflatable Soft Landing System (EISS)

The disclosure below provides additional details for systems and devices that comprise inflatable features for assisting in a soft and/or survivable landing of a component ejected from an aircraft. These systems and devices may be used in combination with other systems and devices disclosed herein (for example, ejectable flight data recorders, towed tracking devices, and/or the like) and/or with other types of devices intended to be ejected or separated from an aircraft in flight. With reference to FIG. 1, such an ejectable device comprising inflatable soft-landing features as disclosed herein may be positioned at various locations on an aircraft 10, including, for example, possible locations 110. Although other locations may be used, one possible first location is generally at the rear part of the aircraft and a possible second location is at the backward portion of the tip of the vertical tail.

Figure 8A:
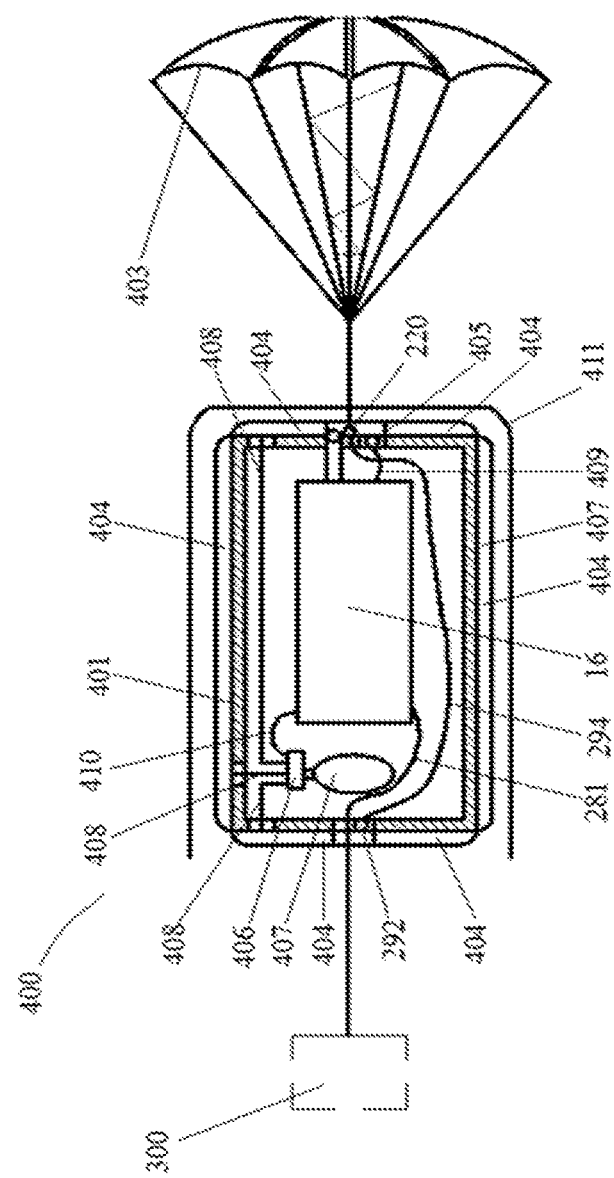
FIG. 8A is a side elevation view in cross-section of an embodiment (without filler material shown) before an airbag subsystem is inflated.
Figure 8B:
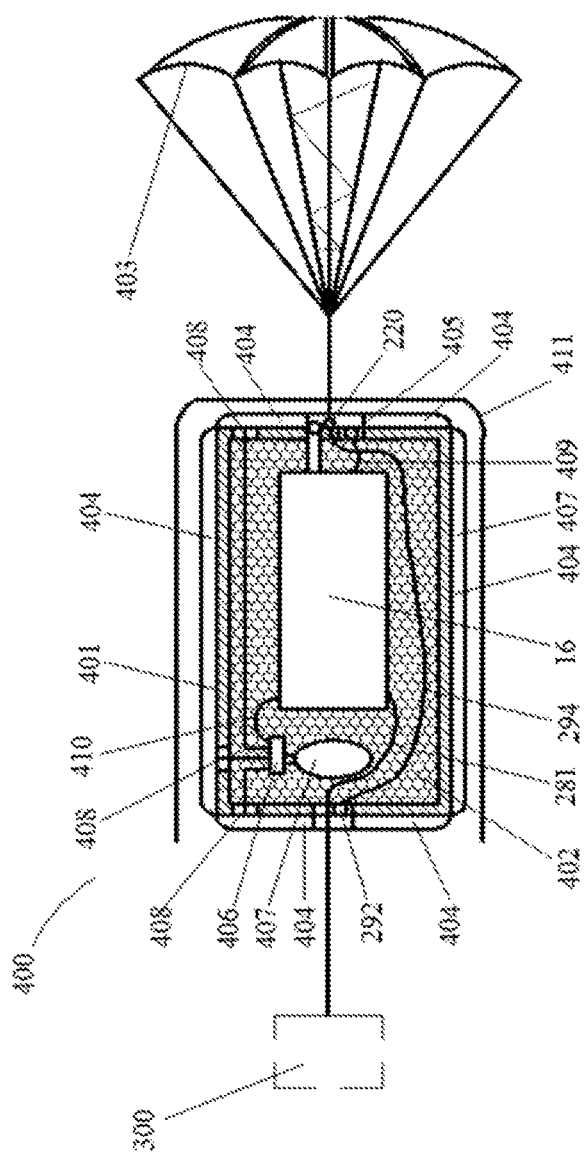
FIG. 8B is a side elevation view in cross-section of the embodiment of FIG. 7A with filler material shown and before the airbag subsystem is inflated.

FIGS. 8A and 8B show a simplified schematic cross-section of an embodiment of an EISS 400 according to an aspect of the present disclosure. A housing 401 defines a compartment for enclosing an EFDR 16, a valve 406, a gas-tank module 407, pipes 408, and data cables 409, 281, 410, and 294. A shock-absorbing filler material 402 can be provided for filling the space between the housing 401 and EFDR and other components enclosed by the housing 401, as shown in FIG. 8B. A SEP 403 can be connected with the housing 401. The SEP 403 can be provided for assisting in ejection from the aircraft and/or decelerating the EFDR during its descent towards land or water. An inflation subsystem includes an altitude sensor 405, valve 406, a gas-tank module 407, pipes 408, data cable 409 and data cable 410. The inflation subsystem can be provided for inflating the airbag subsystem 404. The altitude sensor 405 can be mounted in housing 401 or on the airbag subsystem 404. Altitude data measured by the altitude sensor 405 can be transferred to the EFDR 16 through data cable 409. Flight data from the aircraft can be transferred by the TITCS 300 to the EFDR 16 through the data cable 281 (assuming the EFDR 16 is still connected to the TITCS 300). The valve 406 can be controlled by the EFDR 16 through data cable 410. The gas-tank module 407 may include one or more gas tanks. The gas-tank module 407 can be provided for storing compressed gas used for inflating airbag subsystem 404. Pipes 408 connect the valve 406 with the airbag subsystem 404. Airbag subsystem 404 can be placed on the outside surface of the housing 401. The airbag subsystem 404 and the housing 401 can be preferably wrapped within or enclosed by a sleeve 411. The sleeve 411 can separate from airbag subsystem 404 after, or during the inflation of the airbag subsystem 404. The airbag subsystem 404 can include several airbag modules. Each airbag module comprises one or more airbags. The airbag subsystem 404 can be provided for achieving or assisting in achieving a soft-landing and/or buoyancy in the event of a water landing. A locking module 220 can be mounted in the housing 401 and can be in operative communication with a water sensor 292 by a data cable 294. The water sensor 292 may be mounted on the housing 401 or on the airbag subsystem 404.

Figure 8C:
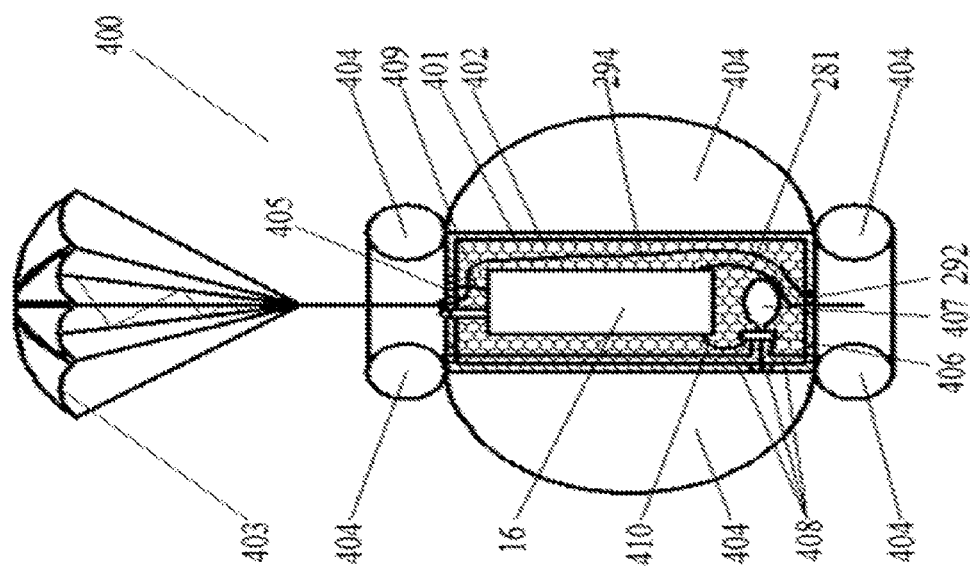
FIG. 8C is a side elevation view in cross-section of another embodiment when an airbag subsystem is inflated.

FIG. 8C shows another simplified schematic cross-section of an embodiment of an EISS 400. The EISS 400 is similar to the embodiment illustrated in FIGS. 8A and 8B and is configured to disconnect from the TITCS 300 (shown in FIGS. 8A and 8B) when a threshold tensile force in the connecting cable is exceeded. This tensile force can be caused by air drag produced from the SEP 403 when it deploys or opens in the airstream surrounding the aircraft. When separation is achieved from the TITCS 300, the EFDR 16 held by the EISS 400 can be decelerated during the descent by the SEP 403. If the EFDR 16 falls below a preset altitude, the valve 406 can be activated. The valve 406 releases compressed gas from the gas-tank module 407. The compressed gas can be transferred to inflate the airbag subsystem 404 through pipes 408. FIG. 8C illustrates the airbag subsystem 404 in an inflated configuration, while FIGS. 8A and 8B illustrate the airbag subsystem 404 in a deflated or non-inflated configuration. The inflated airbag subsystem 404 can help to decelerate the EFDR 16 by increasing the drag forces acting on the EISS as it descends through the atmosphere. The sleeve 411 (shown in FIGS. 8A and 8B) can separate from airbag subsystem 404 after, or during the inflation of the airbag subsystem 404. In FIG. 8C, the sleeve 411 is not shown, because it has separated from the airbag subsystem 404. In some embodiments, one or more additional parachutes may be coupled to the EISS 400 and configured to deploy after ejection from the aircraft, and/or below a threshold altitude, to further slow the descent of the EFDR 16.

Figure 8D:
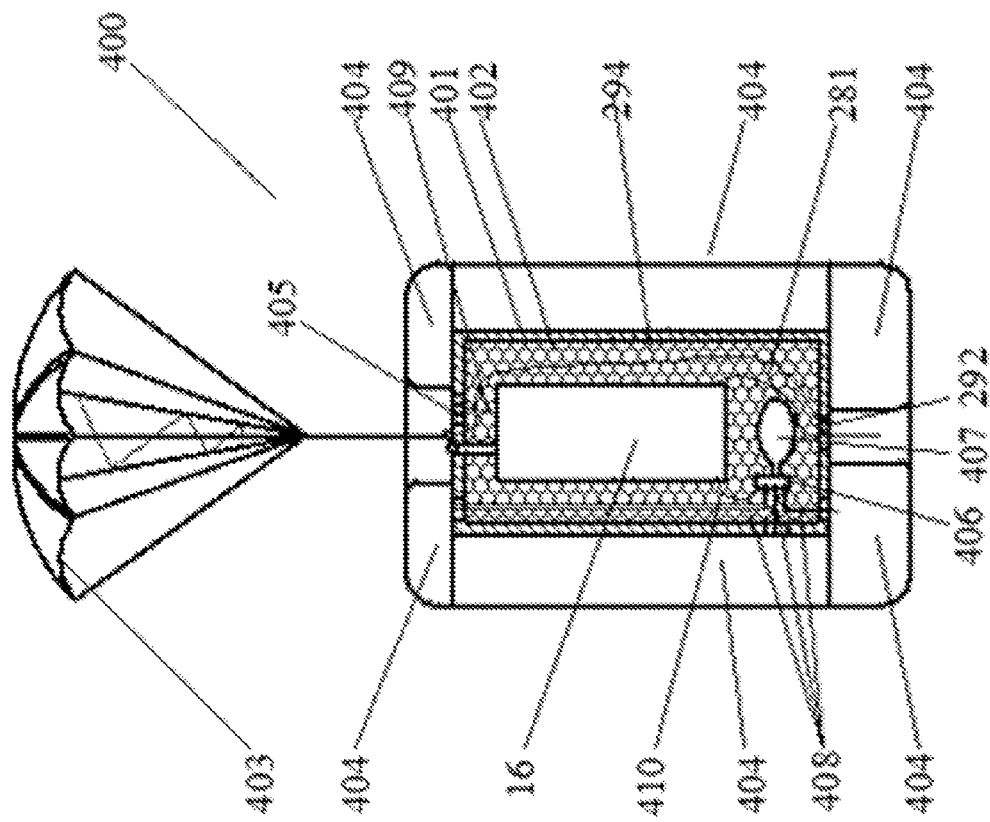
FIG. 8D is a side elevation view in cross-section of another embodiment when an airbag subsystem is inflated.

FIG. 8D illustrates an alternative embodiment of an EISS 400 similar to the embodiment shown in FIG. 8C but having a different inflated shape or arrangement of the airbag subsystem 404. Specifically, the airbag subsystem 404 shown in FIG. 8D comprises a generally cylindrical inflated shape, whereas the airbag subsystem 404 shown in FIG. 8C comprises three distinct inflatable shapes, namely a top annular shaped portion, a bottom annular shaped portion, and a middle portion comprising a rounded or spherical shape positioned about the housing 401. One advantage of the configuration shown in FIG. 8D over the configuration shown in FIG. 8C is that the airbag subsystem 404 is more uniform about the housing 401, and thus the system may be more capable of dampening impact shock when the system lands at a random orientation, instead of in a vertical orientation as depicted in the figures.

Figure 9A:
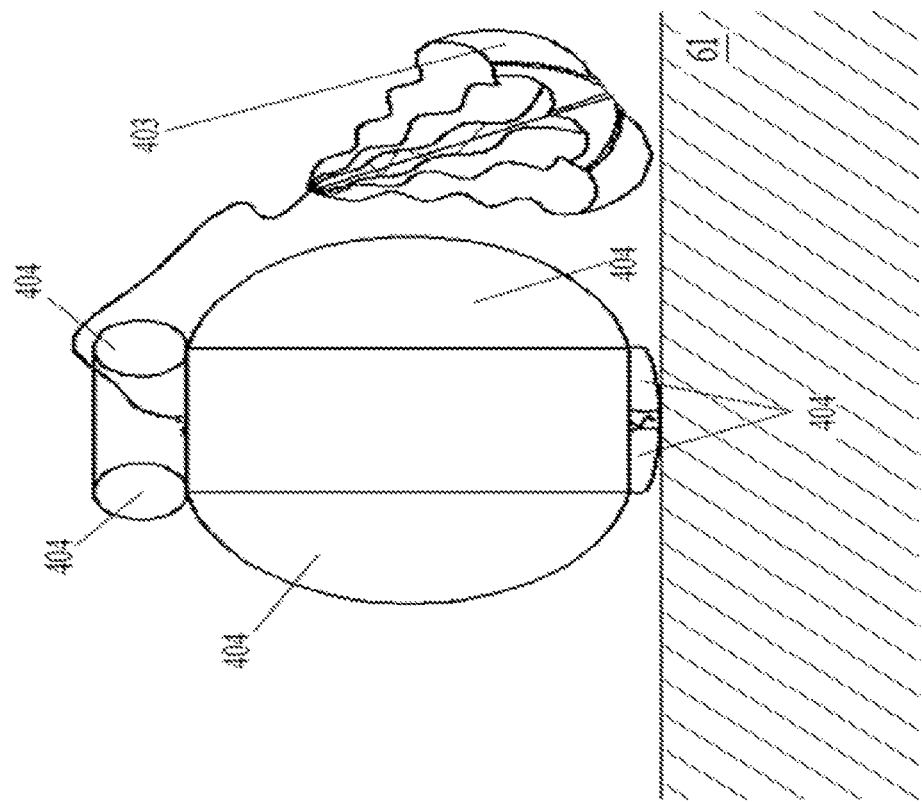
FIG. 9A is a simplified diagram showing an embodiment of an EISS after soft-landing on the ground.
Figure 9B:
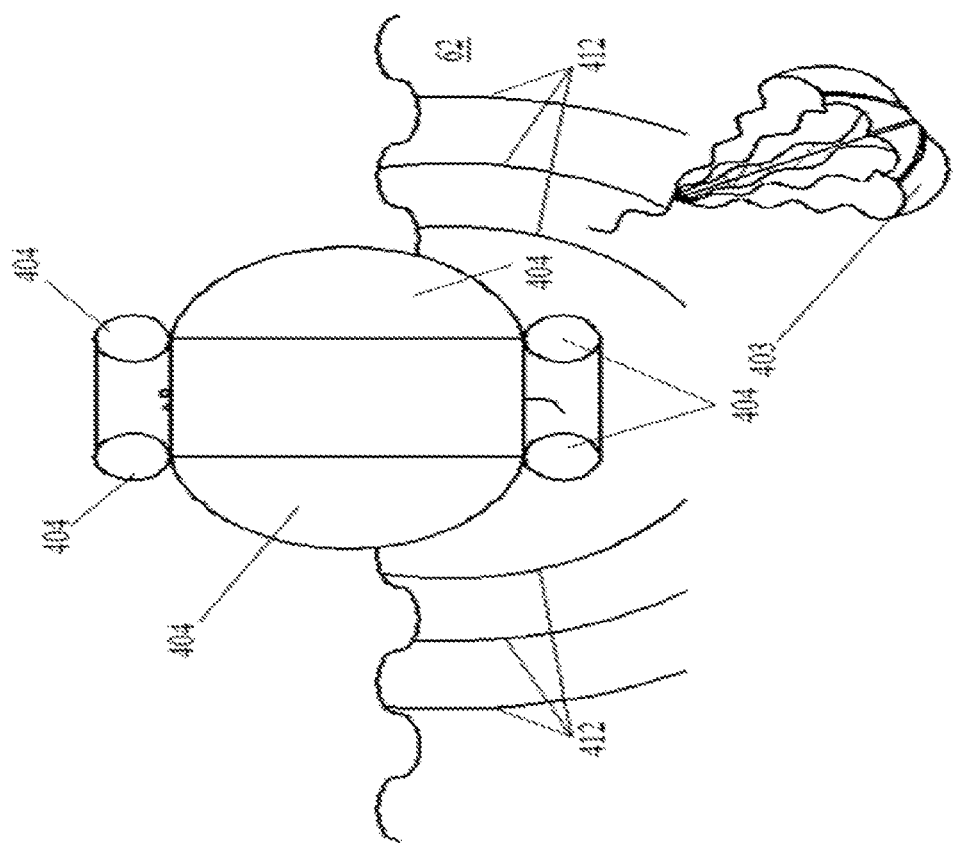
FIG. 9B is a simplified diagram showing an embodiment of an EISS after soft-landing and floating on water.

FIG. 9A and FIG. 9B illustrate configurations of the EFDR held by the EISS 400 (for example, the embodiment of FIG. 8C) after a soft landing is achieved on ground 61 or water 62, respectively. When the EFDR 16 lands on water 62

Figure 9C:
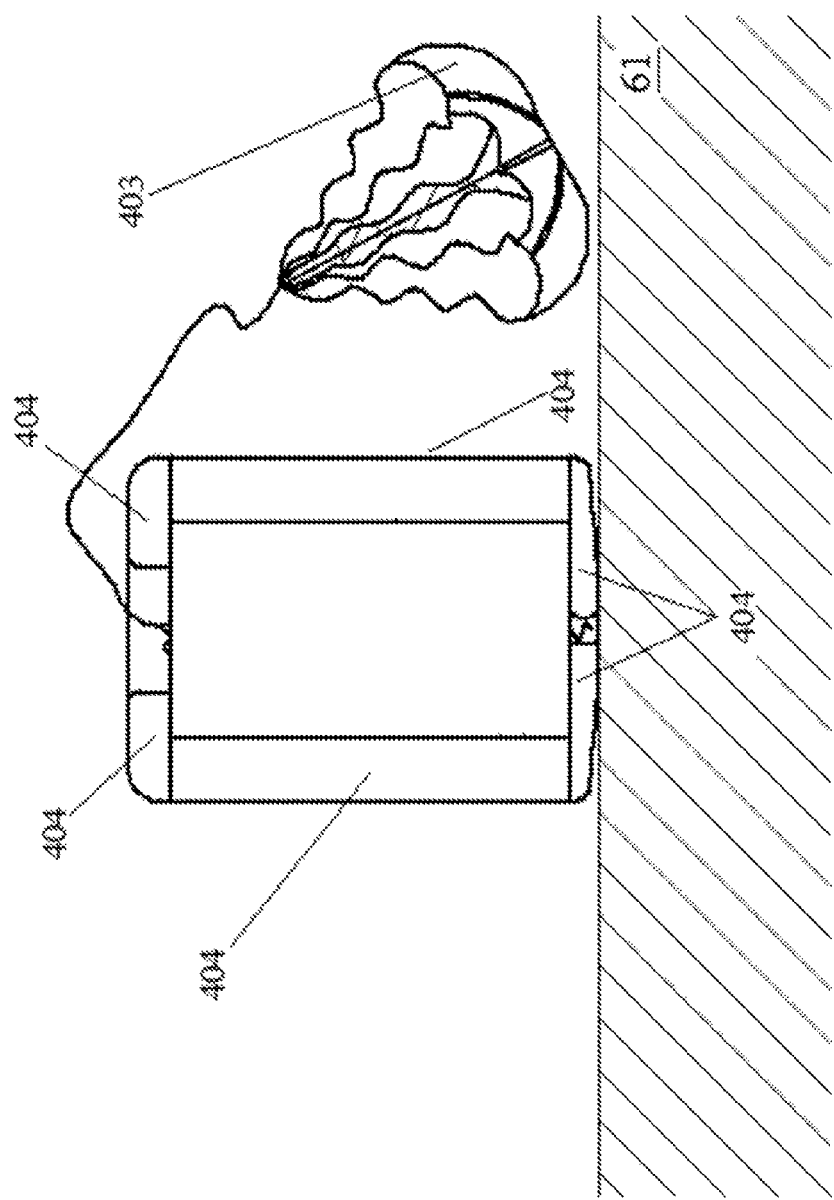
FIG. 9C is a simplified diagram showing another embodiment of an EISS after soft-landing on the ground.
Figure 9D:
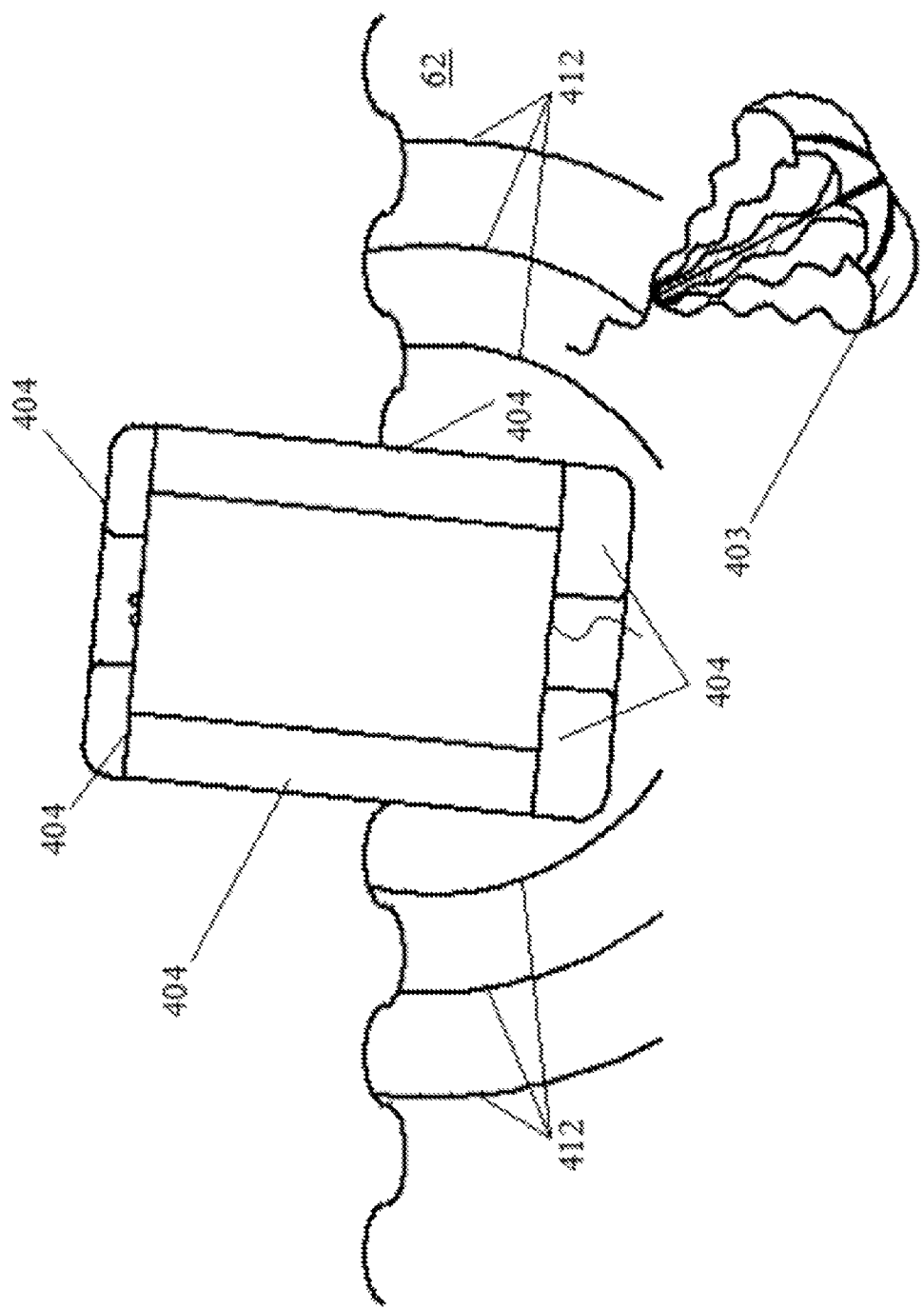
FIG. 9D is a simplified diagram showing another embodiment of an EISS after soft-landing and floating on water.

(as shown in FIG. 9B), the airbag subsystem 404 provides sufficient buoyancy so that the EISS floats on or near the surface of the water 62. When the EISS reaches the water a locking module (for example, the locking module 220 illustrated in FIGS. 5B and 5C) unlocks, thereby separating the SEP 403 from the housing 401. While the EFDR 16 floats on the water a shark repellent 412, which is desirably painted or coated on the airbags 404 is diffuses in water 62. This can protect the EFDR 16 from being swallowed by sharks. When the EFDR lands on the ground (as shown in FIG. 9A), the airbag subsystem 404 can cushion the landing, reducing shock loading on the internal components. Further, although not shown in FIG. 9A, in some embodiments, the parachute 403 can also automatically separate, similar to as when the device lands in water. FIGS. 9C and 9D illustrate configurations of the EFDR held by the EISS 400 after a soft landing is achieved on ground 61 or water 62, respectively, but using the embodiment shown in FIG. 8D instead of FIG. 8C.

Figure 9E:
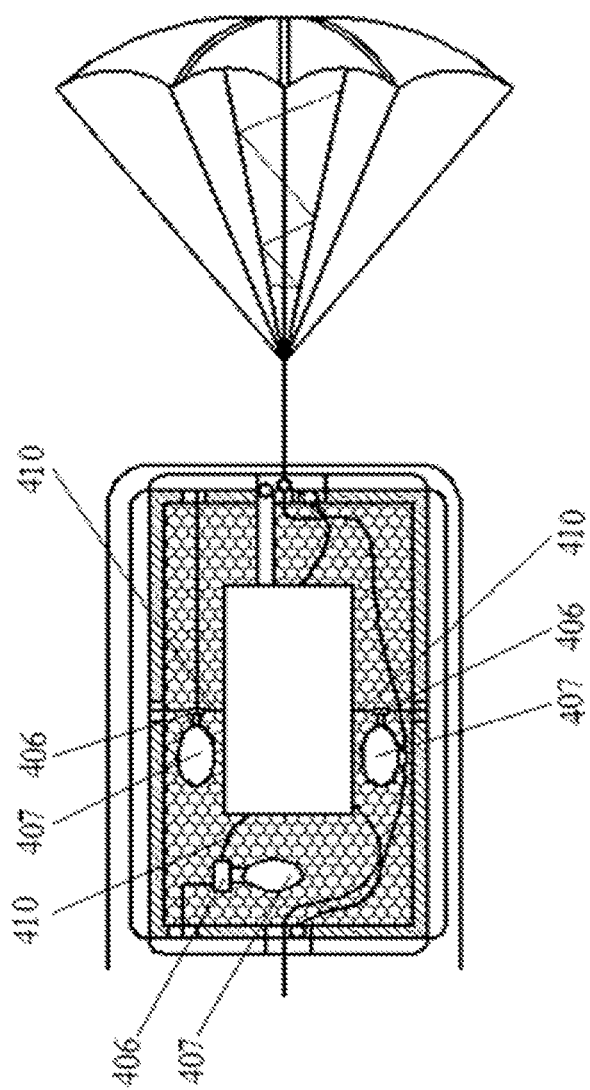
FIG. 9E is an illustration of multi-gas-tank arrangement for an EISS according to another embodiment.

FIG. 9E shows an embodiment of a multi-gas-tank arrangement of the gas tank module 407. The number of gas tanks in this embodiment can be more than one, for example, to enable having a different gas tank for each airbag module. The corresponding valves 406 and data cables 410 for the tanks may also be greater than one, as shown. A multi-gas-tank arrangement can be desirable as each airbag module of the airbag subsystem 407 can be inflated independently, which can make for a more uniform and consistent inflation of each airbag module. In some embodiments, there are fewer gas tanks, but more than one valve for each gas tank, thus also enabling independent inflation of at least some of the airbag modules.

Figure 10A:
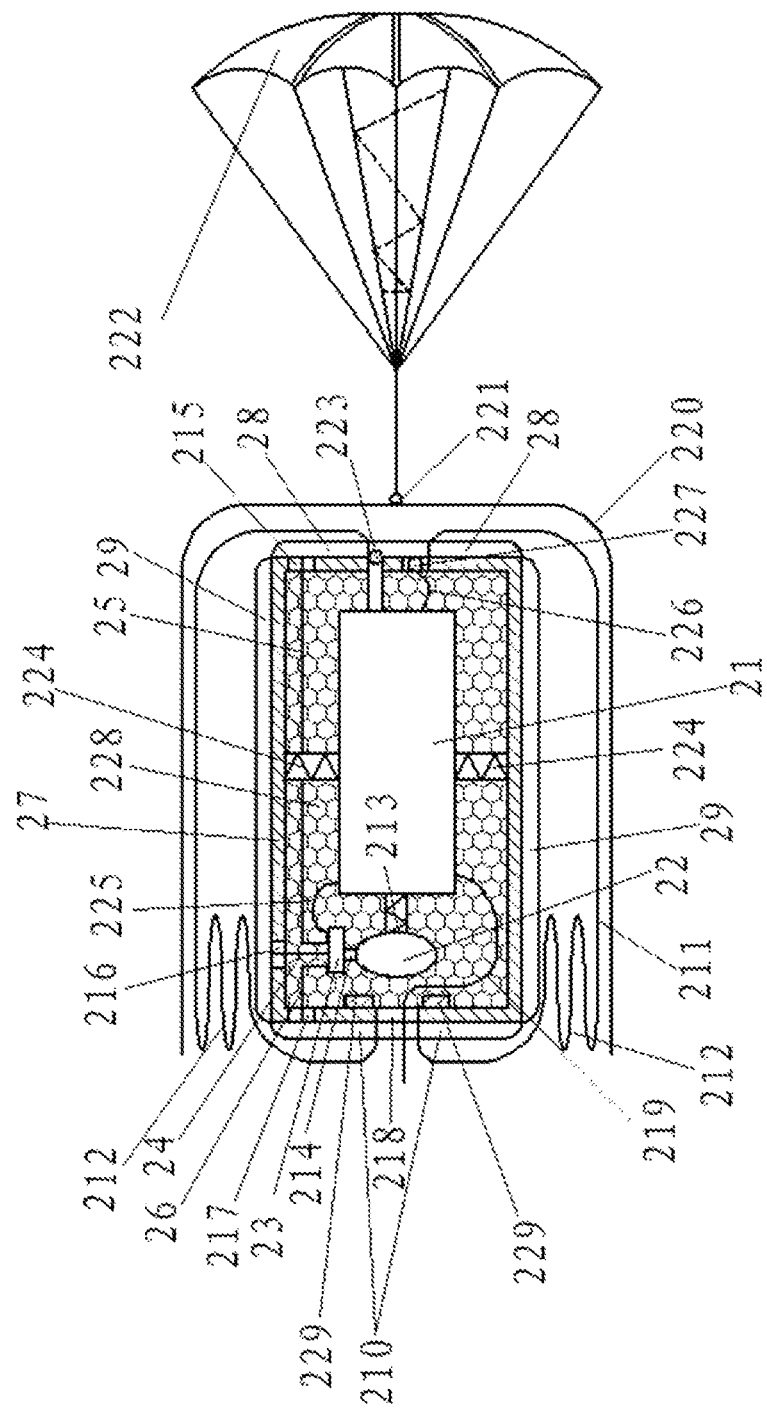
FIG. 10A is a side elevation view in cross-section of an embodiment according to the present disclosure.

FIGS. 10A-10G illustrate additional embodiments of inflatable soft landing and flotation systems. FIG. 10A shows a simplified schematic cross-section of an embodiment of an emergency inflatable soft-landing and floating subsystem. The emergency flight data recorder 21 can be located in a housing 27. The elastic material 228, such as cellular plastic, can be filled between emergency flight data 21 and housing 27, which can absorb the impacting energy. The emergency flight data recorder 21 and housing 27 can be attached to each other by springs 224, which can buffer the energy of impacting during landing to protect emergency flight data recorder from impact.

An airbag subsystem, which can include three airbag modules 28, 29, 210, can be attached on the housing 27, which can be inflated by an inflation subsystem 22. The top airbag module is 28. The circle-around airbag module is 29. The bottom airbag module is 210. The airbags in the top and/or the bottom airbag modules can be preferably cyclic airbags. Each airbag module can comprise one or more airbags. The airbags can be made of the material that is strong enough to prevent puncture and has good pressure tightness to prevent the penetration of water. The inflation subsystem can be a single-gas-tank arrangement, shown in FIG. 10A, or a multi-gas-tank arrangement, shown in FIG. 10G. The elastic material 228 can also be filled between the inflation subsystem and housing 27, absorbing the impacting energy. The compressed air, stored in gas tank can make airbags be fully inflated in a few seconds. A transponder 223 and a height sensor 227 can be mounted at the center of top airbag module 28 and data cable 219 can go through the center of bottom airbag module 210. The inflation subsystem 22 and emergency flight data recorder 21 can be attached each other directly or by a connector 213. The connector 213 can be a spring, which can absorb the impact energy when crashing.

The gas tank of inflation subsystem can be under the emergency flight data recorder, close to the bottom airbag module. There can be a ballast weight 229 under the emergency flight data recorder, close to bottom airbag module. This ballast weight can be cyclic and made of steel. The ballast weight can make the whole emergency inflatable soft-landing and floating system get a low center of gravity. There can be a pipe 214 connects the valve 23 with gas tank of inflation subsystem 22. The valve can be a time-delay switch controlled by signal from emergency flight data recorder. A data cable 225 connects the valve 23 and emergency flight data recorder. A height sensor 217 can also be connected with the emergency flight data recorder 21 by cable 226. The height data from the height sensor 217 can be another condition of activating the valve 23. Inflation under a certain height can protect airbags from over-inflation, which can lead to breaking of airbags. When triggered by emergency flight data recorder, the valve is open to exhaust gas from gas tank. Some pipes 24, 25, 26 can connect the valve and airbags. These pipes run through the housing 27 by holes 215, 216,217, transforming the air to airbag modules. The canopy of parachute 211 can be stitched on the circle-around airbag module 29 and the suspension lines 212 connect the parachute 211 and housing 27. The parachute 211 can be inflated by the air during the falling, decelerating the falling emergency flight data recorder 21. A shield 220 coves the parachute 211, connected with a spring-loaded extraction parachute 222 by an iron ring 221, protecting the subsystem from impacting. The shield bundles the rest part of soft-landing subsystem by a Velcro. A data cable 219, connected with the emergency flight data recorder, runs through a hole 218, transforming the data from towing tracking system to the emergency flight data recorder. The data cable 219 can be pulled away from the emergency flight data recorder 21 or towing tracking system. Then the data transforming between emergency data recorder and forward devices can be stopped.

When the data cable 219 is detached from emergency flight data recorder, the emergency data recorder start to analyze both the data lost state and the height data from sensor 217. Once the data losing happened and the height data satisfy the certain threshold, the emergency flight data recorder sends the energizing signal to the valve 23 through data cable 225. Once the valve gets the energizing signal and after a fraction of a second, the gas can be exhausted from the gas tank by time-delay switch and led to airbag modules 28, 29, 210 by pipes 24, 25, 26, inflating these airbags in a few seconds. In the inflation process of airbags, the shield, covering the parachute 211, can be opened by the expending force from the airbags.

Figure 10B:
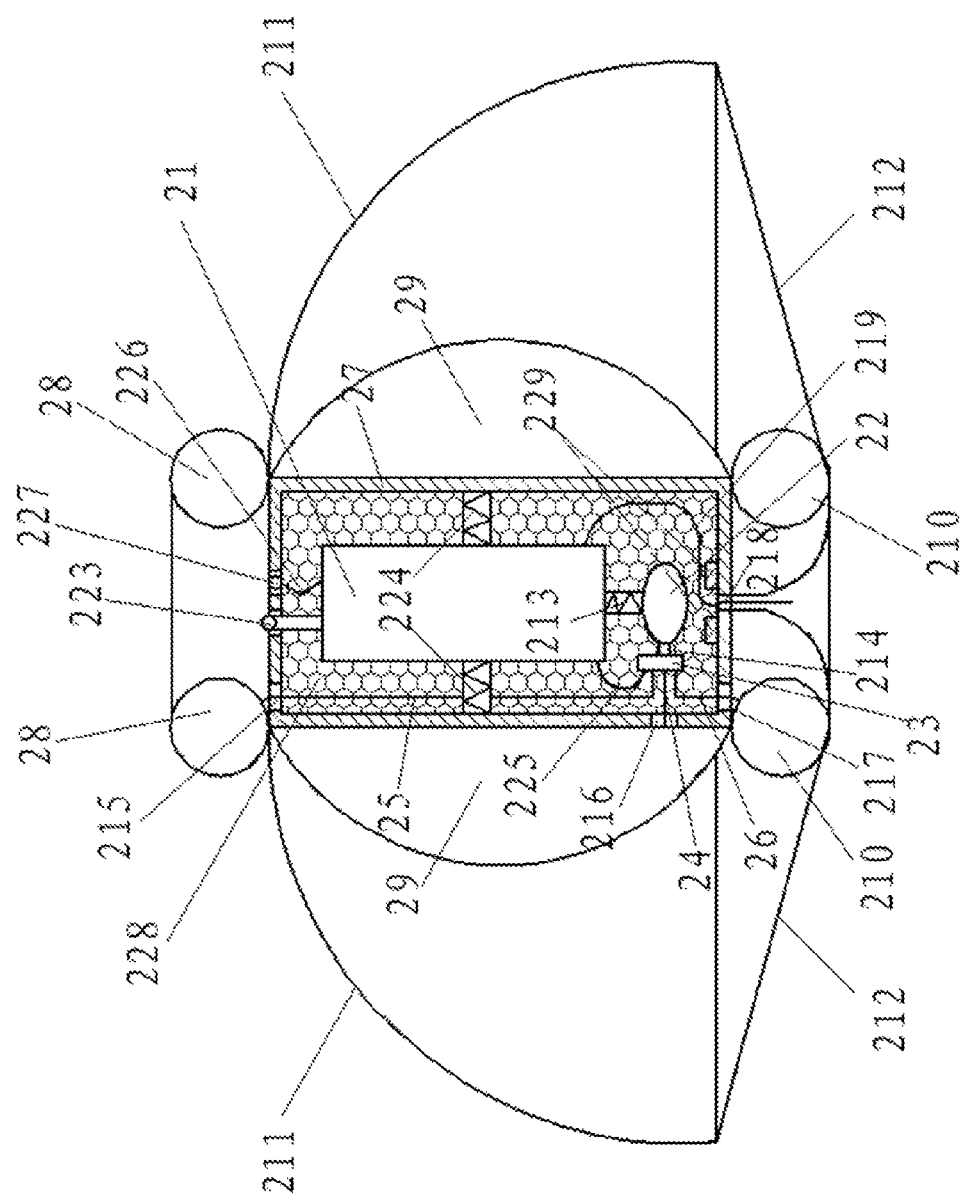
FIG. 10B is a side elevation view in cross-section of an embodiment according to the present disclosure.

FIG. 10B shows a simplified schematic cross-section of a working state (e.g., while descending) of the apparatus of the embodiment of FIG. 10A. The airbag modules 28, 29, 210 and the parachute 211 can be inflated and decelerate the emergency flight data recorder 21 in the air, soft landing or floating it finally. The combination of the parachute and airbags makes devices even more compact, which integrates the superiority of parachutes and airbags and improve the validity and reliability of slowdown and cushion landing effectively, making the subsystem much better than using anyone of them alone as the deceleration and soft-landing devices. The gas tank 22 and the ballast weight 229 can be positioned under the emergency flight data recorder and this arrangement can make the center of gravity of the whole emergency inflatable soft-landing and floating system more close to the bottom airbag module. This arrangement can keep the transponder 223 always pointing to sky, no matter on land or floating on water, which is good to transmitting the signal.

Figure 10C:
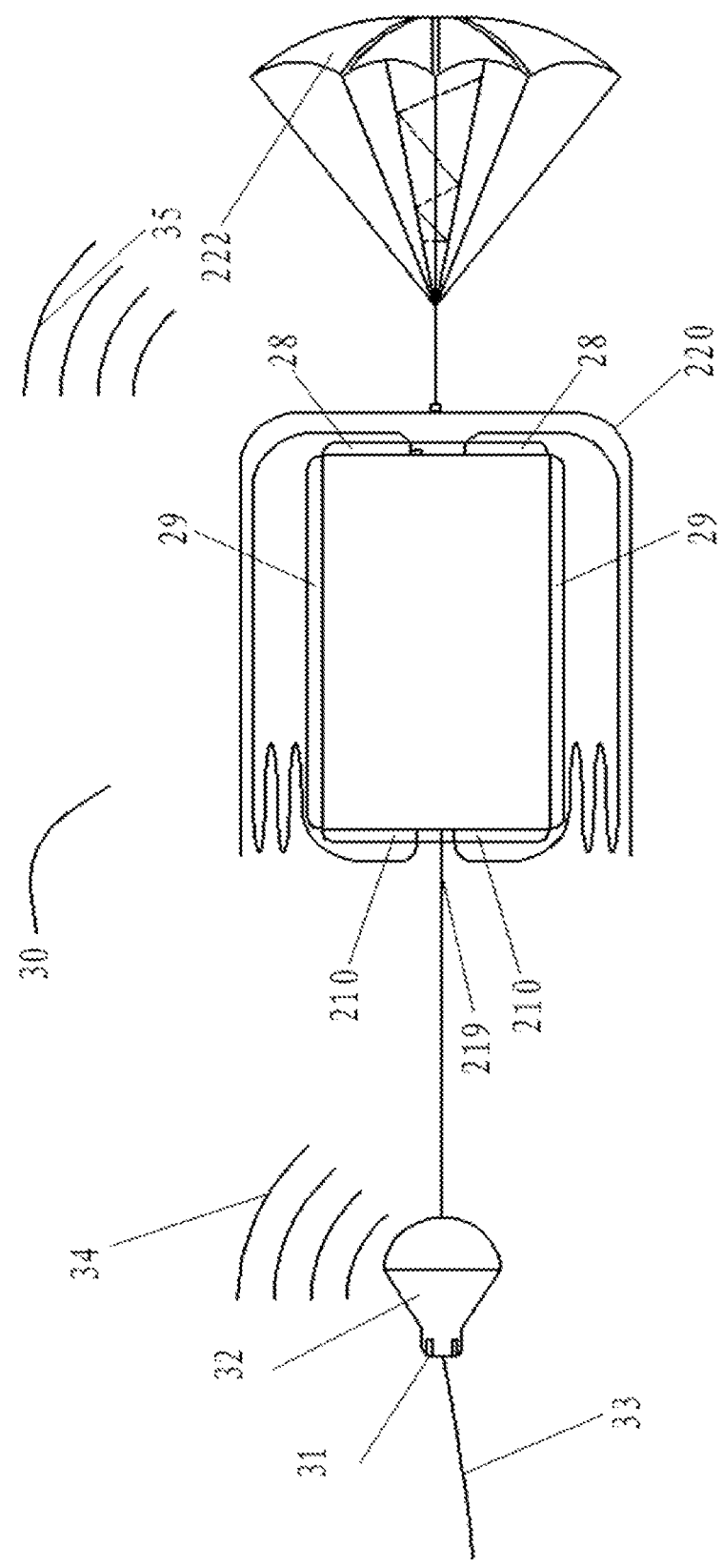
FIGS. 10C and 10D are schematic diagrams of an embodiment of soft-landing system trigger mechanisms.

FIG. 10C shows the first stage of the soft-landing system trigger mechanism. This stage is defined from the moment when the emergency flight data recorder is ejected out of the aircraft to the moment when the spring loaded extraction parachute separates from the emergency flight data recorder. This stage preferably only last very few seconds because the separation happens rapidly. At this stage, the whole soft-landing system can be bundled by the shield 220. A data cable 219 connects the emergency flight data recorder and the towing tracking system. The data joint on both sides of the data cable can be designed to be detachable. When the emergency flight data recorder is ejected out of the aircraft, the aerodynamic drag provided by the spring loaded extraction parachute 222 pulls the emergency flight data recorder toward the opposite direction of the aircraft. This pulling force can separate the data cable 219 from towing tracking system or emergency flight data recorder. Once the data line is detached, the emergency flight data recorder may not receive the signal data. In an embodiment, the loss of data signal and/or the detection of a certain height data can be a signal to trigger the gas tank. The airbag modules in the soft-landing system can start to inflate based on such a trigger. The expanding force from inflation of airbags can open the shield, which can be pulled away by the spring loaded extraction parachute. In the end of this stage, the spring loaded extraction parachute starts to separate from the emergency flight data recorder and the airbag-parachute subsystem starts to be inflate.

Figure 10D:
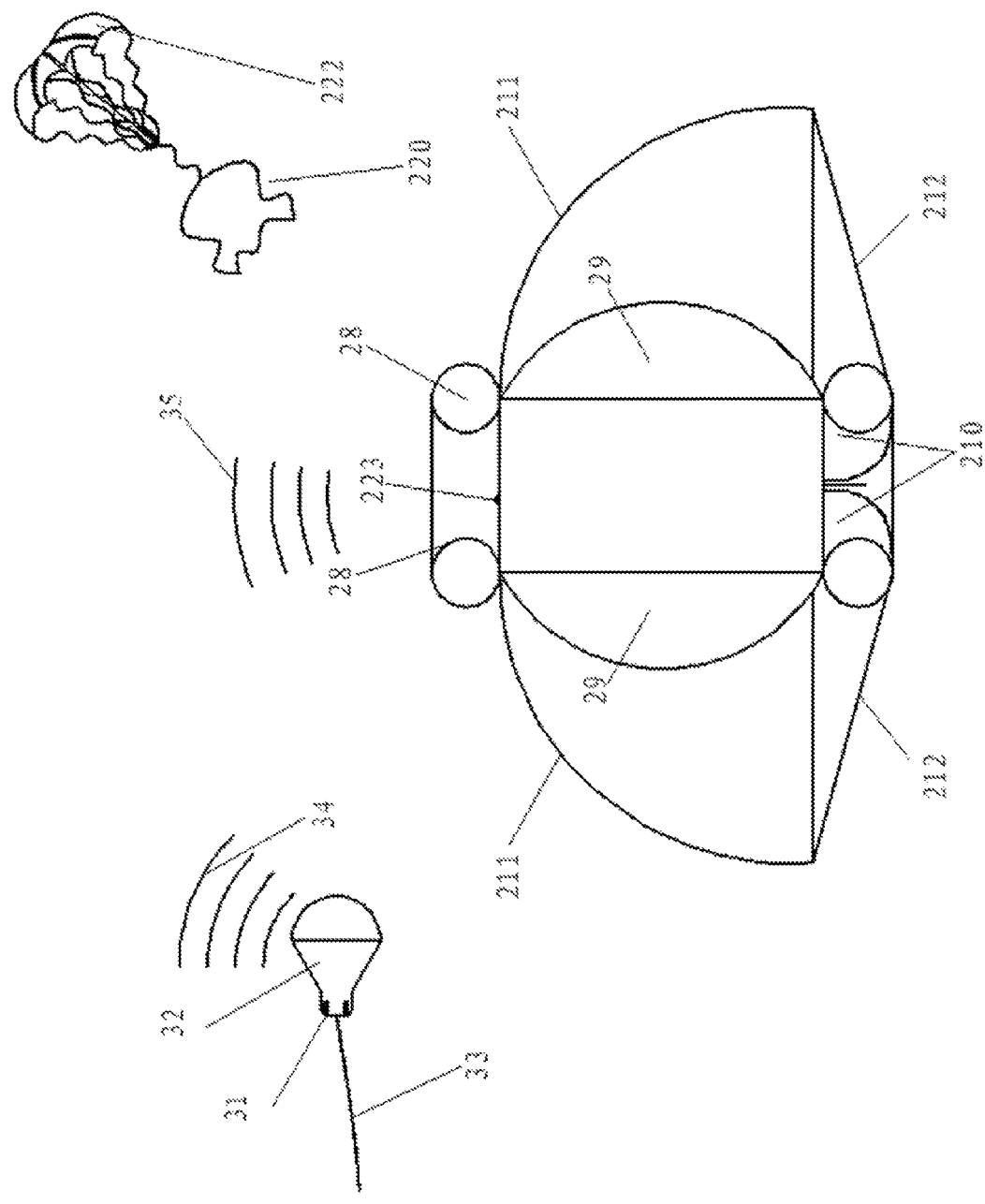

FIG. 10D shows the second stage of the soft-landing mechanism. This stage is defined from the moment when the spring loaded extraction parachute separates from the emergency flight data recorder to the moment when the emergency flight data recorder lands on land or water. In this stage, the airbag modules 28, 29, 210 and parachute 222 can be fully inflated to work on deceleration and soft-landing. There can be two possible scenarios in the soft-landing process. The first scenario is that the airbag-parachute subsystem softly land the whole emergency inflatable soft-landing and floating subsystem ejected at high altitude. The second scenario is that the airbag-parachute subsystem softly land the whole emergency inflatable soft-landing and floating subsystem ejected at low altitude. In the second scenario, the parachute of the airbag-parachute subsystem may not be able to fully inflate before the emergency flight data recorder lands in to the water or on the land. The aerodynamic shape of the airbag can be designed to not only provide protection from the impact when the emergency flight data recorder lands in to the water or on the land but also provide aerodynamic drag to slow the dropping velocity. The airbag modules 28, 29 & 210 can be inflated by same air tank through different pipes. The parachute 222 of airbag-parachute subsystem can be inflated by the air flow. The parachute of airbag-parachute subsystem slow the dropping velocity down not only by its air dynamic drag force but also by diverting the air flow direction so that the momentum exchange of between the soft-landing system and the air flow can make the soft-landing system into a certain glide mode.

Figure 10E:
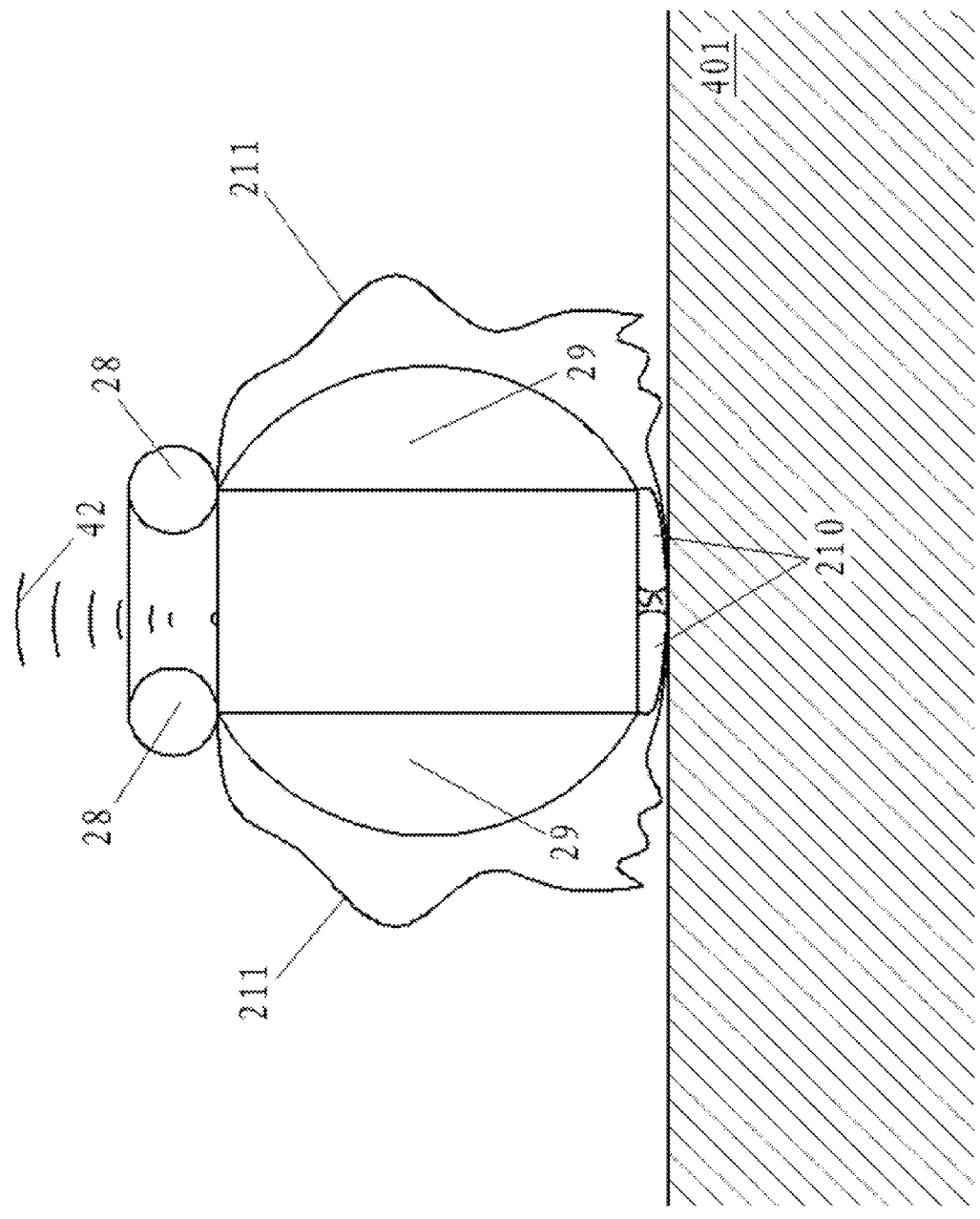
FIG. 10E is a simplified diagram showing an embodiment of an ejected emergency flight data recorder soft-landing on land.

FIG. 10E is an illustration of an emergency flight data recorder 21 landing on the land 401 by airbag-parachute subsystem. The bottom airbag module and the circle-around airbag module can absorb main energy of impacting land when landing. The top airbag module can protect the transponder 223 from impact.

Figure 10F:
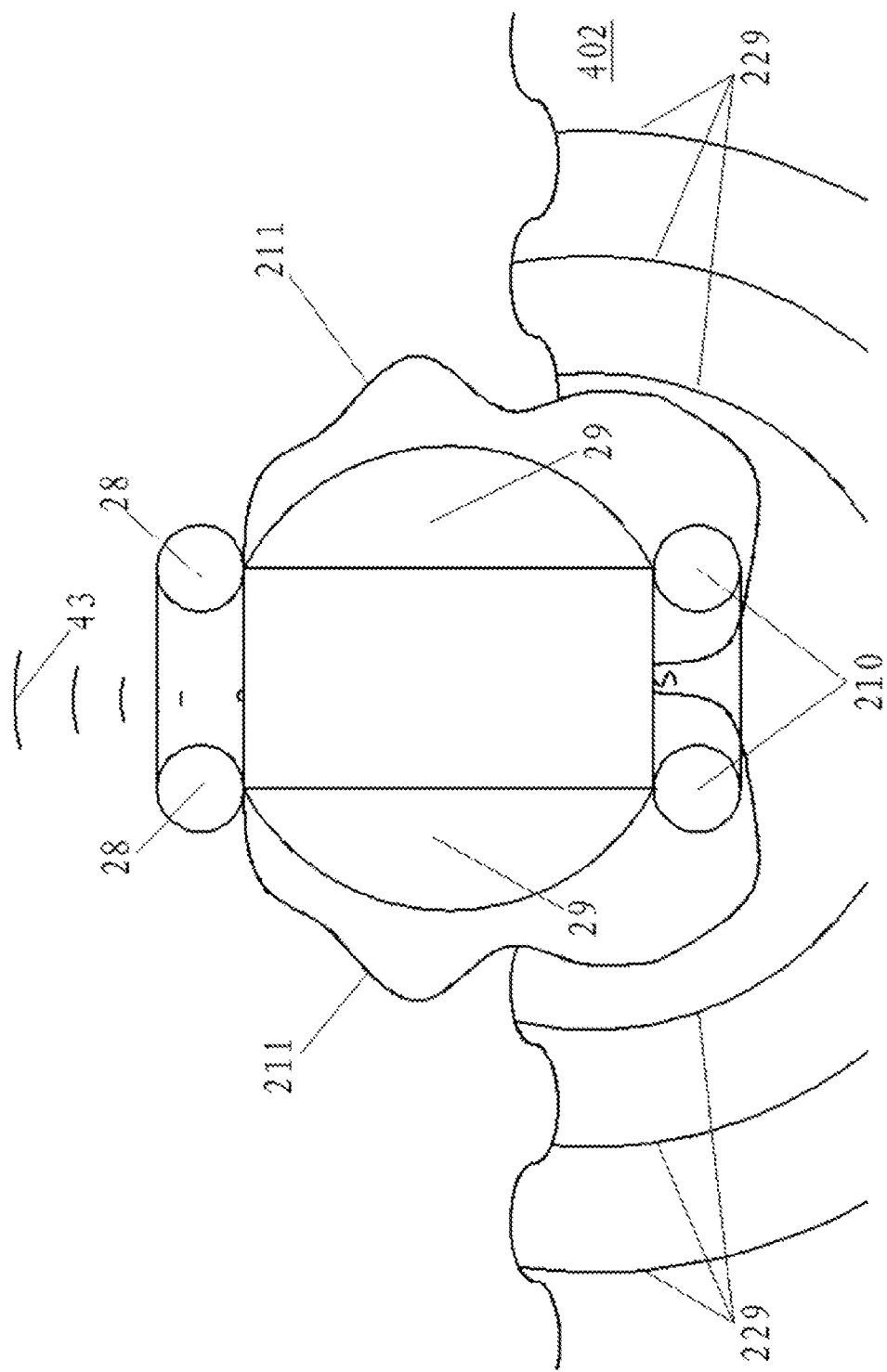
FIG. 10F is a simplified diagram showing an embodiment of an ejected emergency flight data recorder soft-landing floating on water.

FIG. 10F is an illustration of an emergency flight data recorder 21 floating on a body of water 402. The three inflated airbag modules can produce the buoyancy to float the emergency flight data recorder 21. With the low center of gravity, the transponder can always be kept pointing to the sky. When the emergency flight data recorder is floated on water, the shark repellent 229, painted on airbags, can diffuse in water, protecting emergency flight data recorder from swallowing by sharks.

Figure 10G:
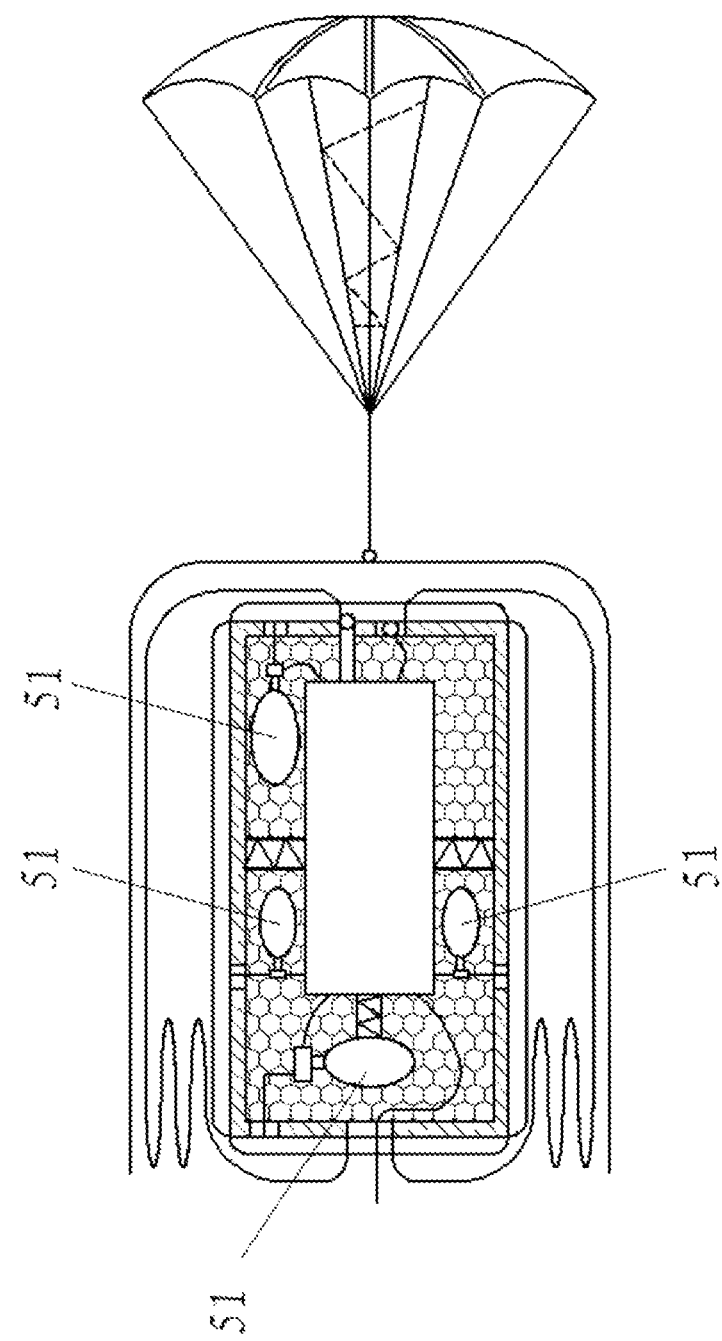
FIG. 10G is an illustration of an embodiment of a multi-gas-tank arrangement.

FIG. 10G shows an embodiment of a multi-gas-tank arrangement. The multi-gas-tank arrangement of inflation subsystem comprises three or more gas tanks 51. With multi-gas-tank arrangement, each airbag module can be inflated isolated and this can make each airbag module gets a homogeneous inflation. Furthermore, multi-gas-tank arrangement can improve the reliability of airbag modules, compared with the failure of inflation of airbags with one-gas-tank.

Figure 10H:
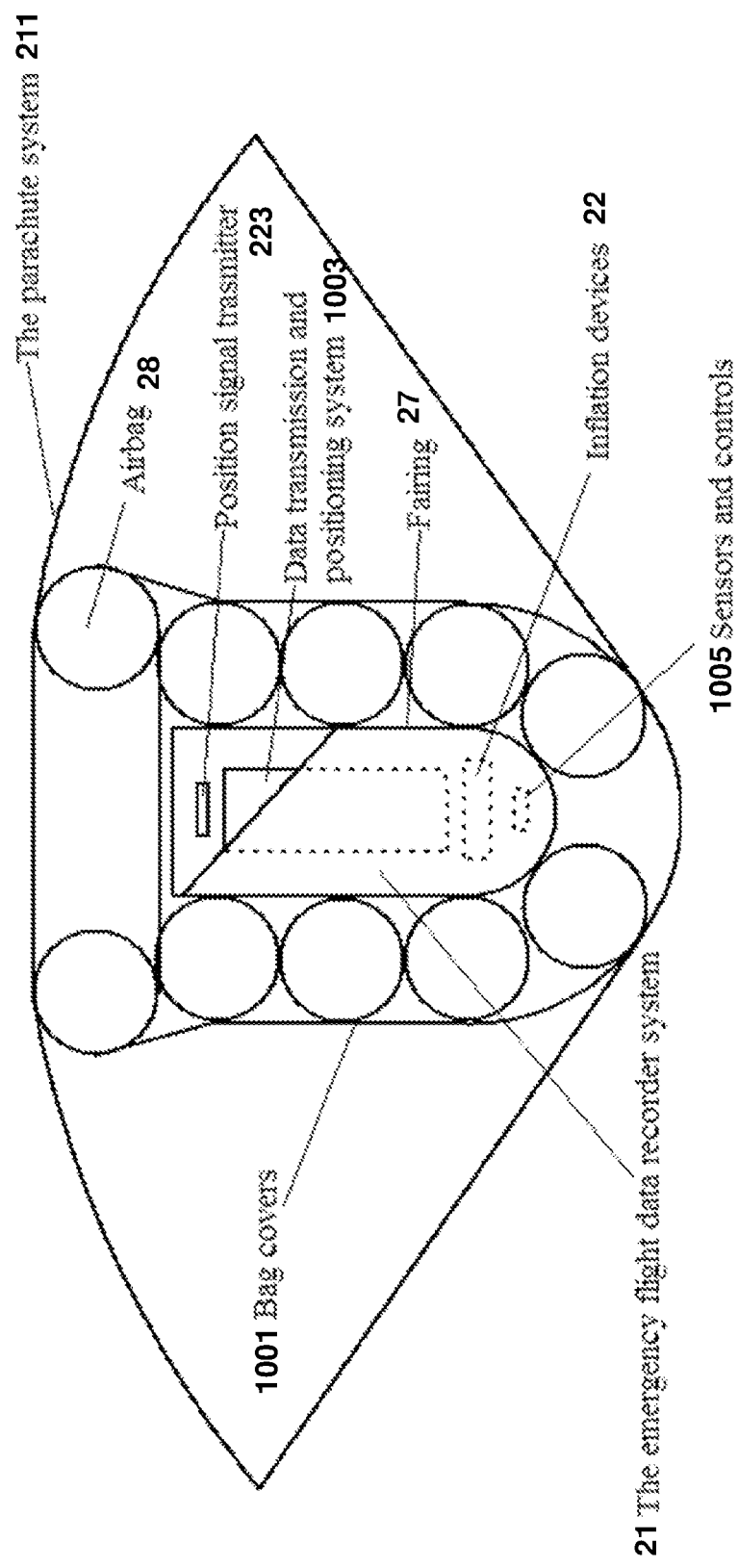
FIG. 10H shows a schematic of another embodiment of an emergency inflatable soft-landing and floating system.

FIG. 10H illustrates another embodiment of a soft landing and flotation system. The housing or fairing 27 can be preferably cylindrical in shape. One end has a shape of a hemisphere, which is called the lead part. The other end takes the shape of a cylinder, which is called the rear part. This particular shape can ensure that the device descends in a stable posture. This shape also ensures a better posture when the device hits the water to reduce impact from diving into the water to the entire system.

The airbag protection device 1001 protects the airbag from impact. The protection device covers the airbags 28 and seals the airbags 28 in the installation chamber before it inflates in order to protect it.

Within the fairing 27 can be an inflation device 22, sensors and controls 1005 and/or a position signal transmitter 223, e.g., radio beacon. The emergency inflation device can provide rapid inflation for the airbag. When the device is descending in the sky, the inflation device will be activated by the sensor, e.g., altitude sensor, allowing rapid air flow into the bag. This kind of inflation device has a small size and reacts rapidly to sensors.

The sensors and the control device provide real-time data collection and inflation control in the entire fly-ejection, descending, and ground landing/water landing process. The sensor will collect operating data of different equipment and transmit these data to the control device. When the value of designated parameters reach or exceed the designed critical value, the control device will activate the inflation device. The parameters to activate the system may include a measured pressure difference.

Surrounding the equipment, the airbags 28 can be preferably multi-cell and annular. As shown in FIG. 10H the airbags surround the fairing 27 containing the controls 1005, inflation device 22 and EFDR 21. The airbags 28 not only provide all-round buffering in land crash, greatly reducing ground impact damage to the equipment, but also make the equipment float on the water in sea crash. The airbags, as well as the Emergency Flight Data Recorder (EFDR) and other devices, can be preferably coated with shark prevention material to prevent fish swallowing, which improves the survivability of the entire device on the sea. In the rear part of the fairing, the distribution of airbags preferably looks like a wedge shape. With increasing diameters of airbags, this design can decelerate and buffer the whole system, improving the anti-overturn ability and floating stability.

Preferably, there is no airbag on the rear end face of the fairing so that the position signal can be transmitted to the satellite more effectively. In other embodiments, however, an airbag may be positioned on the rear end face.

When the entire device is ejected from the airplane and fall to a certain elevation, the sensors can activate the inflation devices to inflate airbags. The parachute 211 can be inflated by the air to decelerate or reduce the descending rate of the whole device. The airbag can provide all-round buffering in land crash or make the equipment float on the water in sea crash. The positioning system can be configured to send out the position signal. In some embodiments, the parachute system 211 deploys immediately upon separation from the aircraft. The parachute may in some embodiments have a maximum span of less than 900 mm, or 0.9 meters but other maximum spans can be used with the system.

Transmission of Flight Data and Positioning Signals

Figure 11A:
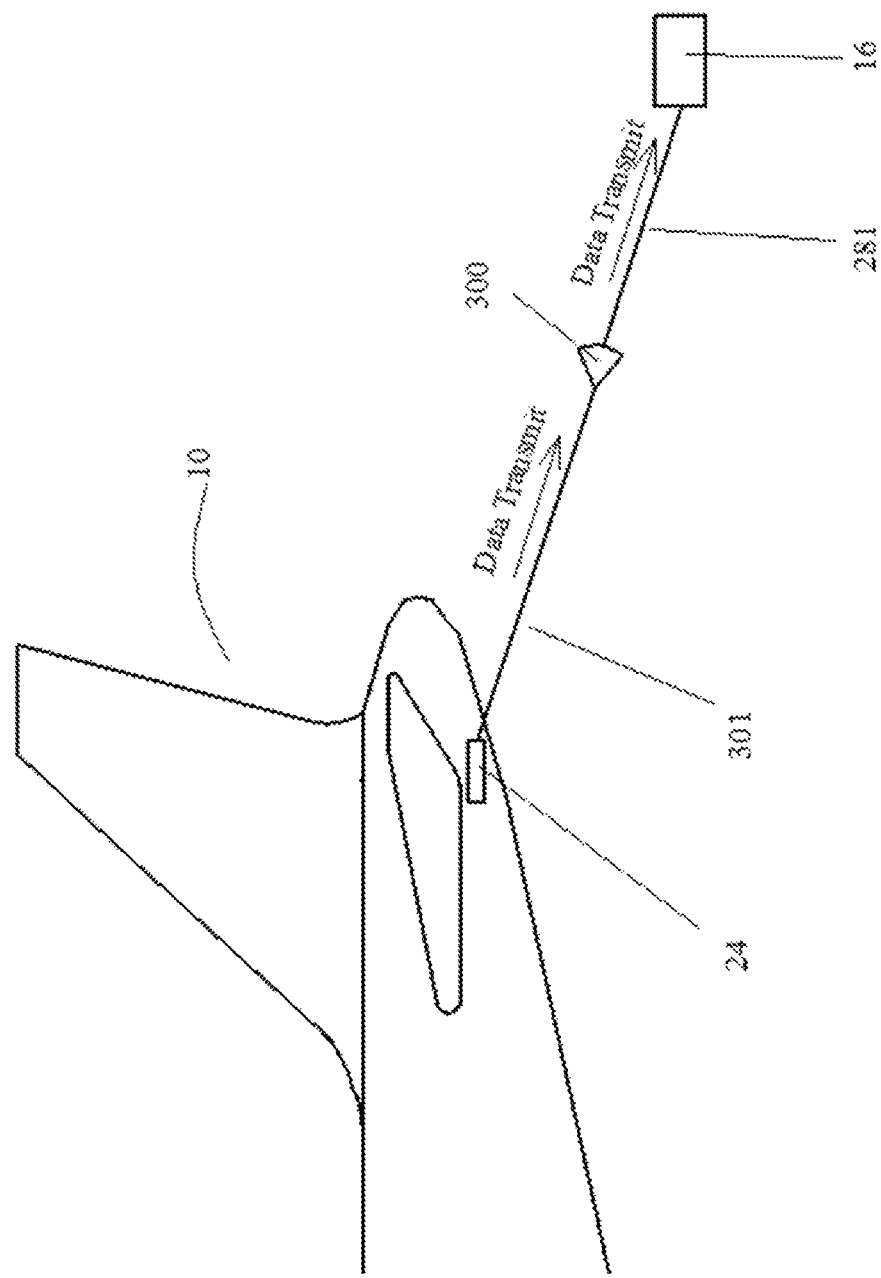
FIG. 11A is an illustration of data transmission with the aircraft operating in a state of emergency, and between a EFDR and a TITCS before the EFDR separates from the TITCS according to some embodiments of the present disclosure.

FIG. 11A shows a simplified illustration of an embodiment of a first data link between the aircraft 10 and a TITCS 300 through cable 301, and the TITCS 300 and the EFDR 16 through cable 281 before the EFDR 16 is disconnected from the TITCS 300. In this configuration, flight data is preferably transmitted from the aircraft 10 to the EFDR 16 through the TITCS 300. In some embodiments, images can be captured by the TITCS 300, such as images showing an external view of the aircraft 10. These images (and/or flight data) can be transmitted from the TITCS 300 to EFDR 16 through data cable 281. Towed cable 301 can be connected at one end to a detachable joint 24 and at the opposite end with the TITCS 300. The positioning of the detachable joint 24 in FIG. 11A is similar to the lower position 110 shown in FIG. 1. The detachable joint 24 does not necessarily need to be located at that position, however, and could be located at upper location 110 of FIG. 11A, or at any other location that enables the TITCS 300 to be towed behind the aircraft 10. The detachable joint 24 may be similar to, for example, joint 24 illustrated in FIG. 3A, as described above.

Figure 11B:
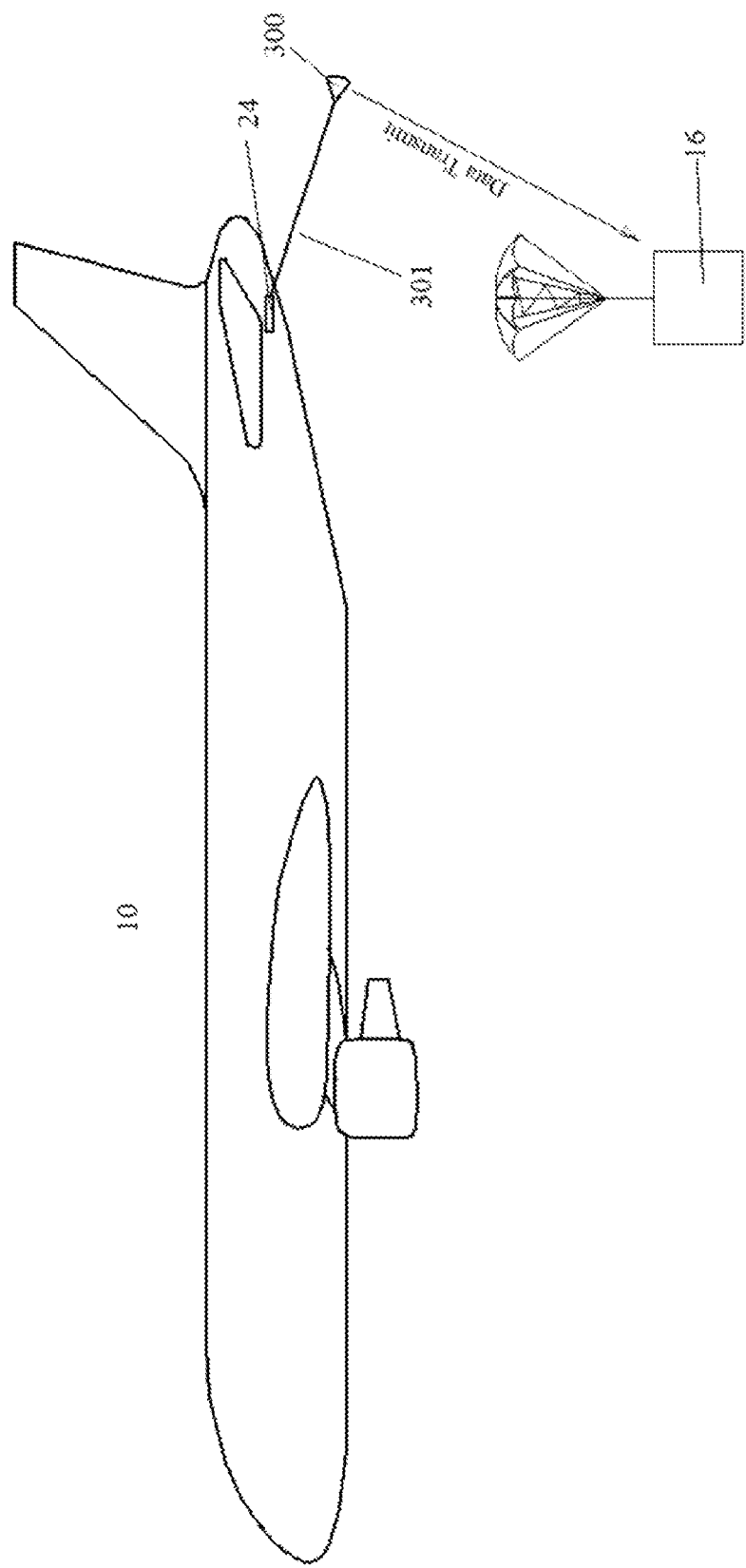
FIG. 11B is an illustration of data transmission between the EFDR and the TITCS, after the EFDR is separated from the TITCS according to some embodiments of the present disclosure.

FIG. 11B shows a simplified illustration of a second data link between the EFDR 16 and the TITCS 300 after the EFDR 16 is disconnected from the TITCS 300 (for example, by disconnecting cable 281 shown in FIG. 11A). In this case, the images can be captured by the TITCS 300 (and/or flight data is still transmitted from the aircraft 10 to the TITCS 300). These images and/or flight data can be transmitted from the TITCS 300 to the EFDR 16 by wireless technology.

Figure 11C:
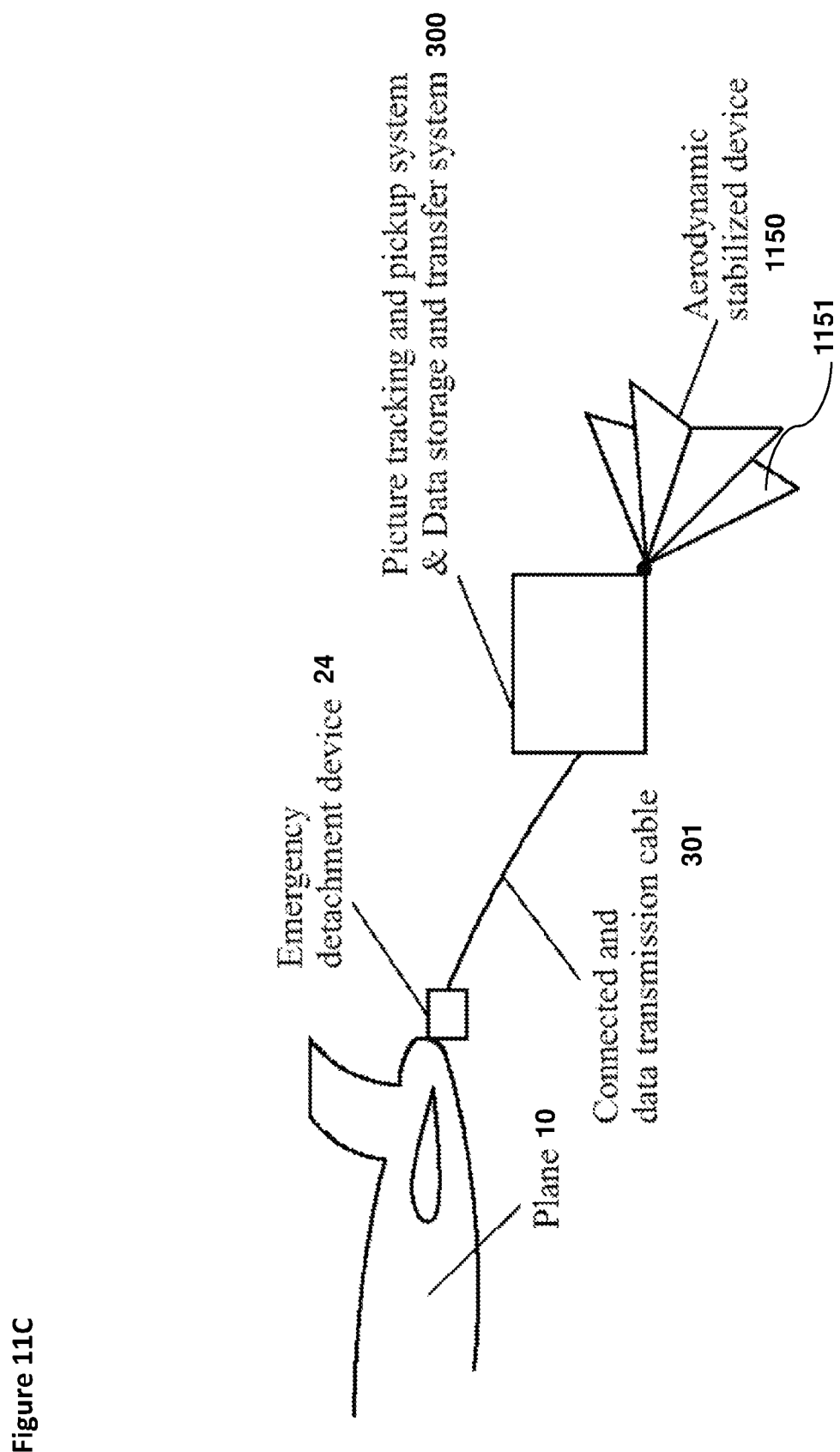
FIG. 11C is an illustration of an embodiment of an aircraft pulling a picture tracking system having an aerodynamic stabilization device.

FIG. 11C illustrates an embodiment similar to the embodiment illustrated in FIGS. 11A and 11B, but in FIG. 11C, the towed tracking system 300 is further coupled to an aerodynamic stabilization device 1150. The aerodynamic stabilization device 1150 comprises a plurality of fins 1151 configured to help stabilize the tracking system 300 while being towed behind the aircraft 10. As described elsewhere, in some embodiments, a parachute may be used as an aerodynamic stabilization device. Further, as described elsewhere, one or more aerodynamic stabilization features may be built into the towed tracking system 300, such as one or more fins, airfoils, parachutes, and/or the like.

Figure 12A:
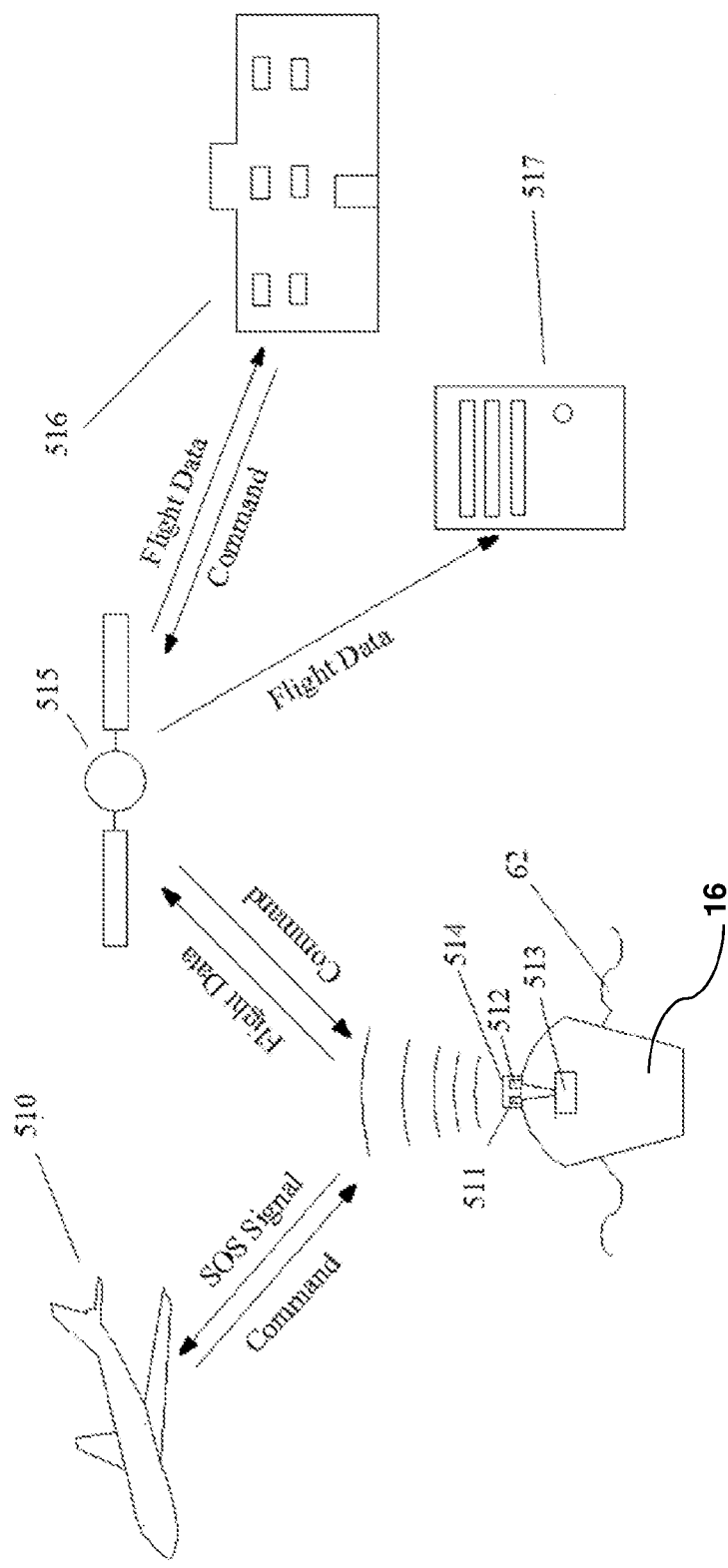
FIG. 12A is a schematic illustration of data and signal transmission among search and rescue aircraft, the EFDR, a relay satellite, a cloud server and a ground control center after the EFDR has achieved a water landing according to some embodiments of the present disclosure.

FIG. 12A shows a simplified illustration of a third data link between a search and rescue aircraft 510 and the EFDR 16, the EFDR 16 and a relay satellite 515, a ground control center 516 and the relay satellite 515, and the relay satellite 515 and a cloud server 517 after the EFDR 16 has landed on water 62. A radio beacon 511 and data uploading antenna 512 can be wrapped in a shield 514, which can be preferably waterproof and can offer protection from impact with the water. When the EFDR 16 lands on water 62, the radio beacon 511 and a positioning module (for example GPS module, BEIDOU module, Galileo module) 513 can be activated by onboard water sensors or by other means (although in other embodiments the position module(s) may be activated at an earlier time, such as to enable position tracking while the EFDR 16 descends). The radio beacon 511 can broadcast an SOS and/or positioning signal. The positioning module 513 can be configured to search for a signal from a satellite 515 automatically. When the positioning module 513 establishes a stable data link with the satellite 515, it can transmit real-time location coordinates to the satellite 515 using the radio beacon 511. If the positioning module 513 cannot successfully establish a data link with the satellite 515 or maintain a stable data link, the positioning module 513 can automatically shuts down or stop transmitting data or go into a sleep mode or enter some other power save mode to save battery power. The radio beacon 511 can be configured to continue broadcasting a positioning signal of the EFDR's last known location and/or the SOS signal. When the search and rescue aircraft 510 captures the SOS signal from the EFDR 16, the EFDR can start to transmit flight data to the cloud sever through the satellite 515 using the data upload antenna 512. The ground control center 516 can receive the SOS and positioning signal through the data link with for example the cloud server 517. The ground control center 516 can decide whether it will allow data to be uploaded to the cloud sever 517 or shut down the data uploading antenna 512, such as to save battery power. The data transmission protocol preferably can support continuation of transmission from the point of interruption to improve data transmission efficiency and/or prevent data loss.

The data link in FIG. 12A can transmit flight data to the cloud server rapidly as a data back-up, which increases the security of the flight data, in case the EFDR 16 is eventually lost and/or damaged. In the meantime, this data link can also provide positioning signals to a rescue team.

Figure 12B:
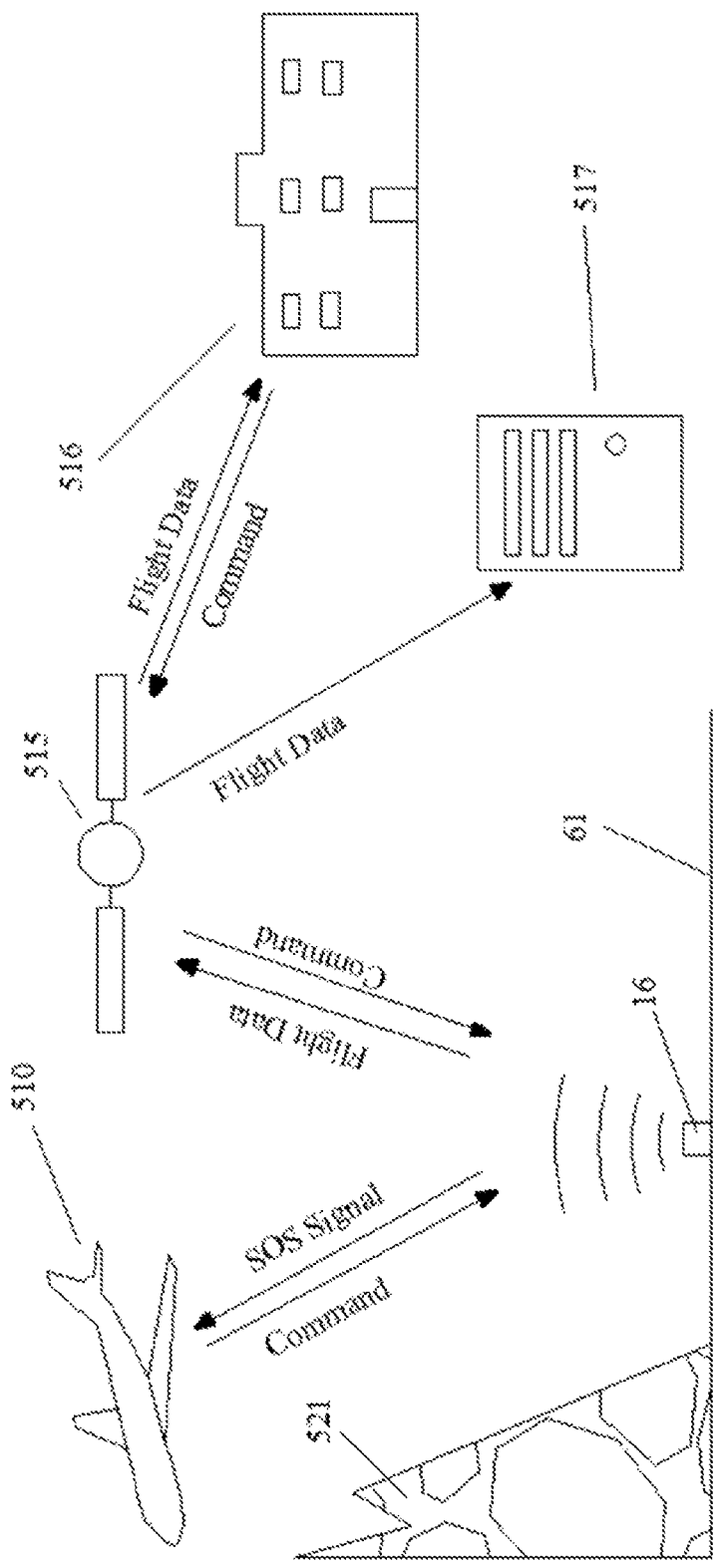
FIG. 12B is a schematic illustration of data and signal transmission among search and rescue aircraft, the EFDR, the relay satellite, the cloud server and the ground control center after the EFDR lands on ground according to some embodiments of the present disclosure.

FIG. 12B shows a simplified schematic diagram of the data and signal transmission discussed in connection with in FIG. 12A among the search and rescue aircraft 510, the EFDR 16, the satellite 215, the ground control center 516 and, the cloud server 517 after the EFDR 16 had landed on the ground 61 or in the mountains 521. The data link and the functioning principles in FIG. 12B are the same as that in FIG. 12A, except that the water sensor can be replaced by other sensors (for example an altitude sensor, impact sensor, accelerometer, and/or the like) to activate the radio beacon 511 and/or the positioning module 513.

Figure 12C:
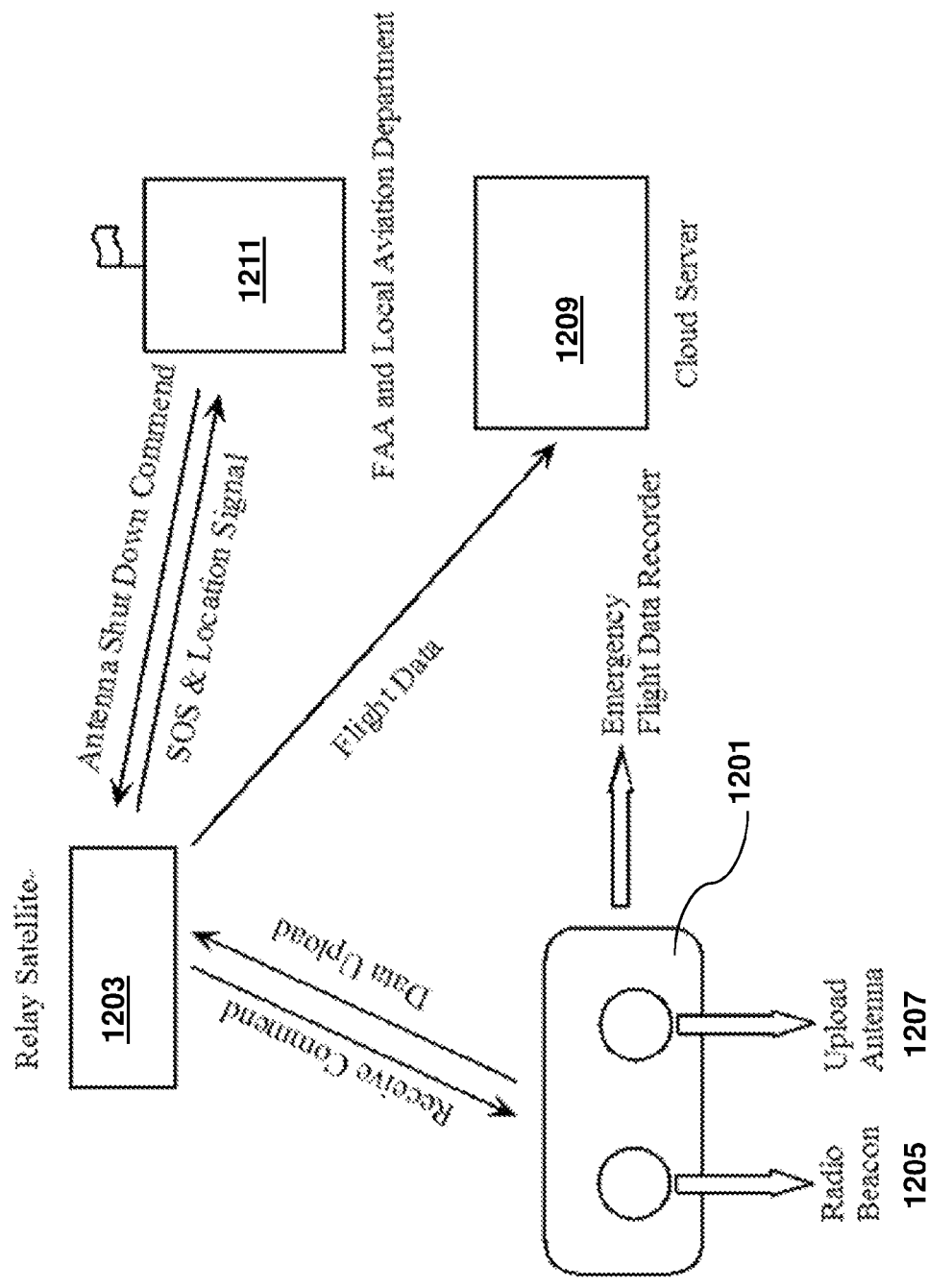
FIG. 12C is another schematic illustration of data and signal transmission among various devices according to some embodiments of the present disclosure.

FIG. 12C is a schematic illustration of another embodiment of a data transfer and communication system between a landing system 1201 (for example, as shown in FIG. 10H and other figures) and a relay satellite 1203 and/or a data storage and transfer system (such as shown in FIG. 11C). This system comprises radio beacon 1205, data upload antenna 1207, relay satellite 1203 and cloud server 1209. The radio beacon 1205 and/or the data upload antenna 1207 can be internal devices of the emergency flight data recorder. The relay satellite 1203 may be, for example, a navigation satellite or communication satellite which has an enough bandwidth.

After the emergency flight data recorder (EFDR) is ejected from the airplane or covered by water, the internal radio beacon 1205 and the upload antenna 1207 will be automatically activated. They can effectively transmit signal when the antenna or the shell of EFDR is partial (or fully) merged into the water. They can also upload good quality data during a complex electromagnetic environment such as a thunderstorm.

The radio beacon 1205 can be used to constantly or regularly transmit a limited amount of data, such as only two sets of signal which can be SOS signals and/or GPS location signals. The upload antenna 1207 can transmit more complete data information to the cloud server. It will automatically search GPS/Beidou navigation satellite (or communication satellite) after activated, then it will use the satellite as a relay to transmit SOS signal to FAA 1211 as well as the civil aviation department of the nearest country while uploading the data in EFDR to the cloud server. Considering the data in EFDR will be helpful to locate the crashed airplane while the audio data in the cockpit voice recorder (CVR) can be relatively large, the upload antenna will upload the EFDR data first.

The data link preferably comprises reliable transmit devices and advanced transmission protocol. The data link and the upload antenna can rapidly backup flight information to the cloud, it can also transmit its location to the search team in real-time. Through the "Emergency Flight Data Recorder-Satellite-Cloud Server" data link, the upload antenna can transmit not only the short SOS and location signals but also the flight data in EFDR and the audio data in CVR efficiently. In the meantime, the application of high bandwidth data link provides a foundation for future system update. Through advanced transmission protocol, the upload antenna supports resuming of file transfers to improve efficiency of data transfer and to prevent data loss. The emergency flight data recorder will drift in the sea after crash, through real time cloud sharing data link, the location information of the emergency flight data recorder will upload to the search team in time.

Through the two-way data link, the ground station can control the upload device in EFDR to provide a battery manage function. Both radio beacon and upload antenna require energy supply, so two-way data link can be used instead of transmit-only antenna to manage the battery for the system. Considering that the radio beacon is mainly used to locate the emergency flight data recorder, its energy supply can become a first priority. So the upload antenna will stop transmitting (except location signal) by remote command after the data is fully uploaded to save battery for the radio beacon.

The data transmit module integrates the ejectable emergency flight data recorder, the satellite system and the ground cloud server. It can transmit flight data to the cloud rapidly which assures the safety of the flight information. In the meantime, this module can also transmit the location information to the search team in real-time, this increases the efficiency of search mission. Through an advanced control method, the reliability of data transmit can be increased, the power supply of the emergency flight data recorder internal device can be more reasonable, which provides a longer beacon power supply.

The data transmit module has a complete high speed two-way cloud data link. It takes full advantage of the navigation satellite and the communication satellite system, so it is capable to backup large amount of data in short time. The advanced transmission protocol can assure the safety of data and the real-time location transmit. These provide security for further search mission and accident analysis.

Tow-Type Image Tracking and Capturing Systems (TITCS)

Figure 13A:
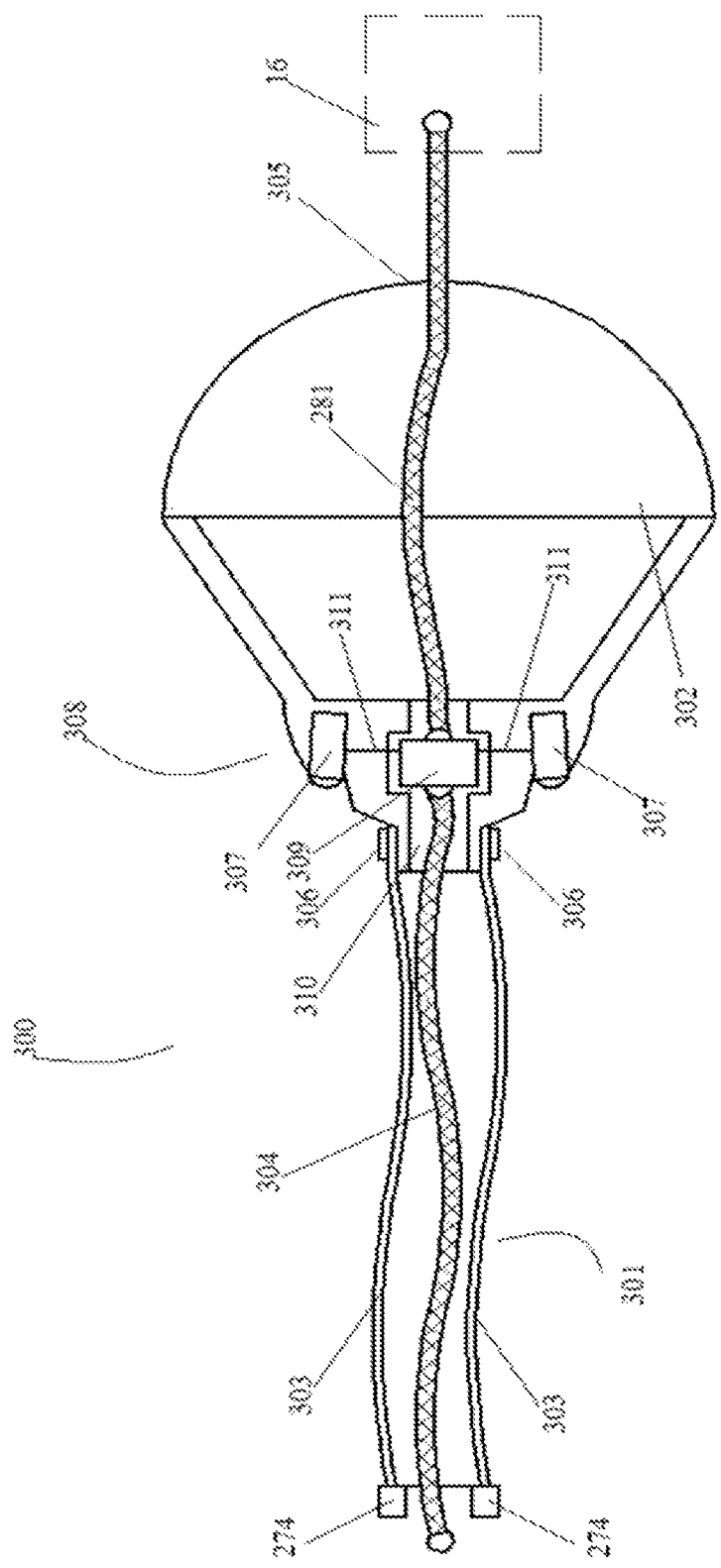
FIG. 13A is a side elevation view in cross-section of an embodiment according to the present disclosure.
Figure 13B:
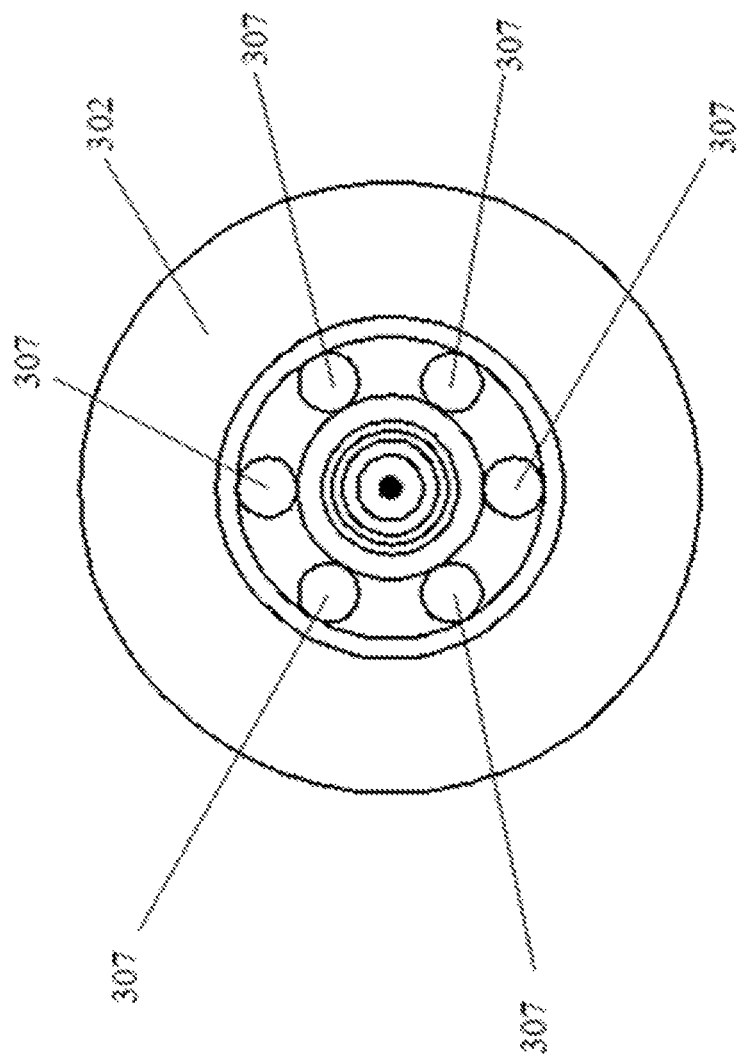
FIG. 13B is a left view of the embodiment of FIG. 13A.
Figure 14:
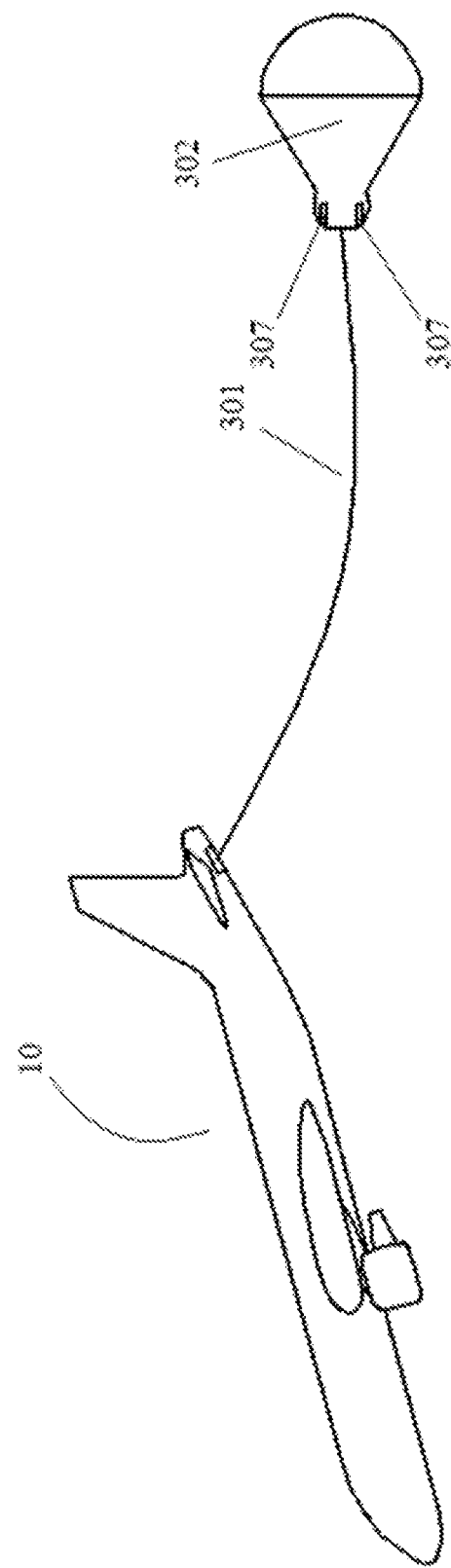
FIG. 14 is a simplified illustration of the working state of the apparatus in some embodiments of the present disclosure.

FIGS. 13A and 13B shows a simplified schematic cross-section of an embodiment of a TITCS 300 and a front view, respectively. A towed cable 301 can be provided for connecting the aircraft 10 with a stabilizing parachute 302 (as shown in FIG. 14). This towed cable 301 includes of a data cable 304 enclosed within a hollow rope tube 303. One end of the towed cable 301 can be connected to the aircraft by a connector 274. The other end of the towed cable 301 can be connected to a stabilizing parachute by a connector 306. Using this towed cable, the TITCS can be towed behind the aircraft when the TITCS is ejected. The stabilizing parachute 302 provides improved flight stability for the TITCS. This can be useful for improving the performance of the TITCS. Although this embodiment uses a parachute 302 for stabilization, additional or other aerodynamic stabilization devices may be used, such as fins, wings, airfoils, and/or the like.

With continued reference to FIGS. 13A and 13B, a multi-eyes video module 307 can be provided for capturing images of the aircraft. The multi-eyes video module 307 can be located on an outside surface of the forepart of the stabilizing parachute assembly 308. The multi-eyes video module 307 comprises several cameras (although in other embodiments may only comprise one camera). It can be advantageous, however, to have multiple cameras, such as to collect more information about the aircraft and/or surrounding environment. A data processing and transmission module (DPTM) 309 can be located at a chamber 310. This chamber can be in the forepart of the stabilizing parachute assembly 308. The DPTM 309 can be connected to the aircraft by data cable 304, which allows wired data transmission from the aircraft to the TITCS. Some of the data cables 311 connect the multi-eyes video module 307 with the DPTM 309. When a trigger signal from, e.g., the aircraft, can be transferred to the multi-eyes video module 307, the multi-eyes video module 307 can be activated to capture images (although in some embodiments they may also or alternatively be triggered automatically and/or by the DPTM 309). Then, the data cables 311 transmit these images to the DPTM 309. The images can be processed and/or stored by the DPTM 309. In an embodiment, these images can be transmitted to the EFDR 16 by a data cable 281 (assuming the EFDR 16 is still coupled to the TITCS 300). The DPTM 309 can be connected with the ejected EFDR 16 by the data cable 281 through an opening vent of the stabilizing parachute 305. When the EFDR 16 disconnects from the TITCS 300, the DPTM 309 can be configured to switch to transmitting the data wirelessly to the EFDR 16. Although not shown in FIG. 13A, in some embodiments the cable 281 may be encased in or surrounded by a sheath, rope, tube, and/or the like, similar to sheath 303 disposed about cable 304.

As mentioned above, FIG. 13B shows a simplified left view of the TITCS 300. The multi-eyes video module 307 can be located on the outside surface of the forepart of stabilizing parachute assembly 308. The multi-eyes video module 307 comprises several cameras (in this embodiment six), but could comprise less or more in other embodiments. Also, each camera may be positioned to capture a view along a different line of sight.

FIG. 14 illustrates the embodiment of FIGS. 13A and 13B being towed behind aircraft 10. When the TITCS 300 is ejected, the stabilizing parachute 302 can still be towed by aircrafts 10. The multi-eyes video module 307 captures images, preferably of the aircraft 10 and/or the surrounding environment. These images can be processed and saved by the DPTM 309. In an embodiment, the DPTM transfers these images to the EFDR 16 (either wired or wirelessly).

Computing System

Figure 15:
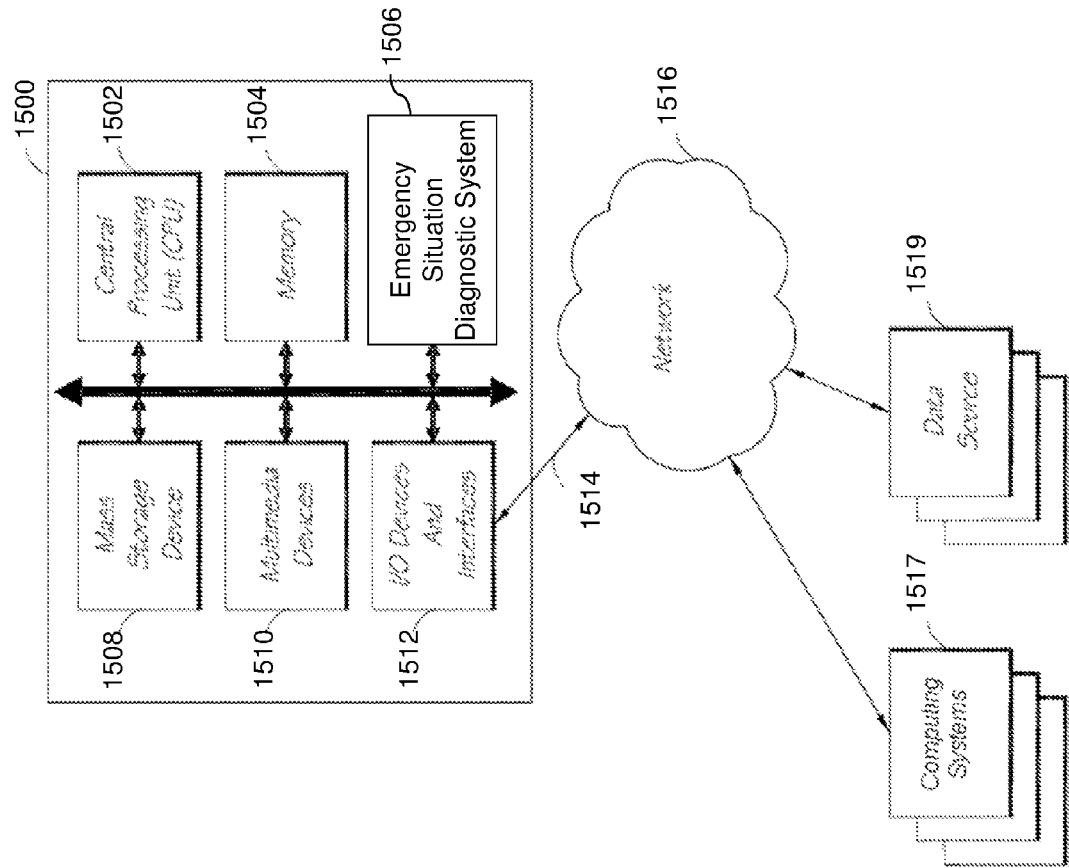
FIG. 15 is a block diagram depicting an embodiment of a computer hardware system configured to run software for implementing one or more embodiments of the systems described herein.

FIG. 15 is a block diagram depicting an embodiment of a computer hardware system configured to run software for implementing one or more embodiments of the emergency situation diagnostic systems and other systems described herein.

In some embodiments, at least a portion of the systems described above take the form of some or all of the computing system 1500 illustrated in FIG. 15, which is a block diagram of one embodiment of a computing system that is optionally in communication with one or more computing systems 1517 (for example, other systems of the aircraft, satellite systems, ground systems, user access point systems used to configure the emergency situation diagnostic system, and/or the like) and/or one or more data sources 1519 (for example, sensors, inputs, databases, external systems, and/or the like) via one or more networks 1516. The computing system 1500 may be used to implement one or more of the systems and methods described herein. While FIG. 15 illustrates one embodiment of a computing system 1500, it is recognized that the functionality provided for in the components and modules of computing system 1500 may be combined into fewer components and modules, further separated into additional components and modules, and/or in some embodiments the system may comprise fewer or additional components and modules. For example, a fully-autonomous system may not comprise a multimedia device 1510 and/or user interfaces 1512, although a multimedia device and/or user interface may be desirable in some embodiments, such as to facilitate human interaction with the system, such as for configuration of the system.

Emergency Situation Diagnostic System Module

In one embodiment, the computing system 1500 comprises an emergency situation diagnostic system module 1506 that carries out one or more of the functions described herein with reference to determining when to initiate an ejection procedure and/or accomplishing one or more processes included in the ejection procedure and/or after ejection, including any one of the techniques described above. The emergency situation diagnostic system module 1506 and/or other modules may be executed on the computing system 1500 by a central processing unit 1502 discussed further below.

In general, the word "module," as used herein, refers to logic embodied in hardware or firmware, or to a collection of software instructions, possibly having entry and exit points, written in a programming language, such as, for example, COBOL, CICS, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage.

Computing System Components

In one embodiment, the computing system 1500 also comprises a mainframe computer suitable for controlling and/or communicating with large databases, performing high volume transaction processing, and generating reports from large databases. The computing system 1500 also comprises a central processing unit ("CPU") 1502, which may comprise a conventional microprocessor. The computing system 1500 further comprises a memory 1504, such as random access memory ("RAM") for temporary storage of information and/or a read only memory ("ROM") for permanent storage of information, and a mass storage device 1508, such as a hard drive, diskette, or optical media storage device. Typically, the modules of the computing system 1500 are connected to the computer using a standards based bus system. In different embodiments, the standards based bus system could be Peripheral Component Interconnect (PCI), Microchannel, SCSI, Industrial Standard Architecture (ISA) and Extended ISA (EISA) architectures, for example.

The computing system 1500 may comprise one or more commonly available input/output (I/O) devices and interfaces 1512, such as a keyboard, mouse, touchpad, and printer. In one embodiment, the I/O devices and interfaces 1512 comprise one or more display devices, such as a monitor, that allows the visual presentation of data to a user. More particularly, a display device provides for the presentation of GUIs, application software data, and multimedia presentations, for example. In one or more embodiments, the I/O devices and interfaces 1512 comprise a microphone and/or motion sensor that allow a user to generate input to the computing system 1500 using sounds, voice, motion, gestures, or the like. In the embodiment of FIG. 15, the I/O devices and interfaces 1512 also provide a communications interface to various external devices. The computing system 1500 may also comprise one or more multimedia devices 1510, such as speakers, video cards, graphics accelerators, and microphones, for example.

Computing System Device/Operating System

The computing system 1500 may run on a variety of computing devices, such as, for example, an electronic board, a server, a Windows server, a Structure Query Language server, a Unix server, a personal computer, a mainframe computer, a laptop computer, a tablet computer, a cell phone, a smartphone, a personal digital assistant, a kiosk, an audio player, an e-reader device, and so forth. The computing system 1500 is generally controlled and coordinated by operating system software, such as z/OS, Windows 95, Windows 98, Windows NT, Windows 2000, Windows XP, Windows Vista, Windows 7, Windows 8, Linux, BSD, SunOS, Solaris, Android, iOS, BlackBerry OS, or other compatible operating systems. In Macintosh systems, the operating system may be any available operating system, such as MAC OS X. In other embodiments, the computing system 1500 may be controlled by a proprietary operating system. Conventional operating systems control and schedule computer processes for execution, perform memory management, provide file system, networking, and I/O services, and provide a user interface, such as a graphical user interface ("GUI"), among other things.

Network

In the embodiment of FIG. 15, the computing system 1500 is coupled to a network 1516, such as a LAN, WAN, or the Internet, for example, via a wired, wireless, or combination of wired and wireless, communication link 1514. The network 1516 communicates with various computing devices and/or other electronic devices via wired or wireless communication links. In the embodiment of FIG. 15, the network 1516 is communicating with one or more computing systems 1517 and/or one or more data sources 1519.

Access to the emergency situation diagnostic system module 1506 of the computer system 1500 by computing systems 1517 and/or by data sources 1519 may be through a web-enabled user access point such as the computing systems' 1517 or data source's 1519 personal computer, cellular phone, smartphone, laptop, tablet computer, e-reader device, audio player, or other device capable of connecting to the network 1516. Such a device may have a browser module that is implemented as a module that uses text, graphics, audio, video, and other media to present data and to allow interaction with data via the network 1516.

The browser module may be implemented as a combination of an all points addressable display such as a cathode-ray tube (CRT), a liquid crystal display (LCD), a plasma display, or other types and/or combinations of displays. In addition, the browser module may be implemented to communicate with input devices 1512 and may also comprise software with the appropriate interfaces which allow a user to access data through the use of stylized screen elements such as, for example, menus, windows, dialog boxes, toolbars, and controls (for example, radio buttons, check boxes, sliding scales, and so forth). Furthermore, the browser module may communicate with a set of input and output devices to receive signals from the user.

The input device(s) may comprise a keyboard, roller ball, pen and stylus, mouse, trackball, voice recognition system, or pre-designated switches or buttons. The output device(s) may comprise a speaker, a display screen, a printer, or a voice synthesizer. In addition a touch screen may act as a hybrid input/output device. In another embodiment, a user may interact with the system more directly such as through a system terminal connected to the score generator without communications over the Internet, a WAN, or LAN, or similar network.

In some embodiments, the system 1500 may comprise a physical or logical connection established between a remote microprocessor and a mainframe host computer for the express purpose of uploading, downloading, or viewing interactive data and databases on-line in real time. The remote microprocessor may be operated by an entity operating the computer system 1500, including the client server systems or the main server system, an/or may be operated by one or more of the data sources 1519 and/or one or more of the computing systems 1517. In some embodiments, terminal emulation software may be used on the microprocessor for participating in the micro-mainframe link.

In some embodiments, computing systems 1517 who are internal to an entity operating the computer system 1500 may access the emergency situation diagnostic system module 1506 internally as an application or process run by the CPU 1502.

User Access Point

In an embodiment, a user access point or user interface comprises a personal computer, a laptop computer, a tablet computer, an e-reader device, a cellular phone, a smartphone, a GPS system, a Blackberry® device, a portable computing device, a server, a computer workstation, a local area network of individual computers, an interactive kiosk, a personal digital assistant, an interactive wireless communications device, a handheld computer, an embedded computing device, an audio player, or the like.

Other Systems

In addition to the systems that are illustrated in FIG. 15, the network 1516 may communicate with other data sources or other computing devices. The computing system 1500 may also comprise one or more internal and/or external data sources. In some embodiments, one or more of the data repositories and the data sources may be implemented using a relational database, such as DB2, Sybase, Oracle, CodeBase and Microsoft® SQL Server as well as other types of databases such as, for example, a flat file database, an entity-relationship database, and object-oriented database, and/or a record-based database.

Various other modifications, adaptations, and alternative designs are of course possible in light of the above teachings. Therefore, it should be understood at this time that within the scope of the appended claims the invention may be practiced otherwise than as specifically described herein. It is contemplated that various combinations or subcombinations of the specific features and aspects of the embodiments disclosed above may be made and still fall within one or more of the inventions. Further, the disclosure herein of any particular feature, aspect, method, property, characteristic, quality, attribute, element, or the like in connection with an embodiment can be used in all other embodiments set forth herein. Accordingly, it should be understood that various features and aspects of the disclosed embodiments can be combined with or substituted for one another in order to form varying modes of the disclosed inventions. Thus, it is intended that the scope of the present inventions herein disclosed should not be limited by the particular disclosed embodiments described above. Moreover, while the invention is susceptible to various modifications, and alternative forms, specific examples thereof have been shown in the drawings and are herein described in detail. It should be understood, however, that the invention is not to be limited to the particular forms or methods disclosed, but to the contrary, the invention is to cover all modifications, equivalents, and alternatives falling within the spirit and scope of the various embodiments described and the appended claims. Any methods disclosed herein need not be performed in the order recited. The methods disclosed herein include certain actions taken by a practitioner; however, they can also include any third-party instruction of those actions, either expressly or by implication. The ranges disclosed herein also encompass any and all overlap, sub-ranges, and combinations thereof. Language such as "up to," "at least," "greater than," "less than," "between," and the like includes the number recited. Numbers preceded by a term such as "approximately", "about", and "substantially" as used herein include the recited numbers (e.g., about 10%=10%), and also represent an amount close to the stated amount that still performs a desired function or achieves a desired result. For example, the terms "approximately", "about", and "substantially" may refer to an amount that is within less than 10% of, within less than 5% of, within less than 1% of, within less than 0.1% of, and within less than 0.01% of the stated amount.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. The headings used herein are for the convenience of the reader only and are not meant to limit the scope of the inventions or claims.

What is claimed is:

1. A system for quickly locating and retrieving flight data of an aircraft after an aircraft mid-air mishap, the system comprising:
    a flight data recorder, said flight data recorder comprising wireless communication hardware configured to communicate flight information to a remote device;
    a tracking device comprising at least one camera and a data communication system;

a rapid ejection system, wherein the rapid ejection system forms an opening in the aircraft in the event of an aircraft emergency and ejects the flight data recorder and the tracking device through the opening of the aircraft;

a soft landing system, said soft landing system being attached to the flight data recorder and configured to reduce force of impact upon landing and increase buoyancy of the flight data recorder;

a tow system, said tow system comprising a tether and data communication link, wherein the tether physically connects the tracking device to the aircraft after the mid-air mishap in a manner such that the tracking device follows the aircraft at a distance to capture images of the aircraft and the surrounding environment after the mid-air mishap;

wherein the tow system is configured to continue to transmit flight information from the aircraft to the tracking device via the data communication link for a period of time after the ejection of the tracking device;

wherein the tracking device transmits to the flight data recorder the flight information received from the aircraft after ejection of the tracking device and the images captured by the tracking device following the mid-air mishap, and wherein the flight data recorder is configured to in turn transmit said flight information and images to the remote device; and wherein the flight data recorder is connected to the tracking device via the tow system for a period of time after ejection of the tracking device and flight data recorder from the aircraft.

2. The system of claim 1, wherein the data communication system of the flight data recorder is configured to transmit flight data and videos of the aircraft to the remote device.

3. The system of claim 2, wherein the remote device comprises at least one of a satellite, a second aircraft, and a base station.

4. The system of claim 1, wherein the rapid ejection system comprises a pressurized gas system.

5. The system of claim 1, wherein the rapid ejection system comprises an extraction parachute coupled to the flight data recorder.

6. The system of claim 1, wherein the rapid ejection system comprises:
a panel that covers the opening prior to ejection;
a spring that biases the panel toward an open position; and
a locking mechanism configured to retain the panel in a position covering the opening and selectively release the panel to enable the panel to move toward the open position.

7. The system of claim 1, wherein the tow system comprises at least one detachable connector, said detachable connector can be actuated to disconnect the tracking device from the aircraft in the event the rapid ejection system is triggered accidentally.

8. The system of claim 1, wherein the opening in the aircraft can be closed in the event the rapid ejection system is triggered accidentally.

9. The system of claim 1, wherein the soft landing system comprises a plurality of inflatable airbags.

* * * * *